US012759907B2

(12) United States Patent
Basheer et al.

(10) Patent No.: US 12,759,907 B2
(45) Date of Patent: Oct. 13, 2026

(54) ELECTROCHEMICAL REACTOR CELL

(71) Applicant: King Fahd University of Petroleum and Minerals, Dhahran (SA)

(72) Inventors: Chanbasha Basheer, Dhahran (SA); Hakimu Nsubuga, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 221 days.

(21) Appl. No.: 19/210,095

(22) Filed: May 16, 2025

(65) Prior Publication Data

US 2025/0276918 A1 Sep. 4, 2025

Related U.S. Application Data

(60) Continuation of application No. 18/099,633, filed on Jan. 20, 2023, now Pat. No. 12,312,259, which is a (Continued)

(51) Int. Cl.
*B32B 9/00* (2006.01)
*C02F 1/461* (2023.01)

(Continued)

(52) U.S. Cl.
CPC ........ *C02F 1/46109* (2013.01); *C02F 1/4672* (2013.01); *C23C 18/1254* (2013.01);

(Continued)

(58) Field of Classification Search
CPC ................ C02F 1/46109; C02F 1/4672; C02F 2001/46142; C02F 2001/46147;

(Continued)

(56) References Cited

U.S. PATENT DOCUMENTS

| | | | |
|---|---|---|---|
| 2015/0068291 A1 | 3/2015 | Basheer et al. | |
| 2018/0076445 A1 | 3/2018 | Ma et al. | |
| 2018/0107805 A1 | 4/2018 | Anantharaman | |

FOREIGN PATENT DOCUMENTS

| | | |
|---|---|---|
| CN | 100505959 C | 6/2009 |
| CN | 102126771 A | 7/2011 |

(Continued)

OTHER PUBLICATIONS

Nsubuga, et al.; An enhanced beta-blockers degradation method using copper-boronferrite supported graphite electrodes and continuous droplet flowassisted electro-Fenton reactor; Separation and Purification Technology; Mar. 30, 2019; Abstract Only; 2 Pages.

(Continued)

*Primary Examiner* — Maria V Ewald
(74) *Attorney, Agent, or Firm* — Oblon, McClelland, Maier & Neustadt, L.L.P.

(57) ABSTRACT

Copper—boron—ferrite (Cu—B—Fe) composites may be prepared and immobilized on graphite electrodes in a silica-based sol-gel, e.g., from rice husks. Different bimetallic loading ratios can produce fast in-situ electrogeneration of reactive oxygen species, $H_2O_2$ and $^{\cdot}OH$, e.g., via droplet flow-assisted heterogeneous electro-Fenton reactor system. Loading ratios of, e.g., 10 to 30 wt. % $Fe^{3+}$ and 5 to 15% wt. $Cu^{2+}$, can improve the catalytic activities towards pharmaceutical beta blockers (atenolol and propranolol) degradation in water. Degradation efficiencies of at least 99.9% for both propranolol and atenolol in hospital wastewater were demonstrated. Radicals of $^{\cdot}OH$ in degradation indicate a surface mechanism at inventive cathodes with correlated contributions of iron and copper. Copper and iron can be embedded in porous graphite electrode surface and catalyze the conversion of $H_2O_2$ to $^{\cdot}OH$ to enhance the degradation.

(Continued)

Inventive cathodes can be stable catalytically after 20 or more cycles under neutral and acidic conditions.

13 Claims, 38 Drawing Sheets

Related U.S. Application Data division of application No. 16/816,469, filed on Mar. 12, 2020, now Pat. No. 11,572,292.

(60) Provisional application No. 62/818,385, filed on Mar. 14, 2019.

(51) Int. Cl.

| | |
|---|---|
| ***C02F 1/467*** | (2023.01) |
| ***C23C 18/12*** | (2006.01) |
| ***C25B 11/043*** | (2021.01) |
| ***C25B 11/057*** | (2021.01) |
| ***C25B 11/091*** | (2021.01) |
| *C02F 101/30* | (2006.01) |
| *C02F 103/00* | (2006.01) |

(52) U.S. Cl.

CPC .......... *C25B 11/043* (2021.01); *C25B 11/057* (2021.01); *C25B 11/091* (2021.01); *C02F 2001/46142* (2013.01); *C02F 2001/46147* (2013.01); *C02F 2101/30* (2013.01); *C02F 2101/308* (2013.01); *C02F 2103/003* (2013.01); *C02F 2201/4619* (2013.01); *C02F 2305/026* (2013.01)

(58) Field of Classification Search

CPC ........... C02F 2101/30; C02F 2101/308; C25B 11/057; C25B 11/043; C25B 11/091

USPC .......................................................... 428/408

See application file for complete search history.

(56) References Cited

FOREIGN PATENT DOCUMENTS

| | | | |
|---|---|---|---|
| CN | 109161941 | A | 1/2019 |
| WO | 2016/056994 | A1 | 4/2016 |

OTHER PUBLICATIONS

Nsubuga, et al.; Droplet flow-assisted heterogeneous electro-Fenton reactor for degradation of beta-blockers: response surface optimization, and mechanism elucidation; Environmental Science and Pollution Research; pp. 1-15; Mar. 12, 2019; Abstract Only; 2 Pages.

Garcia-Segura, et al.; Effect of the Fe3+ /Cu2+ ratio on the removal of the recalcitrant oxalic and oxamic acids by electro-Fenton and solar photoelectro-Fenton; Solar Energy, vol. 124; pp. 242-253; Feb. 2016; Abstract Only; 2 Pages.

Maizi, et al.; Structural and Electrochemical Properties of Thin Layers of Binary Ni—Fe Alloys Electrodeposited By Two Different Baths: Acid and Ionic Liquid ; Surface Review and Letters, vol. 25, No. 8; 2018; Abstract Only; 2 Pages.

Gan, Efficient removal of Rhodamine Busing a rice hull-based silica supported iron catalyst by Fenton-like process, Chemical Engineering Journal, vol. 229, 2013, p. 351-363 (Year: 2013).

Wang, Iron-copper bimetallic nanoparticles supported on hollow mesoporous silica spheres: the effect of Fe/Cu ratio on heterogeneous Fenton degradation of a dye, RSC Advances, 6, 59, 2016, p. 54623-54635 (Year: 2016).

Li, Facile preparation of magnetic mesoporous Fe3O4/C/Cu composites as high performance Fenton-like catalysts, Applied Surface Science, 396, 2017, p. 1383-1392 (Year: 2017).

Chai, Synthesis of magnetic porous Fe3O4/C/Cu2O composite as an excellent photo-Fenton catalyst under neutral condition, Journal of Colloid and Interface Science, 475, 2016, p. 119-125 (Year: 2016).

ELECTROCHEMICAL REACTOR CELL

CROSS-REFERENCE TO RELATED APPLICATIONS

The present application is a Continuation of U.S. application Ser. No. 18/099,633, now allowed, having a filing date of Jan. 20, 2023, which is a Divisional of U.S. application Ser. No. 16/816,469, now U.S. Pat. No. 11,572,292, having a filing date of Mar. 12, 2020 which claims benefit of priority to U.S. Provisional Application No. 62/818,385, having a filing date of Mar. 14, 2019, which is incorporated herein by reference in its entirety. The present application is related to U.S. application Ser. No. 16/376,460, pending, having a filing date of Apr. 5, 2019 which is incorporated herein by reference in its entirety.

STATEMENT OF ACKNOWLEDGMENT

The inventors gratefully acknowledge the funding support of the Deanship of Scientific Research at King Fahd University of Petroleum and Minerals through project grant No. 151024.

STATEMENT REGARDING PRIOR DISCLOSURES BY THE INVENTOR(S)

The inventors, along with non-inventing co-authors, described information related to the present invention in *Sep. Purif. Techn.* 2019, 221, 408-420 by Nsubuga et al. (Nsubuga I) on Mar. 30, 2019, and *Environ. Sci. Pollut. Res.* 2019, 26, 14313 by Nsubuga et al. (Nsubuga II), on Mar. 12, 2019, each of which are incorporated by reference herein in its entirety.

BACKGROUND OF THE INVENTION

Field of the Invention

The present disclosure relates to cathode composites, such as copper—boron—ferrite (Cu—B—Fe) composites, particularly immobilized on graphite electrodes, e.g., in a silica-based sol-gel, as well as their in-situ electrogeneration of reactive oxygen species, $H_2O_2$ and $^{\cdot}OH$, suitable for the degradation of organic compounds, such as pharmaceutical beta blockers (e.g., atenolol and propranolol) in water.

Description of the Related Art

Classical homogeneous Fenton reactions based on advanced oxidation processes (AOPs) can be ecofriendly and non-selective, and are therefore appealing water treatment options for organic pollutants in water. Fenton reactions typically generate highly reactive hydroxyl ($^{\cdot}OH$) radicals capable of oxidizing recalcitrant and non-biodegradable organic pollutants to mineralization. The challenges associated with Fenton reactions include limited acidic working pH ranges of ~2 to 3, need for careful chemical handling, storage, and transportation, and Fenton dosing.

Broad acceptance of Fenton-based purification has been encumbered by high operational costs for maintaining appropriate homogeneous catalyst dosages, low pH restrictions, soluble catalyst removal requirements, and post-treatment acidic effluent neutralization needs. Solutions to these limitations have been attempted by integrating traditional electro-Fenton (EF) process with heterogeneous catalysis in heterogeneous electro-Fenton process (hEF).

An advantage of EF is its use of electrons to facilitate the oxidation of refractory organic pollutants across a wide pH range and without sludge formation. Other advantages include ease of catalyst recyclability and tolerance for integrated cathode electrodes permitting simultaneous Fenton and oxygen reduction reaction (ORR) activities. EF and hEF mainly involve in-situ $H_2O_2$ generation through ORR (Eq. 1, below) and on-the-spot $H_2O_2$ decomposition to $^{\cdot}OH$ radicals by a heterogeneous Fenton catalyst (Eq. 2). Resulting $^{\cdot}OH$ radicals react non-selectively with recalcitrant organic pollutants through electron transfer, dehydrogenation, and electrophilic addition reactions up to complete remediation.

$$O_2+2H^++2e^-\rightarrow H_2O_2 \quad \text{Eq. 1}$$

$$Fe^{2+}+H_2O_2\rightarrow Fe^{3+}+OH^-+HO^{\cdot} \quad \text{Eq. 2}$$

$$Fe^{3+}+H_2O_2\rightarrow Fe^{2+}+H^++HO_2^{\cdot} \quad \text{Eq. 3}$$

$$Fe^{3+}+e^-\rightarrow Fe^{2+} \quad \text{Eq. 4}$$

Recent research has sought hEF systems with improved ORR activities, Fenton catalyst electro-generation, re-use, and at low operational costs. Design and fabrication of hEFs must consider at least the cathode electrode material, reactor design, and Fenton catalyst type.

Most hEF studies have focused on suspended heterogeneous catalysts for enhanced ORR. A Fenton catalyst immobilized on an hEF cathode electrode can serve simultaneously as both a Fenton catalyst and recyclable electrocatalyst. Such immobilized catalysts may extend hEF operations over wider pH ranges, promote electrode re-use, and prevent cyclic catalytic addition/removal during treatment.

As shown in Equation 1, in situ $H_2O_2$ electro-generation is influenced by adequate oxygen/air supply and adsorption at an appropriate cathode material. A multifunctional cathode electrode in a hEF reactor should be capable of fast $H_2O_2$ production and high $^{\cdot}OH$ radical formation. Most reported methods for cathode electrode modification involve chemical, thermal and hybrid (composite) coatings.

Composite cathode electrodes like $Fe_3O_4/Fe/Fe_3C$ on a porous carbon nanofiber, $Fe_3O_4$ on graphite felt, and $Fe_3O_4/Fe_2O_3$ on activated carbon aerogel have been reported to show simultaneous $H_2O_2$ productivity and Fenton activity in the hEF process. The practical and longtime application of these composite cathode electrodes is limited by their complex fabrication procedures, porosity blockage during fabrication, agglomeration, and catalyst leaching. The formation of iron oxides on these electrode surfaces during modification is reported to increase electrode charge transfer resistance, decrease electrode longevity, and limit their electrical conductivity.

Electrode surface functionalization with transition metals has been attempted to enhance efficiency for simultaneous $H_2O_2$ electro-generation, decomposition to $^{\cdot}OH$ radicals, and $Fe^{2+}$ regeneration. Competing reactions that consume $^{\cdot}OH$ radicals can occur in hEF, necessitating cathodic modifications to enhance $H_2O^2$ production and prevent such parasitic reactions. Particularly, graphite has been used in cathode electrodes for EF degradation, rather than anodes. Graphite electrodes are low-cost, widely available, non-toxic, and highly conductive. Large-scale use of graphite cathode electrodes for long electrolytic treatment times has been limited by low specific surface area, poor chemical stability, and electrode fouling, especially during reuse.

Certain bimetallic (Fe—Cu) catalysts are known as stable and efficient heterogeneous EF catalysts relative to single supported Fe catalysts. Likewise, boron incorporation into the oxygen lattice vacancies during electrode modification can improve electrode thermal stability, recycling stability, and conductivity. However, most hEF experiments on fabricated electrolytic flow reactors aim to improve mass transfer kinetics and space-time treatment efficiency of target pollutant molecules. The beta blockers atenolol (ATE) and propranolol (PROP) can be seen as model pollutants, considered toxic, pseudo-persistent, resistant to removal by conventional wastewater treatment technologies and detectable in various aquatic environments at trace level concentrations.

Hydrolytic sol-gel chemistry is useful fabricating electrodes with enhanced surface characteristics like improved conductivity, chemical stability, surface area, surface particle homogeneity, and corrosion protection. In sol-gel processes, metallic ions can be incorporated into the fabrics of hybrid materials at low cost.

Several parameters influence EF degradation efficiency and improving the degradation efficiency. Response surface methodology (RSM) in combination with desirability function (DF) can be useful for analysis. Several efforts in the art towards the improvement of EF along these lines warrant mention.

WO 2016/056994 A1 by Cheng et al. (Cheng) discloses an electro-Fenton apparatus for decomposing organic, preferably aromatic, chemical compounds in polluted waste water, with at least one electrochemical cell having a cathode and an anode, wherein at least the cathode comes into contact with polluted waste water in use and is covered by at least one graphene layer having a nanoporous structure. Cheng describes a protective layer over the cathode between the graphene layer and the cathode preferably comprising a sintered powder of metals/oxides of Ti, Ta, Zr, Va, Nb, Hf, Al, Si, Sn, Cr, Mo, W, Pb, Mn, Be, Fe, Co, Ni, Pt, Pd, Os, Ir, Re, Tc, Rh, Ru, Au, Ag, Cd, Cu, Zn, Ge, As, Sb, Bi, B, Sc, lanthanide(s), and/or actinide(s). Cheng describes that commercial graphite sheet, carbon felt, or carbon foam do not provide satisfactory Fenton results. Further, Cheng does not teach selecting three elements, particularly not Cu, Fe, and B, nor embedding them in graphite.

US 2008/0107805 A1 by Palumbo et al. (Palumbo) discloses fine-grained, e.g., 1 to 1,000 nm, metallic coatings optionally containing solid particulates dispersed therein. Palumbo's materials are significantly harder and stronger than conventional coatings of the same chemical composition due to Hall-Petch strengthening and have low linear coefficients of thermal expansion (CTEs). Palumbo provides CTE matching means for a fine-grained metallic coating to the substrate by adjusting the composition of the alloy and/or by varying the chemistry and volume fraction of particulates embedded in the coating. Palumbo's coatings are suited for strong and lightweight articles, precision molds, sporting goods, automotive parts, and components exposed to thermal cycling. Palumbo discloses Al, Cu, Co, Ni, Fe, Mo, Pt, Ti, W, Zn, and Zr, particularly Fe alloyed with Co and/or Ni, but not particularly Cu, Fe, and B, nor oxides of these in silica sols on graphite.

CN 109161941 A by Zheng et al. (Zheng) discloses a method for improving corrosion resistance using sintered NdFeB copper composite graphene plating as a primer. Zheng's method involves: surface deoiling and deoxidizing on sintered NdFeB in deoiling liquid and organophosphorus acid liquid, and water washing under ultrasonic waves to obtain sample A;

putting sample A in an alkaline non-cyanide plating copper solution containing graphene, and under ultrasonic waves, codepositing Cu and graphene to obtain a Cu-graphene composite plating of certain thickness. The codeposition gives Cu plating with more refined grains than pure Cu plating, and the product has dewatering characteristics, so that Zheng's directly Cu-graphene composite plated sintered NdFeB is corrosion resistant. Zheng's material requires Nd and graphene, and focuses on corrosion resistance, rather than reactive oxide species generation.

US 2018/0076445 A1 by Xa et al. (Xa) discloses an electrochemically active material of formula $Si_uSn_vM1_wM2_x[P_{0.2}O_{0.8}]_y \cdot A_z$(I) where u, v, w, x, y, and z represent atomic % values and u to z sum to 100, M1 includes Ti, V, Cr, Mn, Fe, Co, Ni, Cu, Zr, B, an/or carbon, or alloys thereof, M2 includes Mg, Al, Ti, V, Cr, Mn, Fe, Co, Ni, Cu, Zn, and/or Zr, or alloys thereof, A is an inactive phase other than a phosphate or silicide, and $0<u<90$, $0\leq v<20$, $0<w<50$, $0<x<20$, $0<y<20$, and $0\leq z<50$. Xa's material is for an electrochemical cell, particularly with electrolytes comprising lithium, and Xa does not explicitly disclose combining Fe, Cu, and B, let alone for the purpose of generating reactive oxygen species.

CN 100505959 C by Li et al. (Li) discloses a method for reducing protecting layer and a device, combining impregnating and plating methods to treat a graphite electrode. Li uses a special device for wet impregnation, and the coat has better affinity for a graphite electrode, to reduce the consumption of graphite electrode. Li describes a protective layer which may contain 15 to 25 wt. % boric acid or 5 to 8 wt. % borate, $MoSi_2$, $TiO_2$, $Cr_2O_3$, and/or $Al_2O_3$, but does not describe combining Fe, Cu, and B, nor generating oxygen radicals.

Solar Energy 2016, 124, 242-253 by Garcia-Segura et al. (Garcia) discloses degrading oxalic acid (OXL) and oxamic acid (OXM) solutions in $Na_2SO_4$ at pH 3.0 by solar photolysis (SP), electro-Fenton (EF), and solar photoelectro-Fenton (SPEF). EF and SPEF experiments were performed with a stirred electrochemical cell containing a 3 $cm^2$ boron-doped diamond (BDD) anode and a 3 $cm^2$ air-diffusion cathode generating $H_2O_2$, with (cat) 0.50 mM $Fe^{3+}$ and/or $Cu^{2+}$ and a current density of 33.3 $mA/cm^2$. Garcia reports increased removal of OXM with $Cu^{2+}$ due to $^{\cdot}OH$ attacking Cu(II)-carboxylates and accelerating mineralization, while SPEF OXL destruction was enhanced with mixed $Fe^{3+}$ and $Cu^{2+}$ due to Fe(III)-oxalate photolysis and parallel Cu(II)-carboxylate mineralization by Fe(III)-aquo generated quantities of $^{108}$ OH. Garcia's system does not specifically combine Fe, Cu, and B in a sol, silica or otherwise, nor onto a graphite cathode, but instead uses copper and iron ions in solution with a BDD anode and an air-diffusion cathode.

*Surf. Coat. Techn.* 1996, 78 (1-3), 205-210 by Yin et al. (Yin) discloses Fe and/or Ni platings carried out potentiostatically on rotating disk electrodes, evaluating the effects of boric acid on the iron and nickel reduction rates. Yin reports that $B(OH)_3$ prevents electrode surface passivation on Ni reduction and selectively blocks the reduction of Ni but permits that of Fe at a retarded rate. Yin does not disclose a combination of B, Cu, and Fe, instead requiring Ni, and also fails to disclose Fenton reaction applications.

*Surf. Rev. Lett.* 2018, 25 (8), 1950025 by Maizi et al. (Maizi) discloses depositing Ni—Fe thin layers in $B(OH)_3$ and ionic liquid ([BuMePyr][$Tf_2N$]) baths. Maizi electroplates Ni—Fe alloy coatings on Cu substrates. Maizi's material has 55-90% Ni and 10-30% Fe in monophased thin layers containing a $Ni_3Fe$ phase. Maizi does not have a coating having boron, let alone with Cu, Fe, and B, but rather Ni—Fe electroplated onto copper substrates. Moreover, Maizi does not disclose graphite or a sol.

An inexpensive, simple, environmentally clean electro-Fenton (EF) process effective for effluent purification with high potential for in situ production of reactive oxygen species (ROS), such as $H_2O_2$ and $^{\cdot}OH$, under controlled applied current would be advantageous.

In light of the above, a need remains for effective materials suitable for EF reactions, particularly containing a mixture of elements, such as Cu, Fe, and B, especially as cathode coatings, e.g., on graphite cathodes and/or in a sol-gel (silica or otherwise) and methods of making and using such materials, cathodes, and electrochemical systems suitable for electro-Fenton reactions to degrade organic materials in water, such as β-blockers.

SUMMARY OF THE INVENTION

Aspects of the invention provide methods for making electrodes, which methods may comprise: applying a silica-based sol gel composite comprising copper, iron, and boron, onto a graphite electrode; and solidifying the sol gel, to obtain a graphite electrode comprising a coating comprising copper, iron, and boron, immobilized in a silica-based sol-gel. Inventive methods or articles described herein may be modified by any permutation of the features described herein, particularly the following.

The graphite electrode may be a sulfonated graphite electrode (SGE).

The electrode may be a cathode.

The silica-based sol gel may comprises at least 55 wt. % silica. The sol gel may comprise boron in a range of from 0.1 to 10 wt. %, based on total sol gel weight. The silica-based sol gel may comprise iron in a range of from 0.1 to 30 wt. %, based on total sol gel weight. The silica-based sol gel may comprise copper in a range of from 0.1 to 20 wt. %, based on total sol gel weight.

The silica-based sol may use silica derived from rice husks.

The silica-based sol gel may be prepared by a method comprising: treating an aqueous silicate solution with iron, copper, and boron; and gelling the sol. The boron may be in the form of boric acid and/or $BO_3^{3-}$, the silicate may comprise at least 75 wt. %, based on total silicates, of sodium silicate, the iron may be in the form of an iron(III) salt comprising $NO_3^-$, $Cl^-$, $Br^-$, $I^-$, $ClO_4^-$, $ClO_3^-$, $IO_3^-$, $SiF_6^{2-}$, and/or $SO_4^{2-}$, and/or the copper may be in the form of an copper(II) salt comprising $NO_3^-$, $Cl^-$, $Br^-$, $I^-$, $ClO_4^-$, $ClO_3^-$, $IO_3^-$, $SiF_6^{2-}$, and/or $SO_4^{2-}$. The aqueous silicate solution may further comprise a surface directing agent comprising, for example, glycerol and cetyltrimethylammonium bromide. The copper, iron, and boron may be provided in a single solution, and/or the single solution may comprise 1 to 5 M nitric acid, 5 to 30 wt. % iron, 5 to 15 wt. % copper, and 2.5 to 7.5 wt. % boron. The gelling may be brought about by adding a mineral acid to the silicate solution during and/or after contacting the silicate solution with the iron, copper, and boron.

Aspects of the invention comprise articles, comprising: a sulfonated graphite slab having a thickness in a range of from 1 to 10 mm; a coating, directly contacting the slab, comprising a silica-based sol gel, 0.5 to 30 wt. % iron (III), 0.5 to 10 wt. % copper (II), and 0.5 to 5 wt. % boron. The coating may comprise at least 5 wt. % iron (III), at least 2.5 wt. % copper (II), and at least 1.5 wt. % boron. The article may be a cathode.

Aspects of the invention include electrochemical cells, which may comprise: any permutation of the inventive article described herein in the form of a cathode; a boron-doped diamond anode comprising a layer of from 1 to 5 μm boron-doped diamond upon silica; and a supply of a gas comprising oxygen, wherein the cell is suitable to conduct an electro-Fenton reaction on one or more organic compounds in water, thereby at least 90% mineralizing the one or more organic compounds. The gas may be air or at least 50 vol. % oxygen gas.

Aspects of the invention involve methods, comprising: contacting an aqueous solution comprising an organic pharmaceutical, organometallic pharmaceutical, or organic dye compound with any permutation of the inventive article described herein, thereby degrading the organic pharmaceutical, organometallic pharmaceutical, or organic dye compound. The organic pharmaceutical, organometallic pharmaceutical, or organic dye compound may comprise a beta-blocker, and/or the water may a hospital waste water.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
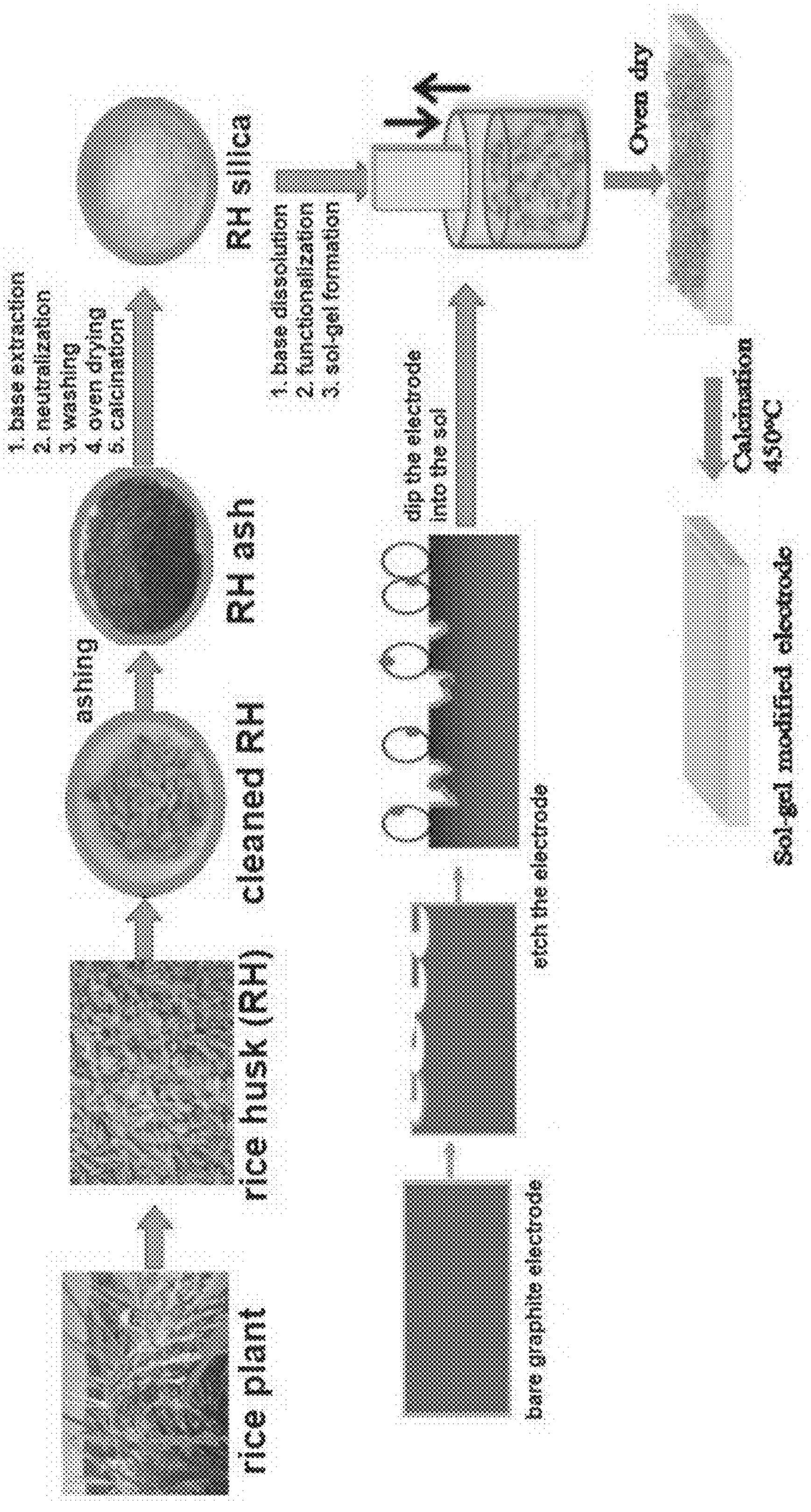
FIG. 1 shows exemplary fabrication steps for Cu—B—Fe graphite plate electrodes by sol-gel method within the scope of the invention.

Aspects of the invention provide methods for making electrodes, especially cathodes, which methods may comprise: applying a silica-based sol gel composite comprising copper, iron, and boron, onto a graphite electrode; and solidifying the sol gel, to obtain a graphite electrode comprising a coating comprising copper, iron, and boron, immobilized in a silica-based sol-gel. The sol gel may be applied by contacting the electrode with a solution and/or gel containing the sol, by spraying the sol onto the surface of the electrode, by spin coating the electrode, and/or by any other conventional method known in the art. The sol gel, once applied to the graphite electrode may be heated, baked, and/or calcined with the electrode at a temperature of, e.g., at least 300, 325, 350, 375, 400, 425, 450, 475, or 500 °C and/or up to 1000, 900, 800, 700, 650, 600, 550, 500, or 450 °C, for a period of, e.g., at least 0.5, 0.75, 1, 1.25, 1.5, 1.75, 2, 2.25, or 2.5 hours and/or up to 10, 8, 6, 5, 4, 3.5, 3, 2.5, or 2 hours. The graphite electrode may be a sulfonated graphite electrode (SGE), e.g., made by contacting a graphite plate with sulfuric acid (e.g., at least 0.5, 1, 1.5, 2, 2.5, 3, 3.5, or 4 M and/or up to 10, 9, 8, 7, 6, 5, 4.5, 4, 3.5, 3, or 2.5 M, or optionally 96% $H_2SO_4$) at an temperature above room temperature, e.g., at least 30, 35, 40, 50, 65, 75, or 85 °C and/or up to 150, 125, 110, 105, 100, or 95 °C, for a period of, e.g., at least 0.25, 0.5, 0.75, 1, 1.5, 2, 2.5, 3, 4, 6, 8, 12, 18, or 24 hours and/or up to 48, 36, 24, 20, 16, 12, 8, 6, 4, or 3 hours. The selection of copper, iron, and boron elements may be the only added ions (beyond inevitable trace elements) to the sol, e.g., these three elements may make out at least 75, 80, 85, 90, 91, 92, 92.5, 93, 94, 95, 96, 97, 97.5, 98, 99, 99.1, 99.5, 99.9, or 99.99 wt. % of a total weight of the added elements/ions to the sol gel. The solidification of the sol gel may preferably be brought about by thermal treatment, as described above, but may be supplemented or supplanted by photolytic treatment, e.g., such as irradiating with intensive UV, visible, IR, and/or solar irradiation (including consequential heating), and/or by chemical treatment, such as with one or more desiccants, e.g., phosphorous pentoxide, zeolites, and the like.

The silica-based sol gel may comprises at least 55, 60, 70, 75, 80, 85, 90, 95, 97.5, or 99 wt. % silica, rather than, e.g., aluminosilicates, magnesium silicates, or the like. The ions added may consist of or consist essentially of (e.g., not diminishing the reactive oxygen species generation by any more than 95%). The sol gel may comprise boron in a range of from 0.1 to 10 wt. %, based on total sol gel weight, e.g., at least 0.1, 0.25, 0.5, 0.75, 1, 1.5, 2, 2.5, 3, 4, or 5 wt. % and/or up to 10, 7.5, 6.67, 6, 5.5, 5, 4.5, 4, 3.5, 3.33, 3, 2, or 1 wt. % boron. The silica-based sol gel may comprise iron in a range of from 0.1 to 30 wt. %, based on total sol gel weight, 0.1, 0.25, 0.5, 1, 2, 3, 4, 5, 7.5, 10, 12.5, 15, 17.5, or 20 wt. % and/or up to 30, 27.5, 25, 24, 23, 22.5, 22, 21, 20, 17.5, or 15 wt. % iron. The silica-based sol gel may comprise copper in a range of from 0.1 to 20 wt. %, based on total sol gel weight, 0.1, 0.25, 0.5, 0.75, 1, 1.5, 2, 2.5, 3, 4, 5, 7.5, 10, or 12.5 wt. % and/or up to 20, 17.5, 15, 14, 13, 12.5, 12, 11, 10, 9, 8, 7.5, or 7 wt. % copper.

The silica-based sol may use silica derived from rice husks, though the silica may originate from purely industrial sources and/or alternate plant-based sources, in addition to or alternately to the rice husks.

The silica-based sol gel may be prepared by a method comprising: treating an aqueous silicate solution with iron, copper, and boron; and gelling the sol, e.g., by acidifying the silicate solution to a pH of at least 3, 3.5, 3.75, 3.8, 3.9, 3.95, 4, 4.1, or 4.25. The boron may be in the form of boric acid and/or $BO_3^{3-}$, the silicate may comprise at least 75, 80, 85, 90, 92.5, 95, 97.5, 98, 99, 99.1, 99.5, or 99.9 wt. %, based on total silicates, of sodium and/or potassium silicate, the iron may be in the form of an iron (III) salt comprising $NO_3^-$, $Cl^-$, $Br^-$, $I^-$, $ClO_4^-$, $ClO_3^-$, $IO_3^-$, $SiF_6^{2-}$, and/or $SO_4^{2-}$, preferably a nitrate or chloride, and/or the copper may be in the form of an copper (II) salt comprising $NO_3^-$, $Cl^-$, $Br^-$, $I^-$, $ClO_4^-$, $ClO_3^-$, $IO_3^-$, $SiF_6^{2-}$, and/or $SO_4^{2-}$, preferably a nitrate or chloride. The aqueous silicate solution may further comprise a surface directing agent comprising, for example, glycerol and cetyltrimethylammonium bromide, or as described below, e.g., a polyol and/or a fatty acid alkyl ammonium. The copper, iron, and boron may be provided in a single solution, and/or the single solution may comprise 1 to 5 M nitric or hydrochloric or sulfuric acid (e.g., at least 1, 1.5, 2, 2.5, 3, 3.5, or 4 M and/or up to 8, 6, 5.5, 5, 4.5, 4, 3.5, 3, or 2.5 M), 5 to 30 wt. % iron, 5 to 15 wt. % copper, and 2.5 to 7.5 wt. % boron (or any other percent described herein). Preferably, all of the ions are provided in a single acidic solution, which may be added to the sol solution, thereby concurrently bringing about a gelation, though the application of the ions and/or the acid may also be conducted individually or by incomplete combinations. The gelling may be brought about by adding a mineral acid to the silicate solution during and/or after contacting the silicate solution with the iron, copper, and boron.

Aspects of the invention comprise articles, comprising: a sulfonated graphite slab having a thickness in a range of from 1 to 10 mm, e.g., at least 1, 2, 3, 4, or 5 mm and/or up to 10, 9, 8, 7, 6, 5, or 4 mm; a coating, directly contacting the slab, i.e., with no intervening protective and/or functional layers, the coating comprising a silica-based sol gel, 0.5 to 30 wt. % iron (III), 0.5 to 10 wt. % copper (II), and 0.5 to 5 wt. % boron. The coating may comprise at least 5, 7.5, 10, 12.5, or 15 wt. % iron (III), at least 2.5, 3.3, 5, 6.67, or 7.5 wt. % copper (II), and at least 1.5, 2, 2.5, 3, or 3.33 wt. % boron (or any percentage of Cu, Fe, and/or B described herein). The article may preferably be a cathode.

Reactions and reactors according to the invention can be a batch arrangement like that disclosed in the drawings, or any of those disclosed, for example, in Zhou, M., Oturan, M. A., Sirés, I. *Electro-Fenton Process: New Trends and Scale-Up* Singapore: Springer, 2018*, Chemosphere* 2018, 199, 251-255, WO 2016/056994 A1, Peralta-Hernández, J. M., Rodrigo-Rodrig, M. A., Martínez-Huitle, C. A. *Evaluation of Electrochemical Reactors as a New Way to Environmental Protection Kerala*: Res. Signpost, 2014 September. *Purif. Techn.* 2019, 208, 76-82*, Sep. Purif. Techn.* 2012, 99, 8-13*, J. Hazard. Mater.* 2008, 156 (1-3), 421-427*, Desalination* 2012, 299, 1-15*, Water Res.* 2000, 34 (17), 4243-4249*, Chem. Eng. J.* 2016, 298, 55-67*, Chem. Eng. J.* 2005, 111 (1), 63-70, each of which is incorporated by reference herein in its entirety. Any technically feasible combination of the features of such reactors may be implemented with inventive materials and processes. Aspects of the invention include electrochemical cells (i.e., batch and/or flow reactors), which cells may comprise: any permutation of the inventive article described herein in the form of a cathode; a boron-doped diamond anode comprising a layer of from 1 to 5 μm (at least 1, 1.5, 2, 2.25, 2.5, 2.75, 2.85, 3, 3.1, or 3.25 μm and/or up to 5, 4.5, 4, 3.8, 3.7, 3.6, 3.5, 3.33, 3.25, 3.2, 3.1, 3, 2.9, 2.8, or 2.67 μm) boron-doped diamond upon silica; and a supply of a gas comprising oxygen, wherein the cell is suitable to conduct an electro-Fenton reaction on one or more organic compounds in water, thereby at least 90, 91, 92, 92.5, 93, 94, 95, 96, 97, 97.5, 98, 99, 99.1, 99.5, or 99.9% mineralizing, i.e., turning into inorganic material(s) such as $CO_2$ and/or carbonates, the one or more organic compounds (which may be any of those described herein, particularly below). The gas may be air or at least 50, 60, 70, 75, 80, 85, 9090, 91, 92, 92.5, 93, 94, 95, 96, 97, 97.5, 98, 99, 99.1, 99.5, or 99.9 vol. % $O_2$ gas.

Aspects of the invention involve methods, comprising: contacting an aqueous solution comprising an organic pharmaceutical, organometallic pharmaceutical, or organic dye compound with any permutation of the inventive article described herein, thereby degrading the organic pharmaceutical, organometallic pharmaceutical, or organic dye compound. The organic pharmaceutical, organometallic pharmaceutical, or organic dye compound may comprise a beta-blocker or any other type of pharmaceutical produce as described below and/or chemical, paper, dye, wood, adhesive, etc., manufacturing byproduct not exclusively consisting of inorganic compounds, and/or the water may a hospital waste water, or that of chemical, paper, dye, etc. manufacturing, whereby the organic material is substantially or completely soluble in the water. The sufficiency of the method may be shown in that it can degrade persistent organic compounds, i.e., those which do not naturally decompose within a period of 1, 2, 3, 4, 5, or 6 days or 1, 2, 3, 4, 5, or 6 weeks (or more) under normal ambient outside conditions. The inventive arrangement is suitable to conduct degradation by Fenton reaction at a pH of up to 2.5, 3, 3.5, 4, 4.5, 5, 5.5, 6, 6.5, 7, or 7.5.

Aspects of the invention provide methods and devices for the degradation of organic compounds, even persistent compounds, including β-blockers, using a Cu—B—Fe supported graphite cathode electrode, preferably in combination with a droplet flow-assisted heterogeneous electro-Fenton system. Different Cu—B—Fe composites fall within the scope of the invention, which may be synthesized and immobilized on the treated graphite electrodes (X-SMGE) via a silica-based hydrolytic sol-gel method, optionally based on rice husk silica. Based on total sol-gel composite weight, inventive composites may have, e.g., at least 2.5, 5, 7.5, 10, 12.5, 15, 17.5, 20, 22.5, 25, 27.5, or 30 wt. % iron (metallic or ionic, e.g., $Fe^{3+}$) and/or up to 50, 45, 40, 35, 30, 25, 22.5, 20, 17.5, or 15 wt. % iron, and/or at least 1, 2, 3, 4, 5, 6, 7.5, 10, 12.5, or 15 wt. % copper (metallic or ionic, e.g., $Cu^{2+}$) and/or up to 25, 22.5, 20, 17.5, 15, 12.5, 10, 8, 6, or 5 wt. % copper, and/or at least 0.5, 1, 1.5, 2, 2.5, 3, 3.5, 4, 4.5, 5, 6, or 7.5 wt. % boron (elemental or ionic, e.g., $B^{3+}$) and/or up to 12, 11, 10, 9, 8, 7, 6, 5, or 4 wt. % boron. While the elements, Cu, Fe, and B, may be described as particular ions herein, any of these elements may be equilibrating between any attainable oxidation state, including elemental ground state, or a mixture of any of these states.

The presence of Cu, B and Fe in and/or on the surface of treated graphite electrodes can be characterized, e.g., through SEM-EDS elemental mapping composition. The C, B, and Fe may be substantially uniformly dispersed within the graphite electrodes surface matrix, or it may be localized in patches, either by individual metal or by combinations of metals.

Functionalized, inventive cathode electrodes can degrade β-blockers via reactive oxygen species generation and reach degradation efficiencies (%), e.g., of at least 90, 91, 92, 92.5, 93, 94, 95, 96, 97, 97.5, 98, 99, 99.1, 99.5, 99.9% or more. The efficacy of the degradation may be influenced by parameters including pH, substrate (for degradation) concentration, current amperage, temperature, or the like. At desirable conditions, a 99.99% degradation efficiency with a desirability value of 0.98995 was obtained even at neutral pH (pH=7). Since the sample pH was closer to 7.0, all the validation experiments were conducted without pH adjustment, and this resulted in ≥99.9% degradation efficiency for both PROP and ATE. Modified graphite electrodes can exhibit more active surface characteristics for simultaneous in situ $H_2O_2$ electro-generation, $^{\cdot}OH$ production, and/or catalysts regeneration than electrodes lacking one or more of Cu, Fe, B, graphite, or the silica sol. Enhanced (β-blocker) degradation efficiencies can result from a synergistic contribution of a DFEF reactor, inventive cathodes, and/or anodic oxidation by a BDD anode. The reusability and stability of the inventive cathode (20-SMGE) to cycling may maintain 90, 92.5, 95, 96, 97, 98, 99, or even 99.5% of its degradation efficiency after up to 15, 20, 25, 30, 35, 40, 45, 50, 60, 75, or 100 cycles. Aspects of the invention provide cleaner and highly efficient droplet-flow-assisted hEF systems utilizing a low cost integrated cathode with automatic sample pH regulation. Aspects of the invention comprise removal of trace level refractory organic pollutant from complex environmental water matrices, such as wastewaters from chemical plants, hospitals, textile dying facilities, paper plants, etc., and the volume flux may be at least 1, 5, 10, 15, 20, 25, 50, 75, 100, 150, 250, or 500 L/s.

Aspects of the invention provide copper—boron—ferrite (Cu—B—Fe) supported graphite electrodes, which may be used as integrated cathode electrodes, e.g., for droplet-flow assisted heterogeneous electro-Fenton (DFEF) degradations, including of beta-blockers, for example, in hospital wastewater, even at trace levels. Inventive Cu—B—Fe composites may be immobilized on bare graphite electrodes, e.g., using rice husk silica-based hydrolytic sol-gel methods. Aspects of the invention include synergistic use of DFEF with integrated cathode electrodes for electro-generation of $H_2O_2$ and production of $^{\cdot}OH$ radicals, each of which may be quicker and/or continuous. Aspects of the invention include improving operating parameters on degradation efficiencies, optionally using response surface methodology, e.g., based on a central composite design with desirability function. Aspects of the invention comprise improving the stability of (integrated) cathode electrodes, particularly for multiple re-uses, over known, comparable electrodes. Aspects of the invention involve combining a Fenton reaction system, particularly droplet flow-assisted heterogeneous electro-Fenton reactor (DFEF), with liquid chromatography-tandem mass spectrometry (LC-MS/MS) analysis for monitoring, prediction, and/or identification of even trace levels of organic contaminants and/or their degradation products in water, such as hospital wastewater.

Exemplary beta blockers subject to degradation may include acebutolol hydrochloride (Sectral), atenolol (Tenormin), betaxolol hydrochloride (Kerlone), bisoprolol fumarate (Zebeta), carteolol hydrochloride (Cartrol), esmolol hydrochloride (Brevibloc), metoprolol (Lopressor, Toprol XL), penbutolol sulfate (Levatol), nadolol (Corgard), nebivolol (Bystolic), pindolol (Visken), propranolol (Inderal, InnoPran), timolol maleate (Blocadren), sotalol hydrochloride (Betapace), carvedilol (Coreg), and/or labetalol hydrochloride (Trandate, Normodyne), though the class of pharmaceutical (or other organic contaminant in water) subject to degradation is generally unlimited. Further examples of classes of drugs subject to degradation may include antipyretics, analgesics, antimalarials, antibiotics, antiseptics, anticoagulants, antidepressants, anticancer drugs, antiepileptics, antipsychotics, antivirals, sedatives, antidiabetic, hormone replacements, oral contraceptives, stimulants, tranquilizers, statins, or mixtures of two or more of any of these. Beyond beta blockers, relevant compound classes may include 5-alpha-reductase inhibitors, angiotensin II receptor antagonists, ACE inhibitors, alpha-adrenergic agonists, dopamine agonist, dopamine antagonist, incretin mimetics, nonsteroidal anti-inflammatory drugs-cyclooxygenase inhibitors, proton-pump inhibitors, renin inhibitors, selective glucocorticoid receptor modulators, selective serotonin reuptake inhibitors, or mixtures of two or more of any of these. Biopharmaceuticals, such as antibodies, proteins, nucleotide sequences/splices, etc., may also be degraded.

The impregnation of the sol gel may be achieved, during the fabrication of the silica from a solution comprising silicate(s) and copper, boron, and/or iron ions, e.g., including a structure directing agent that may comprise, for example, polyol(s) such as glycerol, ethylene glycol, erythritol, PEG, and/or PVA, and/or surfactant(s) including, e.g., fatty acid ammonium halide(s) as described herein (examples: cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB)), or fatty acid sulfates, carboxylates, sulfonates, (examples: sodium lauryl sulfate, ammonium lauryl sulfate, 3-[(3-cholamidopropyl)dimethylammonio]-1-propanesulfonate, 4-(5-dodecyl)benzenesulfonate, sodium stearate, dioctyl sodium sulfosuccinate, sodium myreth sulfate, sodium laureth sulfate).

Inventive materials are suitable to conduct EF reactions without increasing electrode charge transfer resistance, decreasing electrode longevity, and limit electrical conductivity, e.g., by any more than 15, 10, 7.5, 5, 4, 3, 2, 1, or 0.5%, relative to boron-free electrodes. Inventive materials need not contain nitrides, carbides, and or self-lubricating materials, such as $MoS_2$ or fluoropolymers (e.g., PTFE, PVDF, PHFP, etc.), particularly no metal oxides of Al, Co, In, Mg, Ni, Si, Sn, V, and/or Zn, nitrides of Al, B, and/or Si, and/or carbides of B, Cr, Bi, Si, and/or W may comprise no more than 15, 10, 7.5, 5, 4, 3, 2, 1, or 0.5 wt. %, relative to the total (non graphite) material weight, of any of these, alone or in combination. Inventive materials need not contain Al, Co, Ni, Mo, Pt, Ti, W, Zn, Zr, Ti, Ta, Va, Nb, Nd, Ce, Pr, Sm, Hf, Sn, Cr, Pb, Mn, Be, Pd, Os, Ir, Re, Tc, Rh, Ru, Au, Ag, Cd, Cu, Zn, Ge, As, Sb, Bi, Sc, lanthanide(s), and/or actinide(s), and may contain no more than 5, 4, 3, 2.5, 2, 1, 0.5, 0.1, 0.01, 0.001, 0.0001, or 0.00001 wt. %, relative to total (non graphite) material weight, of any of these, alone or in combination. Inventive materials need not contain graphene, carbon felt, carbon foam, fullerenes, diamond, and/or nanotubes as its carbon material, or may have no more than 5, 4, 3, 2.5, 2, 1, 0.5, 0.1, 0.01, 0.001, 0.0001, or 0.00001 wt. %, relative to total carbon material weight, of any of these, alone or in combination. Inventive materials need not contain silicide(s), boride(s), aluminide(s), and/or nitride(s), e.g., FeSi, $FeSi_2$, $CrSi_2$, $NiSi_2$, $CoSi_2$, $TiSi_2$, $Cu_3Si$, $ZrSi_2$, MoSi, $MoSi_2$, TiC, SiC, $TiB_2$, TiN, $FeAl_3$, $TiAl_3$, or may have no more than 5, 4, 3, 2.5, 2, 1, 0.5, 0.1, 0.01, 0.001, 0.0001, or 0.00001 wt. %, relative to total (non-graphite) material weight, of any of these, alone or in combination.

Hardnesses of the inventive materials may be, for example, up to 100, 95, 90, 85, 75, 65, 50, or 40 on Vickers scale. Inventive materials do not need to be magnetic, and may preferably be non-magnetic. Inventive cathodes generally have no electrochemically inactive phase and/or buffer more than 25, 20, 15, 10, or 5 vol. % of the inventive coating. Inventive systems need not contain polyethylene oxide, polytetrafluoroethylene, fluorine-containing copolymers, ethylene carbonate (EC), diethyl carbonate (DEC), dimethyl carbonate (DMC), ethyl methyl carbonate (EMC), propylene carbonate, fluoroethylene carbonate (FEC), tetrahydrofuran (THF), acetonitrile, $LiPF_6$, $LiBF_4$, $LiClO_4$, lithium bis(oxalato) borate, $LiN(CF_3SO_2)_2$, $LiN(C_2F_5SO_2)_2$, $LiAsF_6$, and/or $LiC(CF_3SO_2)_3$, or may have no more than 5, 4, 3, 2.5, 2, 1, 0.5, 0.1, 0.01, 0.001, 0.0001, or 0.00001 wt. %, relative to total (non-graphite) material weight, of any of these, alone or in combination.

EXAMPLES

Cu—B—Fe composites were immobilized with hydrolytic sol-gel on treated graphite electrodes and characterized. The electrodes were then investigated for suitability as cathodes for oxygen reduction reaction (ORR) via $H_2O_2$ electro-generation and for degradation efficiency (%) using a fabricated DFEF system. Response surface methodology (RSM), based on a central composite design with desirability function, was used in both experimental design and improvement.

Electrode Preparation

Graphite Electrode Modification with Cu—B—Fe Via Hydrolytic Sol-Gel Method

Analytical grade chemicals were used as received herein. High purity graphite plate electrodes (100 mm×100 mm×4 mm, Shanghai Qijie Limited Co., China) was used as a catalyst support. A graphite plate was cut into rectangular plates of dimensions 2.0 cm×2.0 cm, polished with an ultrafine grit emery sheet, and then dipped in 3.0 M sulfuric acid at 100 °C for 3 hours. (This is believed to have improved the electrode porosity and introduced some oxygen functionalities onto the electrode surface.) The electrodes were then rinsed in ultrapure water until a neutral pH was reached, then the electrodes were ultra-sonicated in acetone for 10 minutes to ensure no unbound particles attached on the electrode. The electrodes were then oven dried at 100 °C for 5 hours to prepare the sulfonated graphite electrodes (SGE) for sol-gel modification.

A typical sol-gel synthesis procedure for preparing Cu—B—Fe composite from rice husk silica before graphite electrode functionalization is described in *J. Chromatogr. A.* 2018, 1554, 16-27, which is incorporated by reference herein in its entirety, but with some modification, Milled rice husk (50 g) from Kerala, India, was washed in 500 mL of 3.0 wt. % sulfuric acid solution at 80 °C for 3 hours under constant stirring. The acidified milled rice husk was then filtered, washed with deionized water until pH neutral, then oven dried at 110 °C for 8 hours. The samples were then calcined in a muffle furnace at 700 °C for 5 hours to obtain rice husk ash (RHA).

RHA (2.0 g) was then dissolved in 250 mL of 1.0 M NaOH at 80 °C under constant stirring for 5 hours. Undissolved residues were sieved out to obtain a clear sodium silicate ($Na_2SiO_3$) solution. To 15 mL of the $Na_2SiO_3$ solution were added glycerol and cetyltrimethylammonium bromide (CTAB) as surface directing reagents, each 3 wt. %, and the resulting mixture stirred at 60 °C until dissolution. Glycerol and CTAB were used to further increase the functional moieties in the silicate solution for anchoring loaded metals and boron.

Under constant stirring conditions, the resultant solution was slowly titrated with 3.0 M $HNO_3$ containing proportions of iron (III) nitrate nonahydrate, $Fe(NO_3)_3 \cdot 9H_2O$, corresponding to 10, 20, and 30 wt. % Fe, copper-II-nitrate trihydrate, $Cu(NO_3)_2 \cdot 3H_2O$, corresponding to 10 wt. % Cu, and boric acid, B(OH) 3, corresponding to 5 wt. % B, until gelation at a pH 4.0. After establishing the desired loading ratios, the gels were aged in an oven at 60 °C for 5 hours and then centrifuged. The centrifuged material was rinsed with copious amounts of double distilled water, then dispersed into 150 mL of double distilled water.

The already-prepared graphite plate electrodes were dipped into the dispersed gels and dried in an oven at 100 °C after the dipping cycle for 10 minutes. The electrode dipping and drying cycles were repeated 3 times before a final annealing for 2 hours in a muffle furnace at 450 °C. The modified electrodes were marked as bare graphite electrode (BGE) or sol-modified graphite electrode (SMGE), including 10-SMGE for 10% $Fe^{3+}$ of Cu—B—Fe loading on BGE, 20-SMGE for 20% $Fe^{3+}$ of Cu—B—Fe loading on BGE, and 30-SMGE for 30% $Fe^{3+}$ of Cu—B—Fe loading on BGE. An example of the graphite electrode fabrication procedure is depicted in FIG. 1.

Electrode Characterization

The electrochemical performance of the modified electrodes was evaluated using cyclic voltammetry (CV) at a scan rate of 0.1 mV/s, at 0 to 1V and room temperature, using an electrochemical workstation (CHI1140A, CH Instruments Inc., Austin, TX, USA). A three electrode system including a 1 $cm^2$ graphite plate electrode—bare or modified—as a working electrode, a platinum wire as an auxiliary electrode, and an Ag/AgCl (in 3M KCl) reference electrode constituted the electrochemical cell. The supporting electrolyte was 10 mM $K_4Fe(CN)_6$ in 1.0 M $KNO_3$. A 1 $cm^2$ graphite plate was used as the substrate electrode for sol-gel deposition. The graphite plates are generally unlimited in size, and may be, for example, at least 0.25, 0.5, 0.75, 1, 1.5, 2, 4, 5, 9, 10, 16, or 25 $cm^2$ and/or up to 500, 400, 350, 300, 250, 225, 200, 175, 150, 125, 100, 90, 81, 75, 64, 49, 36, or 25 $cm^2$.

The electrodes surface texture was analyzed using atomic force microscopy (AFM)/scanning probe microscopy in contact mode. The tip used had the following specifications, silicon nitride probes, with a radius of 20 to 60 nm, and a manufacturer force specified constant (K) of 0.12 N/m. The electrodes friction coefficient (before and after modification) used a linear micro-scratch tester (MCTX-S/N: 01-04300). The contact load settings ranged from 0.0025 to 0.1 N. Other analytical parameters included a 0.01 N/s loading rate, 5 mm/min scanning speed, and 1 mm scratch depth.

A Lab Ram HP Evolution Raman spectrometer equipped with an internal HeNe (<20 mW) laser at an excitation wavelength of 633 nm was used to record the Raman spectra. The objective microscope lens of 10× supported on a spectrograph of focal length 800 mm and 600 gr/mm grating was applied to focus the laser beam. The signal detected on a 1024×256 pixel, TE-cooled CCD detector for UV-vis-NIR with an acquisition time of 25 seconds and accumulation of 2 seconds.

The electrode surface morphological features resulting from multifunctional hybrid sol-gel coating were monitored using a scanning electron microscope (SEM) using a JEOL JSM-6610 LV instrument and energy dispersive x-ray spectroscopy (EDX) at 20.0 kV.

X-ray photoelectron spectroscopy (XPS) was used to investigate the chemical composition of the multifunctional sol-gel coating deposited on the graphite electrodes. A Thermo Scientific Escalab 250Xi spectrometer employing a monochromatic Al-Kα (1486.6 eV) x-ray source and operating at a resolution of 0.5 eV was used in the analysis. A takeoff angle of 45 °C and spot size of 200 μm were used in all measurements. Clean gold surfaces with Au $4f_{7/2}$ at 83.98 eV was used to calibrate the system's binding energy scale. A carbon core level peak (C 1s) at 284.5 eV±0.2 eV used as a reference peak for all measurements.

Catalytic Evaluation of Inventive Cathode Electrodes in A DFEF Reactor

The degradation efficiency of a hEF system for refractory organic pollutants generally depends on its potential for fast and continuous production of highly oxidizing ·OH radicals. However, the quantification of ·OH radicals during EF operations is limited by their short lifetime ($3.7\times10^{-9}$ s). Hence, the measurement of both $H_2O_2$ generation and degradation efficiencies (%) is considered an indirect technique for ·OH radicals determination.

Figure 2:
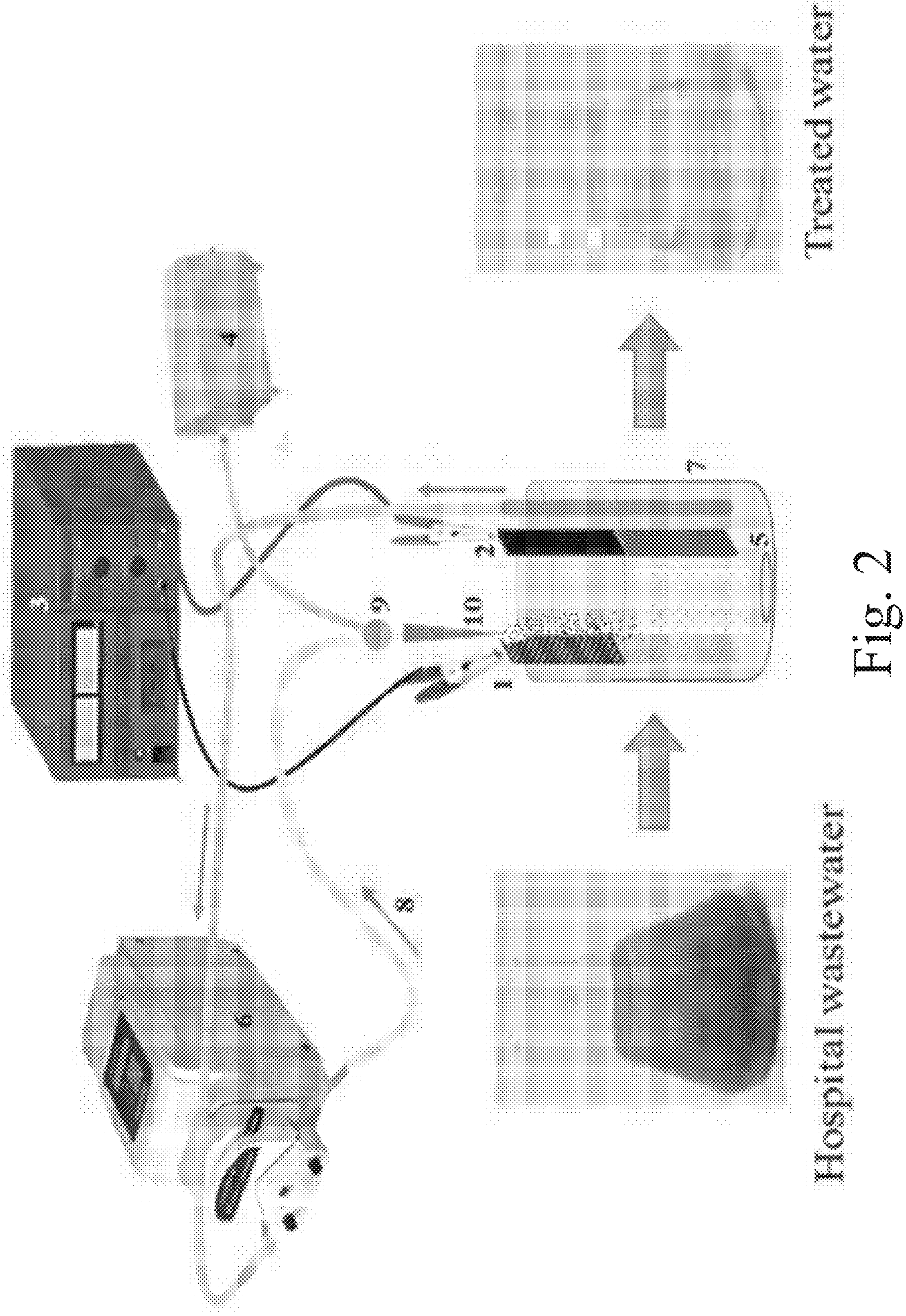
FIG. 2 shows a schematic diagram of an exemplary droplet flow-assisted electro-Fenton reactor, useful as described herein.

The $H_2O_2$ electro-generation studies were conducted in a continuous flow reactor, shown in FIG. 2, designed to suit a droplet flow-assisted heterogeneous electro-Fenton system (DFEF). The exemplary reactor included a 0.5 L undivided cylindrical shaped glass cell, a peristaltic pump, and air pump. The air pump was connected to a continuous sample flow system to ensure continuous air-saturation at the cathode electrode in the form of droplet spray. The system was first run (warmed up) for 5 minutes before electrolysis experiments.

The graphite cathode electrodes used in this study denoted as bare graphite electrode (BGE) and x wt. % Fe sol-gel modified graphite cathode electrode (SMGE), e.g., 10-SMGE, 20-SMGE, and 30-SMGE (each with a surface working area of 4 $cm^2$). As in the case of the graphite plates, the size of the SMGEs is generally unlimited, and may be, for example, at least 0.25, 0.5, 0.75, 1, 1.5, 2, 4, 5, 9, 10, 16, 25, 36, 49, or 64 $cm^2$ and/or up to 500, 400, 350, 300, 250, 225, 200, 175, 150, 125, 100, 90, 81, 75, 64, 49, 36, or 25 $cm^2$.

A boron-doped diamond (BDD) 2.75 μm thin layer, Si/BBD, from NeoCoat, Switzerland, was used as an anode electrode. Thickness of the BDD anode may be, for example, at least 0.5, 0.75, 1, 1.25, 1.5, 1.75, 2, 2.25, 2.5, 2.75, 3, 3.25, 3.5, 3.75, or 4 μm and/or up to 10, 9, 8, 7, 6.5, 6, 5.5, 5, 4.5, 4, 3.5, or 3 μm. The inter-electrode gap was maintained at 2 cm while a 1 cm distance was reserved from the bottom of the reactor. A reactor contained a 0.21 L sample solution containing 0.02 M sodium sulfate as an inert supporting electrolyte. The sample solution pH was adjusted using 3 M sulfuric acid and 1 M sodium hydroxide. The electric field was supplied and monitored by a DC power source from Sargent Welch Scientific, equipped with a Fluke digital multimeter.

To evaluate the removal efficiencies of the β-blockers atenolol (ATE) and propranolol (PROP), a concentration of 200 ng/mL was used while $H_2O_2$ evolution experiments conducted in the absence of β-blockers standards. Relevant concentrations of organic materials for degradation may be, for example, at least 10, 25, 50, 75, 100, 150, 200, 250, 500, 1000, 5000 or 10000 ng/mL and/or up to 100, 75, 50, 25, 15, 10, 5, 2.5, 1, 0.5, 0.25, 0.1, or 0.01 mg/mL. Samples were always periodically withdrawn from the electrolytic reactor at predefined times, filtered using polyethersulfone syringe filters (0.2 μm pore size) before LC-MS/MS analysis. To identify the degradation intermediates, 210 mL sample solutions with 200 mg/L of the mixed β-blocker (ATE and PROP) standard solution was saturated with $Na_2SO_4$ and degraded at 25 °C for 1 hour and at 100 mA. Atenolol (ATE) and propranolol (PROP) purchased from Sigma-Aldrich (St. Louis, USA) were used to prepare 1000 mg/L of standard stock solution using methanol and was later stored in at −4 °C in a refrigerator. Hospital wastewater used was from a medical facility at the King Fahd University for Petroleum and Minerals (KFUPM).

Analytical Methods

The degradation of the β-blockers, atenolol (ATE) and propranolol (PROP), were conducted using the experimental set-up depicted in FIG. 2. As a result of cathode modifications in a DFEF system, the cathodic oxygen electroreduction reactions (ORR) and Fenton activity may be simultaneously be enhanced, leading to improved β-blockers degradation efficiencies.

The EF degradation efficiency (%) was evaluated using the sample concentration of ATE and PROP measured before and after degradation. Equation 5, below, was used to monitor the degradation process.

$$\text{Degradation efficiency} = \left(1 - \frac{B_i}{B_O}\right) \times 100, \quad \text{Eq. 5}$$

wherein B and $B_0$ represent β-blocker concentrations at time (t) and (0), respectively.

The degradation process for trace β-blockers in hospital waste water was monitored on a Shimadzu LCMS-8050 ultra-high-performance liquid chromatography-triple quadrupole mass spectrometer, using a method developed in *J. Chromatogr. A* 2018, 1554, 16-27, incorporated by reference in its entirety herein. Data processing was carried out using Shimadzu LabSolutions LCMS Ver.5.91 (Kyoto, Japan) and an Ultra IBD column (100×2.1 mm×3 μm particle size (PA, USA) used in chromatographic separation. The column temperature was set at 40±1 °C while the injection volume was 10 μL. Gradient elution program at a flow rate of 0.3 mL/min was executed using 0.03% formic acid (solvent A) and methanol/acetonitrile, 25:75 (solvent B), 7 minutes of analysis time, $N_2$ as a desolvation gas (flow rate=800 L/h), argon (99.9995% pure) as the collision gas, a desolvation temperature of 400 °C, and a source temperature of 150 °C. The target analytes were detected and quantified in multiple reaction monitoring (MRM, positive/negative ionization) mode using an electrospray LC-MS/MS technique. For reaction intermediate identification, a total ion scan first conducted at a scan mass range of 100 to 600 (m/z) followed by a product scan, for each identified reaction intermediate, and was finally subjected to multiple reaction monitoring modes.

Hydrogen peroxide ($H_2O_2$) electro-generation was monitored by UV-vis spectrophotometer using a potassium titanium (IV) oxalate method reported in *Analyst* 1980, 105, 950-954. Before the analysis, 2 mL of withdrawn sample, containing $H_2O_2$, were shaken with 1 mL of titanium (iv) oxysulfate-sulfuric acid (27-31% $H_2SO_4$, Sigma Aldrich). The development of an intense yellow complex of the pertitanic acid complex was monitored at a wavelength of 400 nM. The current efficiency for $H_2O_2$ electro-generation was calculated using Equation 6.

$$CE(\%) = \frac{nFC_{H2O2}V}{\int_0^t I dt} \times 100, \quad \text{Eq. 6}$$

wherein CE is the current efficiency, $C_{H2O2}$ is the concentration of $H_2O_2$ generated in mol/L, F is Faraday's constant (96486 C/mol), n is the number of electrons transferred, i.e., $O_2$ reduction to $H_2O_2$, V is the volume of the working solution in L, t is the time in seconds, and I is the current in amperes.

Experimental Design Using Response Surface Methodology

A Minitab 17 from Minitab Inc. (State College, PA, USA) was used in the statistical experimental design, data modeling, analysis, and analysis of the DFEF degradation process. Experimental design was aimed at estimating experimental error, eliminating systematic errors, and reducing the number of experiments to improve the process. With this approach, the relative significance of various factors may be estimated even in the presence of complex interactions.

Central composite design (CCD) based on response surface methodology (RSM) was used in designing DFEF process experiments and selection of suitable operational parameters. Central composite design (CCD) is may offer adequate second-order RSM for construction of five level fractional factorial designs (−α,−1, 0, +1, +a). Four factors were selected, including sample pH, electrolysis time (min), applied current (mA), and beta blocker concentration [β-blocker]$_0$, which were considered significant parameters affecting the degradation efficiency. Corresponding CCD design matrix, levels, ranges, are presented in Table 2, below.

TABLE 2

Experimental factors and levels of the CCD used in β-blockers degradation experiments

| Variable | Ranges and levels | | | | |
|---|---|---|---|---|---|
| | −2 | −1 | 0 | 1 | 2 |
| $X_1$(ng mL$^{-1}$) [β-blocker conc.]$_0$ | 200 | 400 | 600 | 800 | 1000 |
| $X_2$ (mg L$^{-1}$) Catalyst | 23.8 | 71.4 | 119 | 166.7 | 214.3 |
| $X_3$ (mA cm$^{-2}$) Current density | 25 | 50 | 75 | 100 | 125 |
| $X_4$ (min) Electrolysis time | 5 | 10 | 15 | 20 | 30 |
| $X_5$, pH | 3 | 4 | 5 | 6 | UN |

experimental runs randomly generated for the experiment comprised 6 center point replications, 8 axial points, and 16 cube points. Equation 7, below, was used in coding independent variables ($X_i$) and these were represented as $x_i$ for statistical calculations.

$$x_i = \left(\frac{X_i - X_o}{\delta X}\right), \quad \text{Eq. 7}$$

wherein δX is the step change while $X_o$ is the amount of $X_i$ at the center point.

The dependent variables, percent (%) degradation efficiencies (% DE), and independent variables were correlated using the second order polynomial set forth below in Equation 8.

$$\%\ DE = b_o + \sum_{i=1}^{k} b_i X_i + \sum_{i=1}^{k} b_{ii} X_i^2 + \sum_{1 \le i \le j}^{k} b_{ij} X_i X_j, \quad \text{Eq. 8}$$

wherein $b_i$ is the linear regression coefficient, $b_{ii}$ is the squared regression coefficient, $b_{ij}$ is the interaction regression coefficients, % DE is the response variable representing percent degradation efficiency, and $x_i$ is the coded variable experimental levels.

The experimental response values are reported herein as mean values of the three repeated experiments for each data entry. Analysis of variance (ANOVA) was used in testing the CCD models adequacy and significance, while Pareto analysis used in identifying variables that present the highest cumulative effect on response, as described in *Desalination* 2010, 258, 112-119, incorporated herein by reference in its entirety. A multivariate desirability function was utilized to establish more accurately the improved parameter conditions. This multi-criterion approach simultaneously aimed to maximize β-blocker degradation efficiency and minimize energy consumption, a priority for an effective wastewater treatment technology, as well as other large-scale EF processes. The desirability function used herein was described in *Talanta* 2014, 124, 123-138, incorporated herein by reference in its entirety. The overall desirability, D, was determined using the geometric mean of all the individual desirability functions as indicated below in Equation 9.

$$D=(d_1 d_2 d_3 \ldots\ldots d_k)^{(1/k)}, \qquad \text{Eq. 9}$$

wherein d is the individual desirability function and k is the number of responses.

Referring now to the drawings, wherein like reference numerals designate identical or corresponding parts throughout the several views.

FIG. 1 shows exemplary fabrication steps for Cu—B—Fe graphite plate electrodes by sol-gel method within the scope of the invention. While FIG. 1 shows a preparation involving converting rice husks (hulls) into silica, any form of silica in sol-gels (or other sols) may be suitable for the loading of metals onto the inventive electrodes FIG. 2 shows a schematic diagram of an exemplary droplet flow-assisted electro-Fenton reactor, used herein. The exemplary droplet flow-assisted electro-Fenton (DFEF) includes a sol-gel modified graphite cathode electrode (SMGE) (1), which can be considered a multifunctional cathode, a bare graphite electrode (2) acting as anode, a power supply (3), which may be AC or DC, an air or oxygen-enriched gas pump (4), a stirrer (5), which may be magnetic, mechanical, shaking, baffle-based, or the like, a liquid pump (6), which may be, for example a dual-headed peristaltic pump, an electrolytic reactor (7), which may include one or more batch reaction chambers and/or flow area(s), and one or more junctions (9) or mixing units for mixing natural air/enriched oxygen gas with untreated sample to form a droplet spray at the cathode(s) (1), wherein the mixing occurs across a length (10) and the sample flow direction (8) is indicated by arrows. While the exemplary system is shown for experimental, lab-scale application, the system may be expanded to contain multiple (e.g., 2, 3, 4, 5, . . . 100 or more) units and/or to scale up the elements (e.g., to 1, 2.5, 5, 10, 50, 100, 1000, 2500, 5000, 10,000, 25,000, 50,000, 100,000 L or L/s) and/or to implement a flow system rather than, or in addition to, batch elements.

Figure 3A:
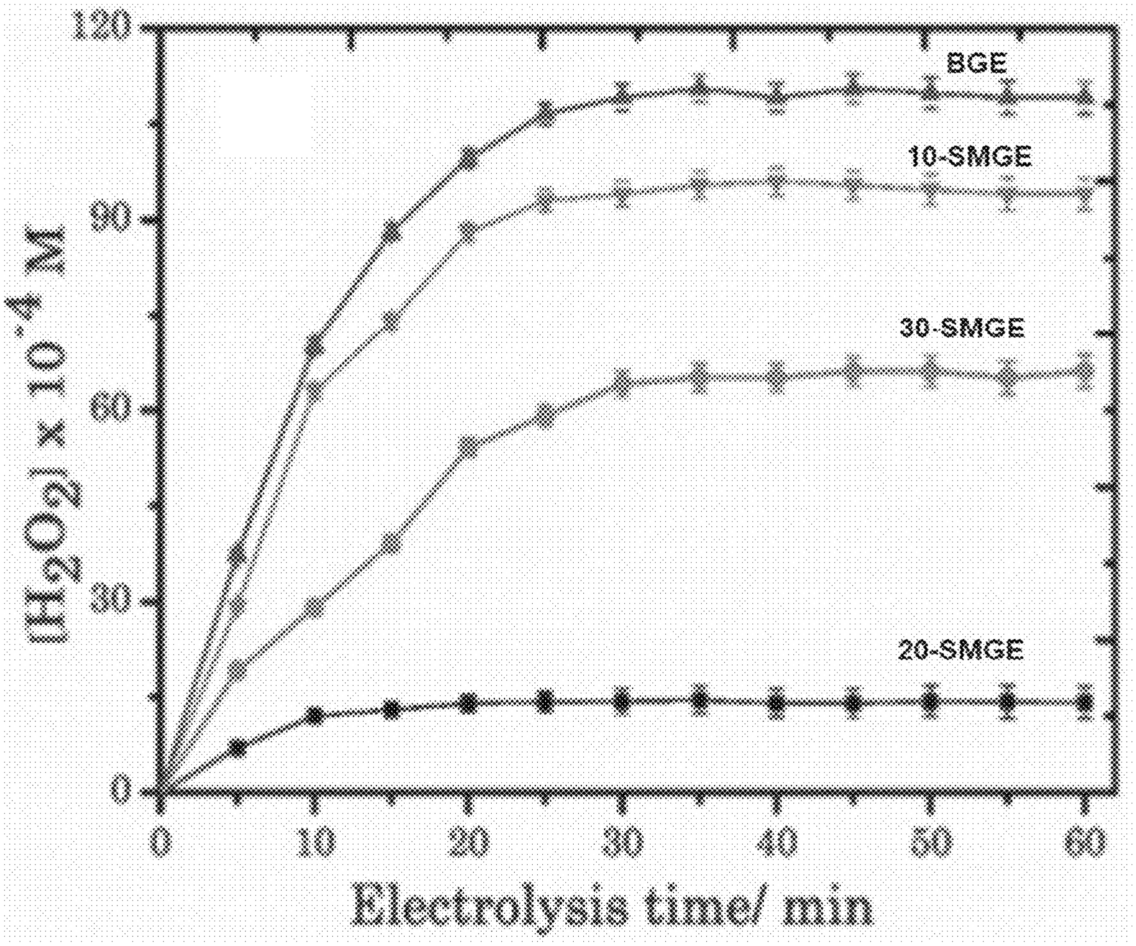
FIG. 3A shows a plot of the effect of an exemplary Cu—B—Fe sol-gel coating upon a bare graphite electrode on $H_2O_2$ electro-generation of a 200 ng/mL solution of atenolol with a current of 100 mA, a 0.02 M $Na_2SO_4$ concentration, and a pH of 3.
Figure 3B:
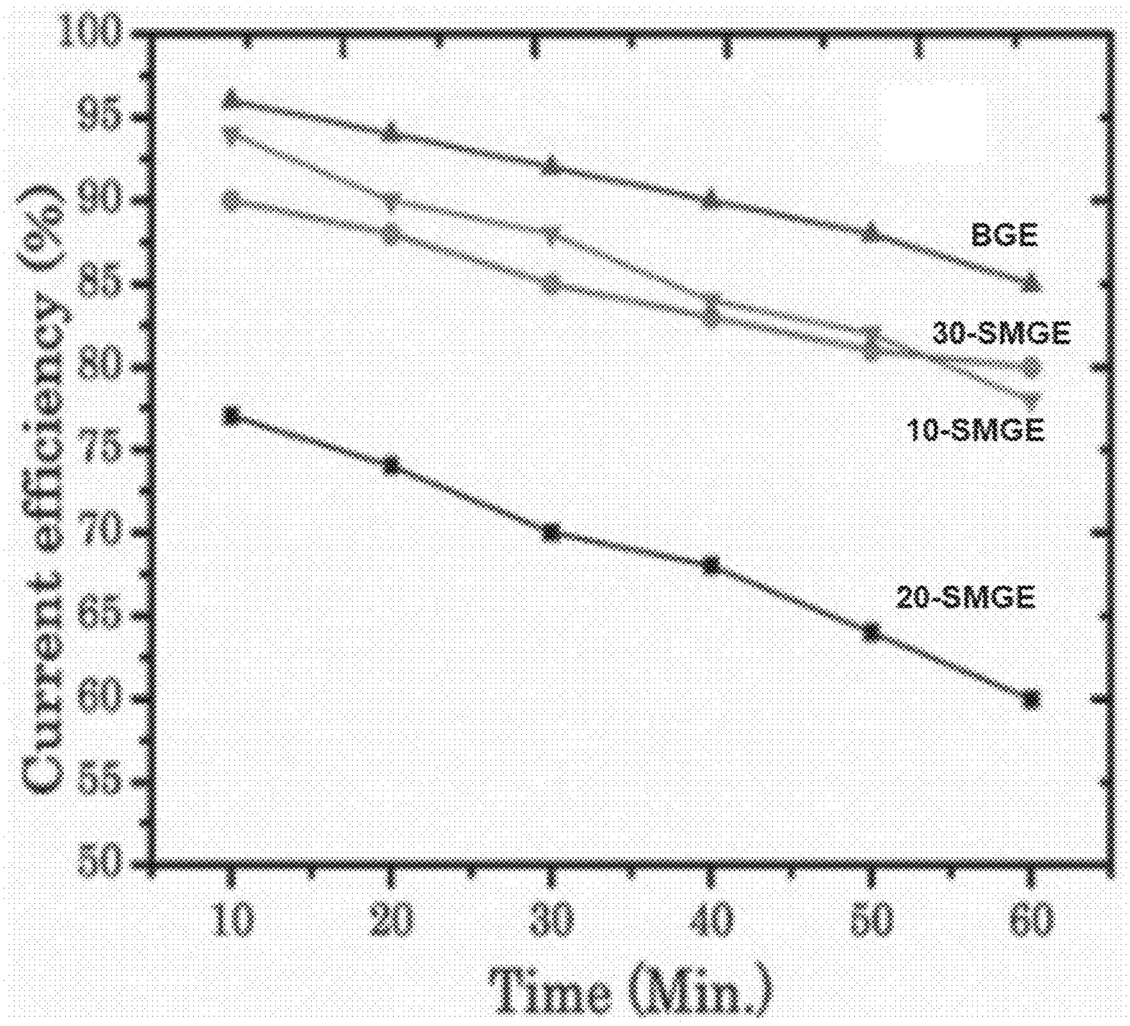
FIG. 3B shows a plot of the effect of an exemplary Cu—B—Fe sol-gel coating upon a bare graphite electrode on current efficiency of a 200 ng/mL solution of atenolol with a current of 100 mA, a 0.02 M $Na_2SO_4$ concentration, and a pH of 3.
Figure 3C:
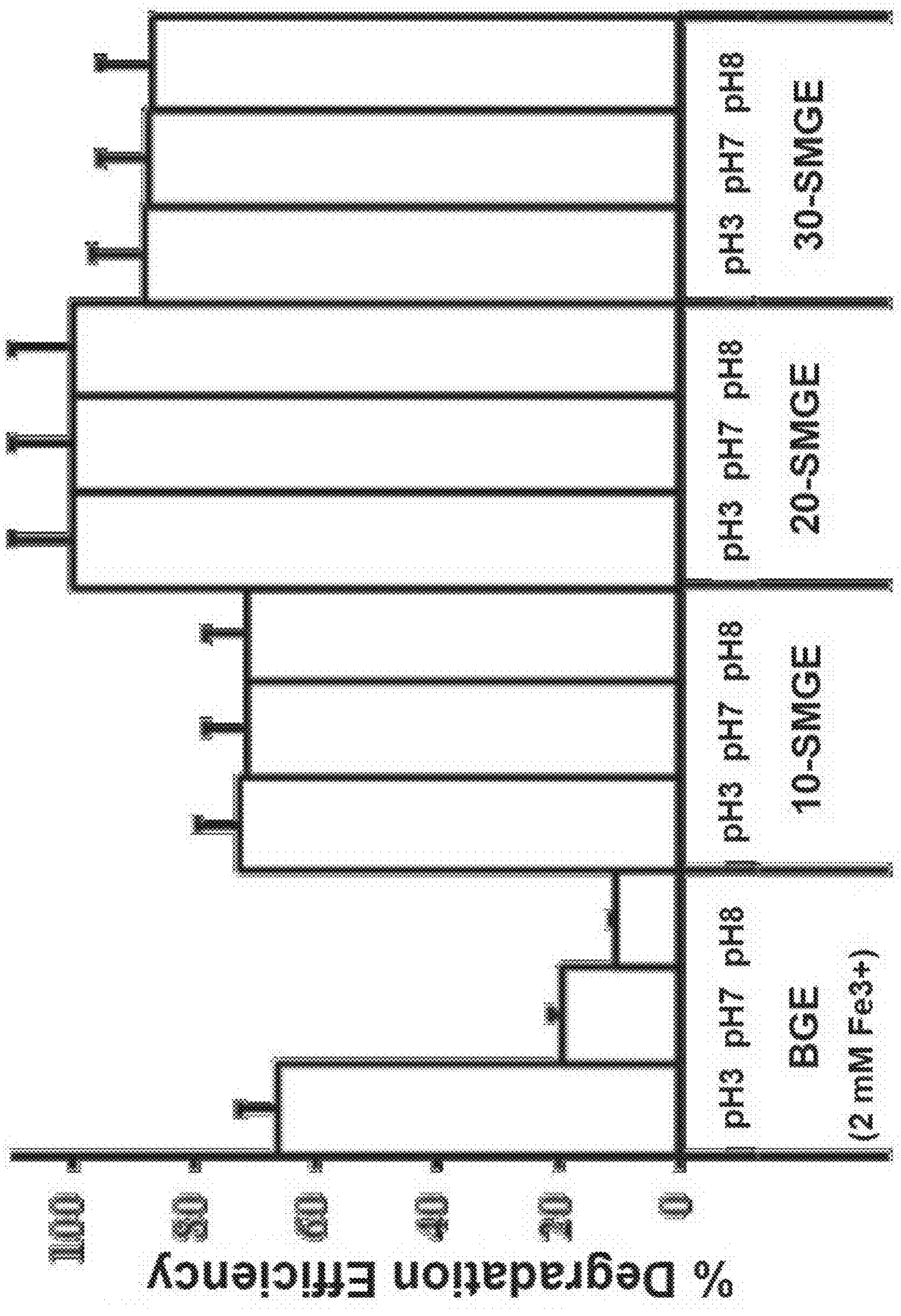
FIG. 3C shows a plot of the effect of an exemplary Cu—B—Fe sol-gel coating upon a bare graphite electrode on degradation efficiency of a 200 ng/mL solution of atenolol with a current of 100 mA, a 0.02 M $Na_2SO_4$ concentration, and a pH of 3.

FIG. 3A to 3C show a plot of the effect of an exemplary Cu—B—Fe sol-gel coating upon a bare graphite electrode on $H_2O_2$ electro-generation, current efficiency, and degradation efficiency of a 200 ng/mL solution of atenolol with a current of 100 mA, a 0.02 M $Na_2SO_4$ concentration, and a pH of 3.

Effect of Cu—B—Fe Sol-Gel Modification on $H_2O_2$ Electro-Generation, Current Efficiencies, and β-Blocker Removal The effect of sol-gel cathode modification on (i) $H_2O_2$ generation (ii) current efficiencies and β-blockers degradation efficiency were investigated as shown in FIG. 3A to 3C. The concentration of iron (Fe) in the composite was varied while that of boron (B) and copper (Cu) were kept constant. As depicted in FIG. 3A, the concentration of $H_2O_2$ obtained after 60 minutes of treatment using a bare graphite electrode (BGE) was 10.6 mM, and from sol-gel-modified graphite cathode electrodes (SMGEs), 10-SMGE was 9.4 mM, 20-SMGE was 1.8 mM, and 30-SMGE was 6.2 mM. Decreased $H_2O_2$ electro-generation with sol-gel cathode modification was believed to signify a positive influence of modification on $H_2O_2$ decomposition. As illustrated in FIG. 3A, the concentration of $H_2O_2$ electro-generated at the bare graphite electrode (BGE) was almost six times greater than that of the sol-gel-modified electrode, 20-SMGE. The presence of Fe and Cu in the surface matrix of the graphite electrode can enhance the reduction of $H_2O_2$ to $^{\cdot}$OH radicals, making it e.g., at least 5, 10, 15, 25, 33, 50, 75, 100% or more and/or up to 1000, 900, 800, 750, 700, 650, 600, 550, 500, 450, 400, 350, 300, 250, 200, 150, 100, 75, or 50% faster, while boron can improve electrode stability, porosity, and conductivity. The lack of linearity in the hydrogen peroxide concentration, $[H_2O_2]$, versus time plots for BGE was due to subsequent $H_2O_2$ loss resulting from its oxidation to $O_2$ as reflected in Equations 6 and 7, above.

On the assumption that only the reaction in Equation 1, above, took place at the cathode electrode, current efficiencies for $H_2O_2$ evolution (after 60 minutes) were determined as displayed in FIG. 3B. The current efficiencies for BGE, 10-SMGE, 20-SMGE and 30-SMGE under DFEF operations fell within acceptable ranges of 60 to 85%, e.g., at least 55, 60, 62.5, 65, 67.5, 70, 72.5, 75, 77.5, 80% and/or up to 95, 90, 85, 82.5, 80, 77.5, 75, 72.5, or 70%. The current efficiencies may generally decrease with sol-gel modification, as observed in FIG. 3B. The decreased current densities for modified electrodes compared to the bare graphite electrode indicate that the modified surfaces have better catalytic activities for ORR and $H_2O_2$ decomposition.

The reactor design may explain these results, particularly using continuous $O_2$ rich droplets introduced at the cathode electrode, and surface chemistry characterization of the modified cathode indicate an increased surface area, increased surface roughness, and formation of nanoscale pores, as discussed below in relation to FIGS. 6A and 68B. Such flow reactor modification and electrode porosity can produce faster $O_2$ diffusion, mass transfer kinetics, and a highly efficient $H_2O_2$ production system. Hence, Cu—B—Fe modified BGE electrodes are indicated to be good cathode materials for $H_2O_2$ electro-generation.

As is illustrated in FIG. 3C, the modified graphite electrodes (x-SMGE) displayed higher β-blocker degradation efficiencies for atenolol (ATE) at all pH conditions while the BGE showed reduced degradation efficiencies under all pH conditions. Propranolol (PROP) degradation (not shown) showed a similar trend to atenolol.

Figure 4:
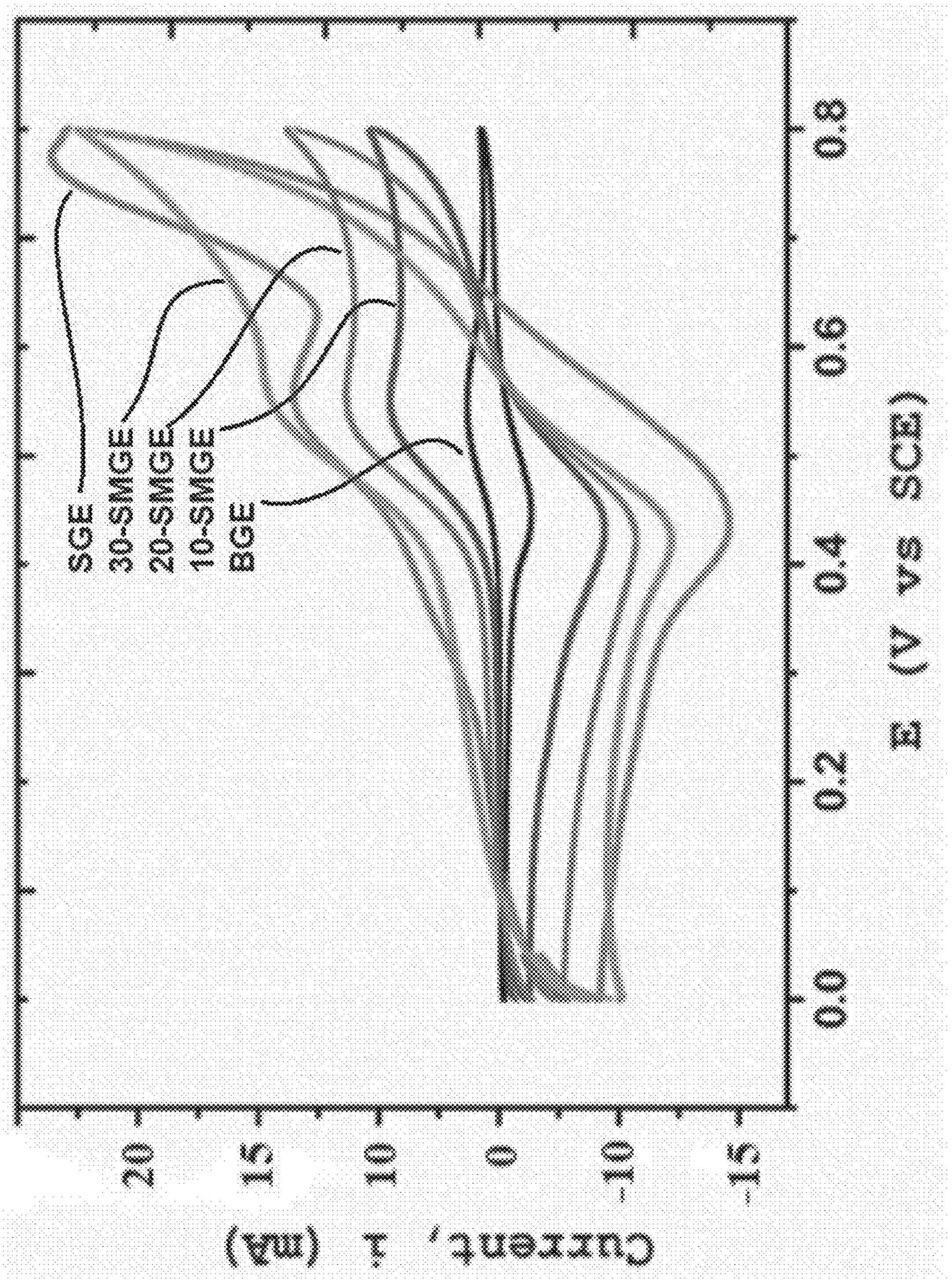
FIG. 4 shows cyclic voltammograms of bare graphite electrode (BGE), sulfonated graphite electrode (SGE), 10 wt. % Fe in a Cu—B—Fe sol-gel-modified graphite cathode electrode (10-SMGE), 20-SMGE, and 30-SMGE at a scanning potential range of 0 to 1 V.

FIG. 4 shows cyclic voltammograms of bare graphite electrode (BGE), sulfonated graphite electrode (SGE), 10 wt. % Fe in a Cu—B—Fe sol-gel-modified graphite cathode electrode (10-SMGE), 20-SMGE, and 30-SMGE at a scanning potential range of 0 to 1 V.

Electrochemical Behavior

To investigate the $H_2O_2$ production results and current efficiencies discussed above, cyclic voltammetry (CV) experiments were conducted on both BGE and sol-gel modified electrodes as illustrated in FIG. 4. All modified (inventive) electrodes displayed well-defined redox peaks resulting from forward and reversed scans of the redox couples of $Fe(CN)_6^{3-}/Fe(CN)_6^{4-}$. The redox peaks significantly enhanced with the increase in Cu—B—Fe immobilization. The region for the positive current indicates anodic oxidation while that for the negative region represents cathodic reduction. The modified/treated electrodes exhibited almost rectangular shaped voltammograms which can indicate their potential for increased electron transfer at the electrode surfaces. The sulfuric acid treated electrode, i.e., sulfonated graphite electrode (SGE), and the sol-gel modified electrodes exhibited enhanced current responses towards oxygen reduction reactions (ORR) and lower hydrogen evolution potentials than the bare graphite electrode. According to Equation 1, ORR is proton consuming and hence competes with hydrogen evolution reaction at the cathode. Hence, the ORR occurrence at less negative potentials, resulting from inventive cathode modification(s) can suppress hydrogen evolution reaction. The enhanced ORR at less negative potentials after electrode modification indicates fast electron transfer kinetics at the cathode electrode.

Figure 5A:
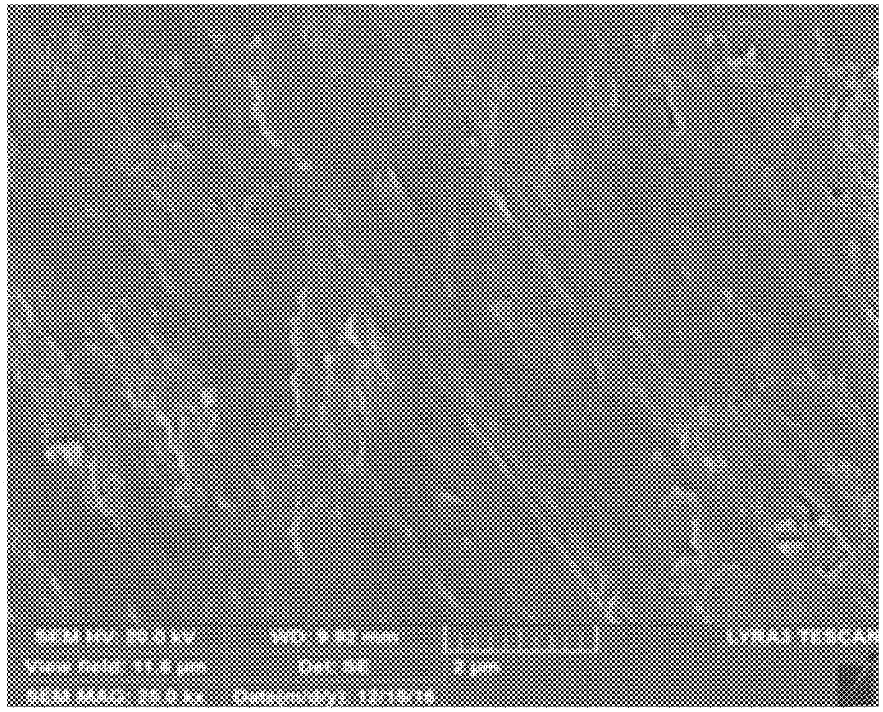
FIG. 5A shows a scanning electron microscope (SEM) image of BGE.

FIG. 5A to 5D shows a scanning electron microscope (SEM) images of BGE, an SEM image with an inset energy-dispersive X-ray spectroscopy (EDS) composition of 20-SMGE, surface-enhanced Raman spectra of BGE and 20-SMGE, and an elemental mapping of 20-SMGE. The incorporation of nano-pore structures in modified graphite electrodes which may be contribute to enhanced $H_2O_2$ production and increased electroactive surface area resulting from both etching and sol-gel modification, as seen in the SEM micrographs of bare graphite (FIG. 5A) and 20-SMGE (FIG. 5A).

Figure 5B:
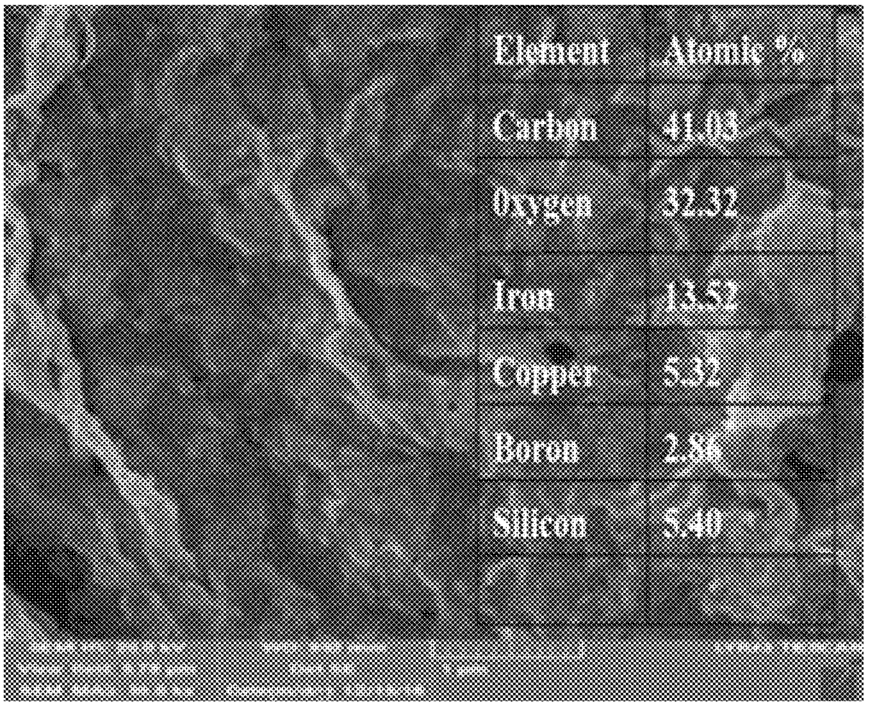
FIG. 5B shows an SEM image with an inset energy-dispersive X-ray spectroscopy (EDS) composition of 20-SMGE; (c) surface-enhanced Raman spectra's of BGE and 20-SMGE (d) elemental mapping of 20-SMGE.

FIG. 5A shows the bare graphite electrode (BGE) with a relatively smooth surface morphology. However, as seen in FIG. 5B, after etching/treatment and sol-gel modification, the smooth surface developed some ridges and nanoscale roughness, and some observable spherical shapes result from nanoscale doping of Cu—B—Fe (20-SMGE) with approximate diameters of 15 to 75 nm. The spherical, prismic, and/or irregular shapes of the sol-gel doping are not particularly limited in size, and may have average diameters of, e.g., at least 1, 2.5, 5, 7.5, 10, 15, 20, 25, 30, 35, or 50 nm and/or up to 500, 250, 200, 150, 125, 100, 90, 80, 75, 70, 65, 60, 55, 50, 45, 40, 35, 30, or 25 nm, depending upon the desired application.

SEM-EDX results in insets of FIGS. 5A and 5B were used to evidence the successful incorporation of Cu, B, and Fe in the graphite surface matrix after sol-gel treatment. The treatment of BGE with sulfuric acid roughened and introduced some surface functionalities (hydrophilic surfaces) on the BGE that were used to anchor loaded metals ions and improve surface area for ORR.

Figure 5C:
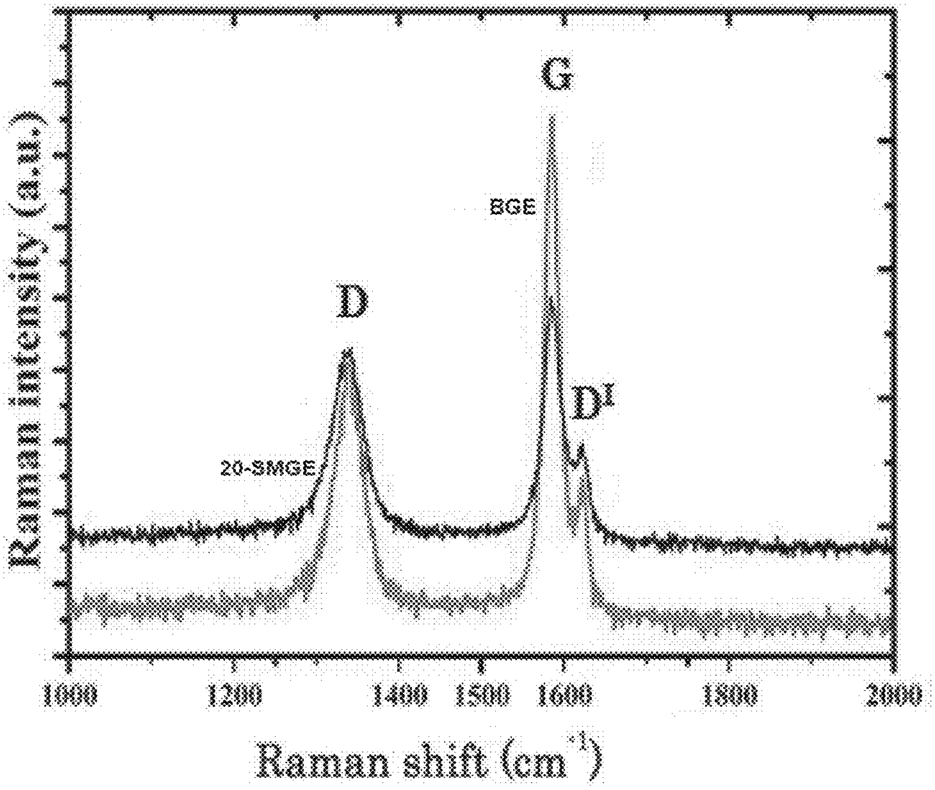
FIG. 5C shows surface-enhanced Raman spectra of BGE and 20-SMGE.
Figure 5D:
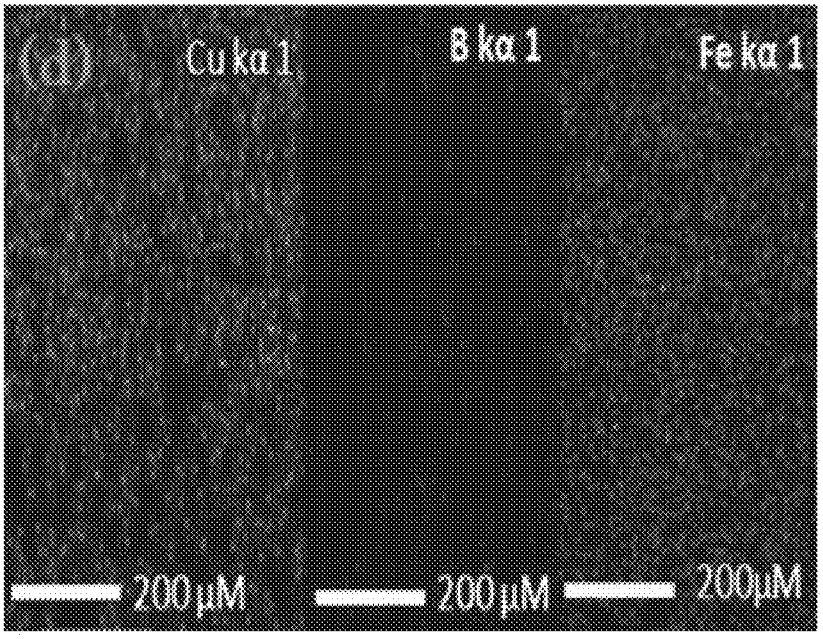
FIG. 5D shows an elemental mapping of 20-SMGE.

The molecular structures for both BGE and 20-SMGE were analyzed by surface enhanced Raman spectroscopy as shown in FIG. 5C. Both electrodes, i.e., before and after modification, present typical graphite $sp^2$ hybridization Raman characteristic peak at 1352 $cm^{-1}$ corresponds to the D band and at 1584 $cm^{-1}$ corresponds to the G band, each electrode with an additional $D^I$ band at 1626 $cm^{-1}$. These bands at 1352, 1584, and 1626, imply that the graphite structure was retained in the electrodes even after sol-gel modification. The D band represents the disordered phase reflecting grain and vacancies boundaries while the G band represents E2g phonon first-order scattering of the sp2 carbon-carbon bond in the graphitic carbon phase.

The degree of disorder resulting from BGE sol-gel surface functionalization was assessed using the ratio of integrated D and G band intensities ($I_D/I_G$) as evidence for the level of functionalization. The $I_D/I_G$ ratio increased from 0.76 (20SMGE) to 0.94 (BGE) demonstrate the presence of more surface defects and disorder attributed to Cu—B—Fe composite doping atoms. These observations may occasion enhanced cathodic ORR and fast production of the ˙OH radical. Uniform distribution of the loaded atoms (Cu—B—Fe) is indicated by the SEM-EDS elemental mapping results depicted in FIG. 5D.

Figure 6A:
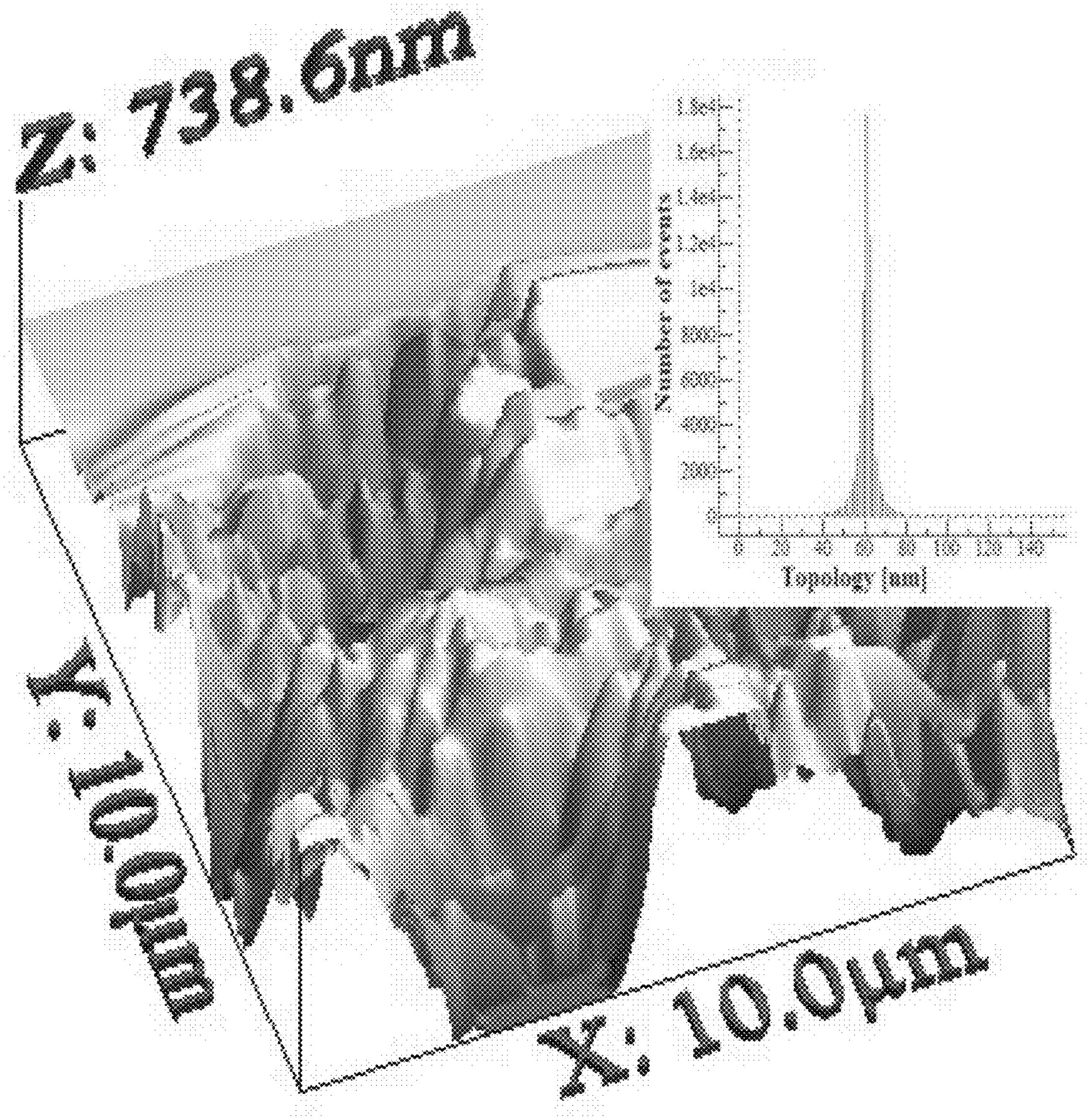
FIG. 6A shows a 3D topographical atomic force microscopy (AFM) image of BGE with an inset surface roughness distribution plot.
Figure 6B:
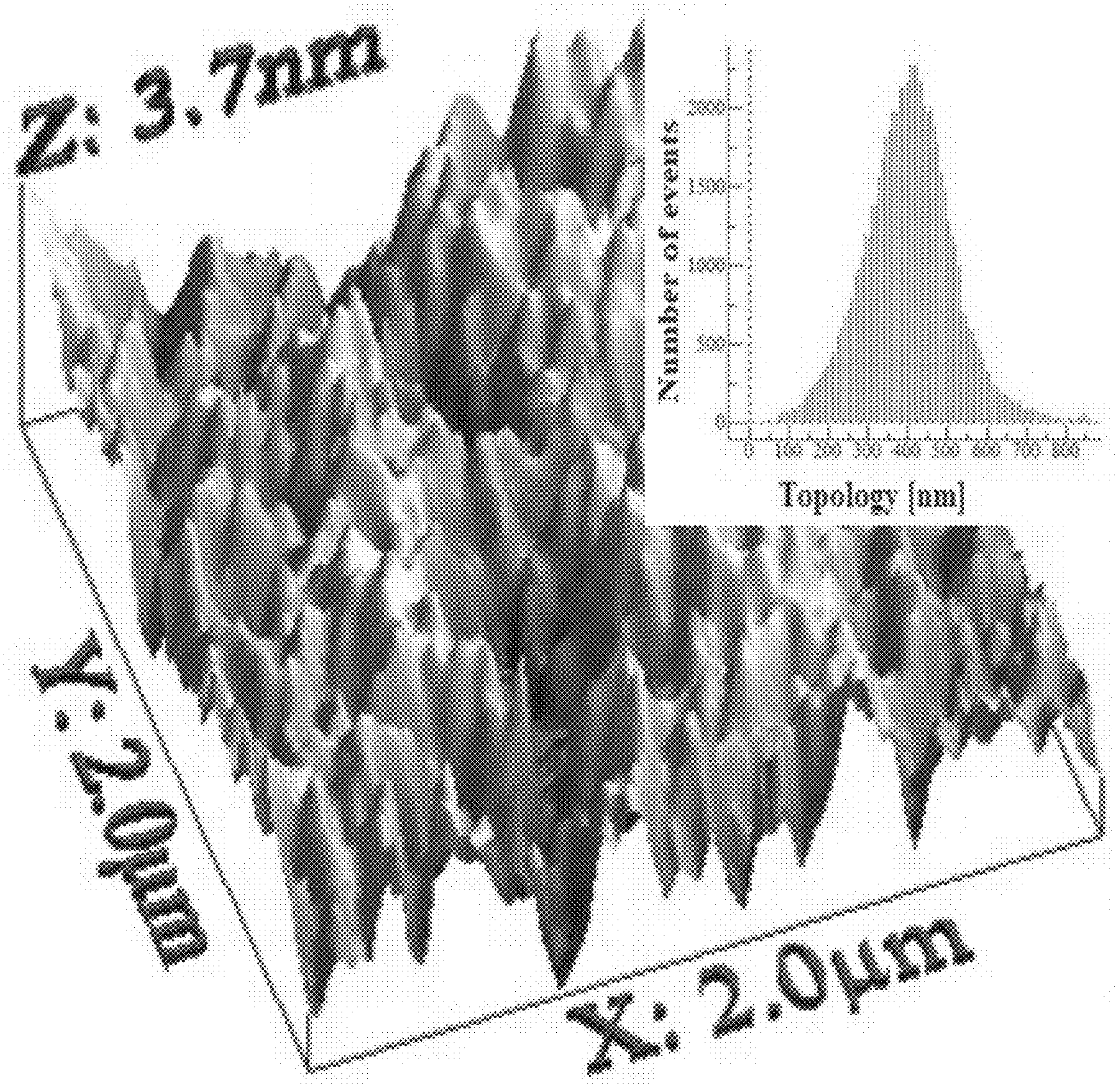
FIG. 6B shows a 3D topographical AFM image of 20-SMGE with an inset-surface roughness distribution plot.

FIGS. 6A and 6B show a 3D topographical atomic force microscopy (AFM) images of BGE (6A) and of 20-SMGE (6B) with an inset surface roughness distribution plot. The topographical 3D AFM images in FIGS. 6A (BGE) and 6B (20-SMGE) show that sol-gel modification can create well-distributed porous valley and hill structures on the 20-SMGE electrode surface.

Figure 7A:
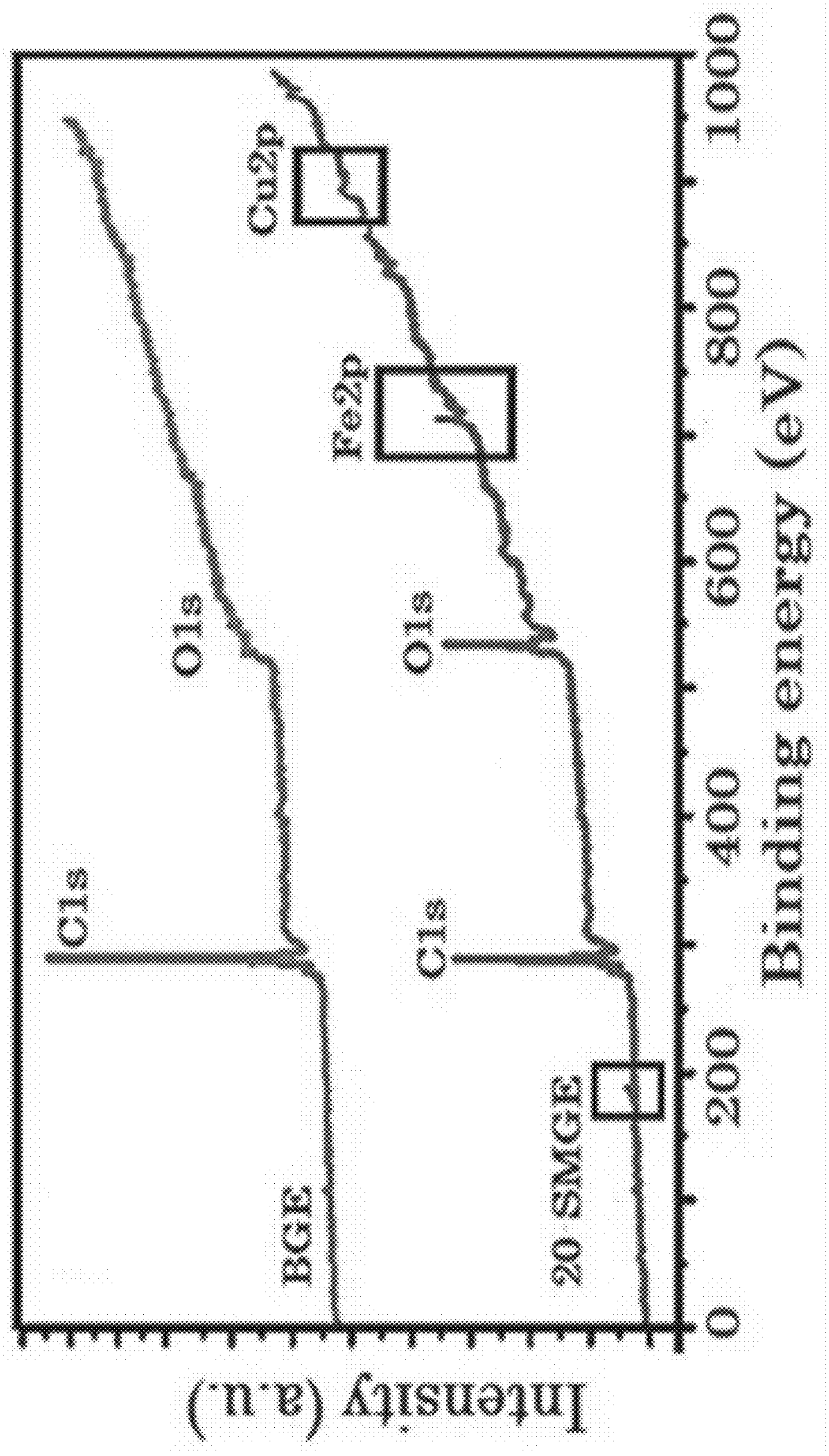
FIG. 7A shows an x-ray photoelectron spectroscopy (XPS) survey spectrum for both BGE and 20-SMGE.
Figure 7B:
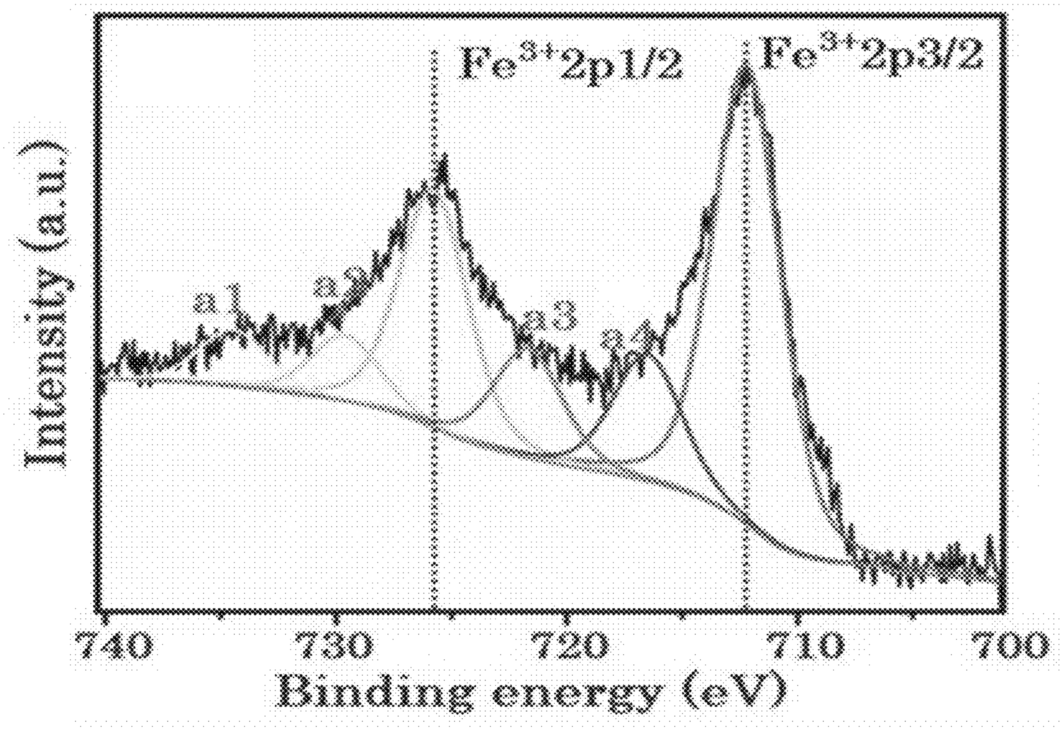
FIG. 7B shows a high-resolution XPS spectrum for 20-SMGE in terms of Fe2p.
Figure 7C:
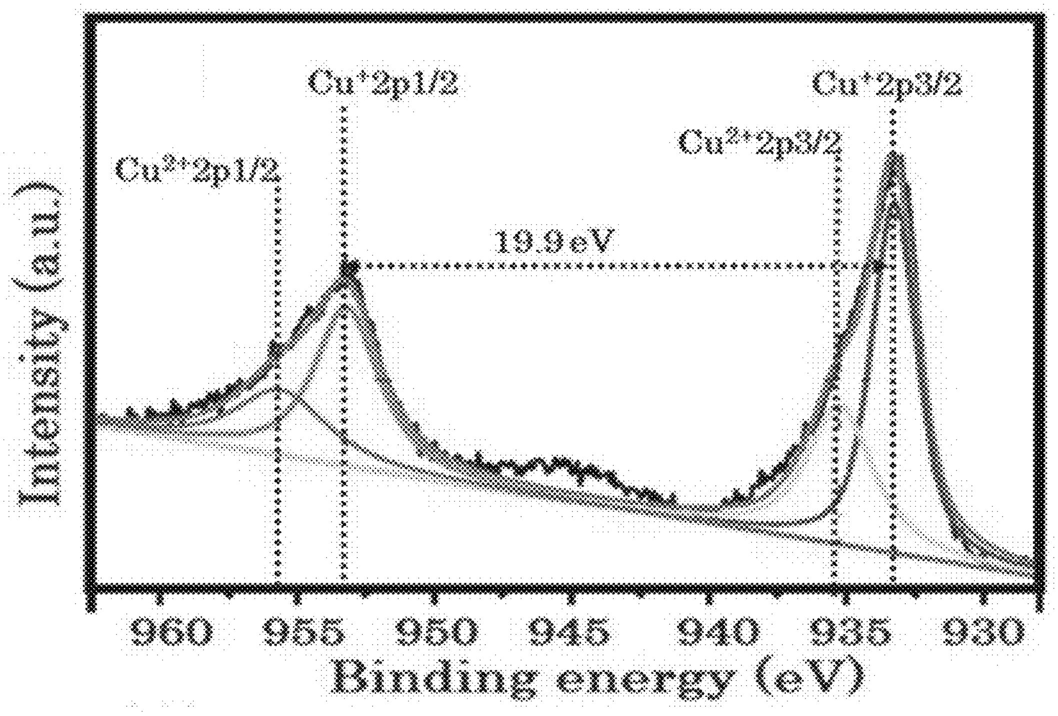
FIG. 7C shows a high-resolution XPS spectrum for 20-SMGE in terms of Cu2p.

FIG. 7A shows an x-ray photoelectron spectroscopy (XPS) survey spectrum for both BGE and 20-SMGE. FIGS. 7B and 7C shows a high-resolution XPS spectrum for 20-SMGE in terms of Fe2p (FIG. 7B) and in terms of Cu2p (FIG. 7C). XPS characterizations of BGE before and after sol-gel modification were studied to establish further the surface elemental composition and surface functional groups. With XPS analysis, an insight into the elemental electronics with its chemical environment is availed, allowing exploration of oxidation states.

From the results of the XPS survey scan in FIG. 7A, BGE shows only the presence of carbon and oxygen, while 20-SMGE shows incorporation of boron, iron, and copper. These XPS elemental results correspond with the SEM-EDX results discussed above for FIGS. 5A and 5B. High-resolution scans for appropriate core levels for Fe2p in FIG. 7B displayed two relatively pronounced peaks, respectively at binding energies of 712.1 and 725.4 eV. These peaks were identified as the spin-orbit splitting of $Fe^{3+}$ in $Fe_2O_3$ and were respectively assigned to $Fe^{3+}2p_{3/2}$ and $Fe^{3+}2p_{1/2}$. Similar Fe2p binding energies have been reported elsewhere for metal hexacyanoferrates.

A scan for Cu2p in FIG. 7C showed peaks at 933.9 eV and 953.3 eV, separated by a distance of 19.9 eV. These peaks were respectively assigned to $Cu^+2p3/2$ and $Cu^+2p1/2$ and were attributed to monovalent $Cu^+$ in the modified sample. In addition, high resolution spectral peak at 934.9 eV, assigned to $Cu^{2+}2p3/2$, and that at 955.0 eV, assigned to $Cu^{2+}2p1/2$, were ascribed to bivalent $Cu^{2+}$ spin-orbit splitting. High-resolution scans for both carbon and B1s (not shown) indicated the incorporation of boron into the carbon lattice.

Figure 8A:
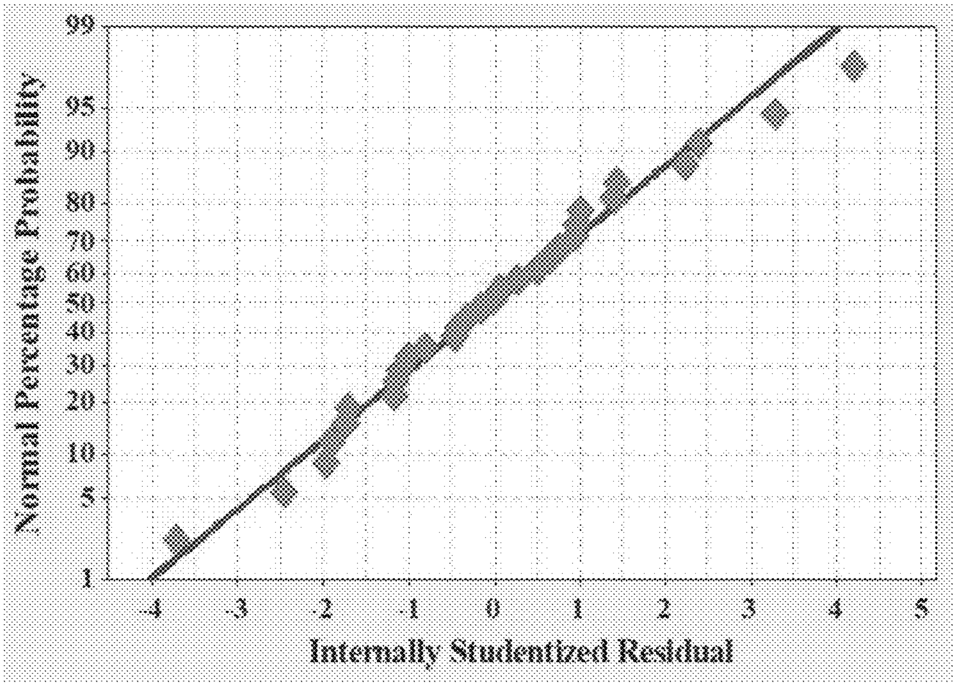
FIG. 8A shows model normal probability plot.
Figure 8B:
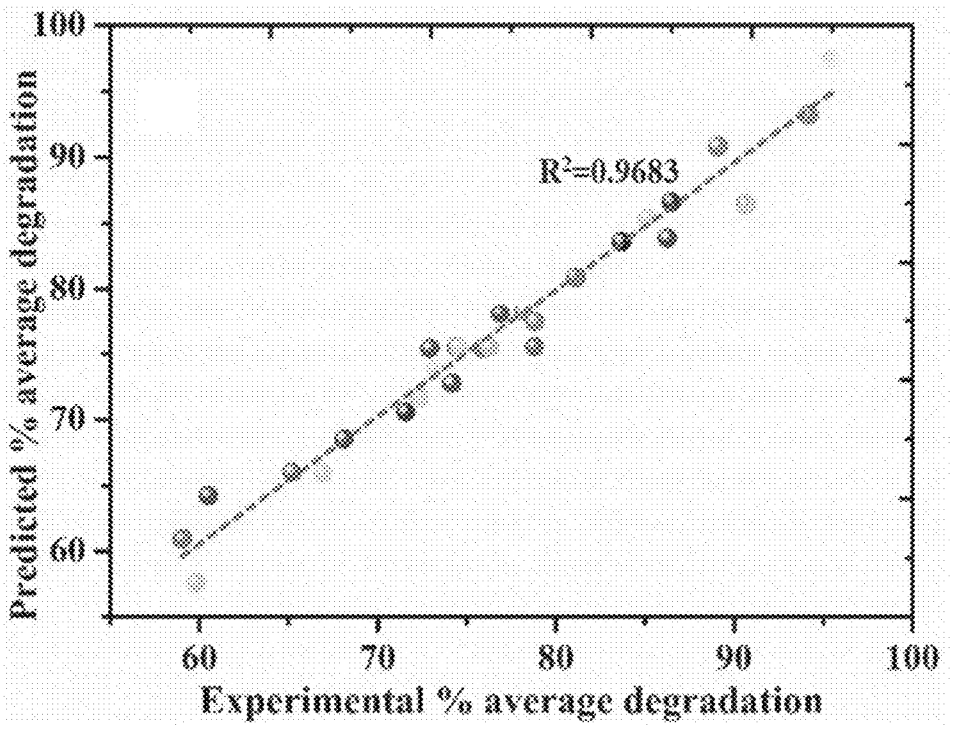
FIG. 8B shows a predicted versus experimental degradation response plot.

FIG. 8A shows model normal probability plot. FIG. 8B shows a predicted versus experimental degradation response plot. The results of the 4-factor CCD matrix with both experimental and predicted values presented in Table 3.

TABLE 3

CCD design matrix table with results for DFEF degradation of ATE and PROP

| EXP. No. | $X_1$ | $X_2$ | $X_3$ | $X_4$ | PROP | ATE | EXPR. % AVE. DEGR. | PRED. % AVE. DEGR. |
|---|---|---|---|---|---|---|---|---|
| 1 | 2 | 0 | 0 | 0 | 58.9 | 59.2 | 59.05 | 60.95 |
| 2 | 0 | 0 | 2 | 0 | 90.49 | 90.79 | 90.64 | 86.43 |
| 3 | −2 | 0 | 0 | 0 | 86.11 | 86.41 | 86.26 | 83.87 |
| 4 | 0 | −2 | 0 | 0 | 72.17 | 72.47 | 72.32 | 71.67 |
| 5 | 0 | 0 | 0 | 2 | 94.02 | 94.32 | 94.17 | 93.22 |
| 6 | 0 | 0 | 0 | −2 | 73.1 | 73.4 | 73.25 | 73.71 |
| 7 | 0 | 0 | 0 | 0 | 75.74 | 76.04 | 75.89 | 75.39 |
| 8 | 0 | 2 | 0 | 0 | 86.32 | 86.62 | 86.47 | 86.63 |
| 9 | 0 | 0 | 0 | 0 | 72.78 | 73.08 | 72.93 | 75.39 |
| 10 | 0 | 0 | −2 | 0 | 60.36 | 60.66 | 60.51 | 64.23 |
| 11 | 0 | 0 | 0 | 0 | 78.65 | 78.95 | 78.80 | 75.51 |
| 12 | 1 | −1 | 1 | −1 | 65.05 | 65.35 | 65.20 | 66.01 |
| 13 | 1 | −1 | −1 | 1 | 71.42 | 71.72 | 71.57 | 70.57 |
| 14 | 1 | 1 | 1 | −1 | 78.06 | 78.36 | 78.21 | 78.23 |

TABLE 3-continued

CCD design matrix table with results for DFEF degradation of ATE and PROP

| EXP. No. | $X_1$ | $X_2$ | $X_3$ | $X_4$ | PROP | ATE | EXPR. % AVE. DEGR. | PRED. % AVE. DEGR. |
|---|---|---|---|---|---|---|---|---|
| 15 | 1 | 1 | −1 | 1 | 74.02 | 74.32 | 74.17 | 72.75 |
| 16 | −1 | −1 | −1 | 1 | 80.98 | 81.28 | 81.13 | 80.87 |
| 17 | 1 | −1 | 1 | 1 | 78.05 | 78.35 | 78.20 | 79.35 |
| 18 | 0 | 0 | 0 | 0 | 76.13 | 76.43 | 76.28 | 75.51 |
| 19 | −1 | 1 | −1 | −1 | 78.67 | 78.97 | 78.82 | 77.42 |
| 20 | 1 | 1 | −1 | −1 | 66.77 | 67.07 | 66.92 | 65.95 |
| 21 | 1 | 1 | 1 | 1 | 84.94 | 85.24 | 85.09 | 85.41 |
| 22 | 1 | −1 | −1 | −1 | 59.68 | 59.98 | 59.83 | 57.61 |
| 23 | −1 | −1 | 1 | −1 | 76.74 | 77.04 | 76.89 | 78.07 |
| 24 | −1 | 1 | −1 | 1 | 83.53 | 83.83 | 83.68 | 83.6 |
| 25 | 0 | 0 | 0 | 0 | 74.28 | 74.58 | 74.43 | 75.51 |
| 26 | −1 | −1 | 1 | 1 | 88.93 | 89.23 | 89.08 | 90.79 |
| 27 | −1 | −1 | −1 | −1 | 67.96 | 68.26 | 68.11 | 68.53 |
| 28 | 0 | 0 | 0 | 0 | 74.36 | 74.66 | 74.51 | 75.51 |
| 29 | −1 | 1 | 1 | −1 | 88.95 | 89.25 | 89.10 | 90.84 |
| 30 | −1 | 1 | 1 | 1 | 95.28 | 95.58 | 95.43 | 97.4 |

The experimental average removal values ranged from 59.05% to 95.43% while the predicted percentage average removal was between 57.61 and 97.40%. From the Minitab 17 software, and using a face-centered CCD, a full second-order quadratic polynomial model equation (% Y) in Equation 10 below, expresses an empirical relationship between the predicted response (% Y) and independent parameters deduced.

$$Y = 75.453 - 5.728 \cdot X_1 + 3.738 \cdot X_2 + 5.551 \cdot X_3 + 4.880 \cdot X_4 - 0.745 \cdot X_{12} + 0.940 \cdot X_{22} - 0.015 \cdot X_{32} + 2.018 \cdot X_{42} - 0.139 \cdot X_1 \cdot X_2 - 0.284 \cdot X_1 \cdot X_3 + 0.154 \cdot X_1 \cdot X_4 + 0.969 \cdot X_2 \cdot X_3 - 1.539 \cdot X_2 \cdot X_4 + 0.096 \cdot X_3 \cdot X_4, \quad \text{Eq. 10}$$

wherein Y is the coded value of the percent (%) average degradation efficiency, the numerical coefficients are statistically accepted values, $X_1$ represents beta blocker concentration, [β-blocker]$_o$, in ng/ml, $X_2$ represents applied current in mA, $X_3$ represents electrolysis time in minutes, $X_4$ represents pH.

The negative and positive terms in the regression equation indicate unfavorable and favorable effects on respective degradation efficiencies. Using the second-order polynomial equation set forth as Equation 10, above, calculated values were graphically compared to experimental values in FIG. 8B, resulting in a relatively high correlation coefficient ($R^2$) of 0.968 (>0.900), indicating accuracy the closer to unity. This indicates that the observed data values were in good agreement with the calculated ones, supporting the model's capability and reliability to predict responses (% Y).

The regression results generated from the regression model analysis presented in supplementary Table 4.

TABLE 4

Regression coefficients estimates with their corresponding t and P-values from the central composite design data obtained during DFEF experiments

| Coefficient | Parameter estimate | Standard error | t-value | P-value |
|---|---|---|---|---|
| Intercept | 75.4527 | 1.0288 | 73.340 | 0.0001 |
| $X_1$ | −5.7279 | 0.5081 | −11.273 | 0.0001 |
| $X_2$ | 3.7379 | 0.5081 | 7.357 | 0.0001 |
| $X_3$ | 5.5513 | 0.5081 | 10.926 | 0.0001 |
| $X_4$ | 4.8796 | 0.5081 | 9.604 | 0.0001 |
| $X_{11}$ | −0.7453 | 0.4753 | −1.568 | 0.1390 |
| $X_{22}$ | 0.9397 | 0.4753 | 1.977 | 0.0012 |
| $X_{33}$ | −0.0153 | 0.4753 | −0.032 | 0.9750 |
| $X_{44}$ | 2.0184 | 0.4753 | 4.247 | 0.0001 |
| $X_{12}$ | −0.1394 | 0.6223 | −0.224 | 0.8260 |
| $X_{13}$ | −0.2844 | 0.6223 | −0.457 | 0.6550 |
| $X_{14}$ | 0.1544 | 0.6223 | 0.248 | 0.8080 |
| $X_{23}$ | 0.9694 | 0.6223 | 1.558 | 0.0002 |
| $X_{24}$ | −1.5394 | 0.6223 | −2.474 | 0.0001 |
| $X_{34}$ | 0.0956 | 0.6223 | 0.154 | 0.8800 |

The significance of the regression coefficients was determined using the student's t-test. Table 4 depicts the relevant variables, student's t-distribution alongside their variable estimates whose significances are tested using the corresponding p-values. A parameter coefficient considered significant when the magnitude of its t-value is larger, and its corresponding p-value is smaller (≤0.05). The statistical significance of the model terms signified by the corresponding p-values (Prob>F≤0.05). The p-values greater than 0.1 indicate the statistical insignificance of the model's terms while the p-value Prob>F≤0.1 indicate borderline significance at 95% confidence limits.

Given the variable estimates with their accompanying p-values in Table 4, the test variables including initial beta blockers concentration ($X_1$), applied current ($X_2$), electrolysis time ($X_3$) and pH ($X_4$) were found significant. Likewise, the linear relations between $X_2 \cdot X_2$ and $X_4 \cdot X_4$ and quadratic relations between $X_2 \cdot X_3$ and $X_2 \cdot X_4$ were found to be highly significant (p≤0.0001). Residual analysis plots were used to test the model's adequacy and normality. As shown by the standard probability plot of "studentized" residuals in FIG. 8A, the residuals lie along the straight line, indicating normal residual distribution and good data correlation with the model. The residuals normalcy meant that the error within the model was consistent with the fair normal distribution, signifying a completely randomized design.

The statistical relevance and adequacy of the developed quadratic model to predict β-blocker degradation efficiency tested using analysis of variance (ANOVA), a statistical tool for testing the adequacy and relevancy of the generated models. The P-values, Fisher variation ratio (F-values), the coefficient of variance (CV), lack of fit F-value, the coefficient of determination ($R^2$), and adjusted $R^2$ were some of the parameters assessing model accuracy and validity. Based on ANOVA results in Table 2, above, an F-value of 30.55 higher than the tabulated F (2.352) at significance level 95% and very low probability value ($P_{model}$>F=0.001), was an indication that the current model was significant. The lack of fit (LOF) of 1.64 (F-value<$F_{Critical}$=4.7725) and a p-value of 0.3340 (>0.05) demonstrated further the adequacy of the obtained model in predicting β-blocker degradation efficiency. All the $R^2$ and adj. $R^2$ in Table 2 were closer to unity, indicating the model's accuracy.

Figure 9:
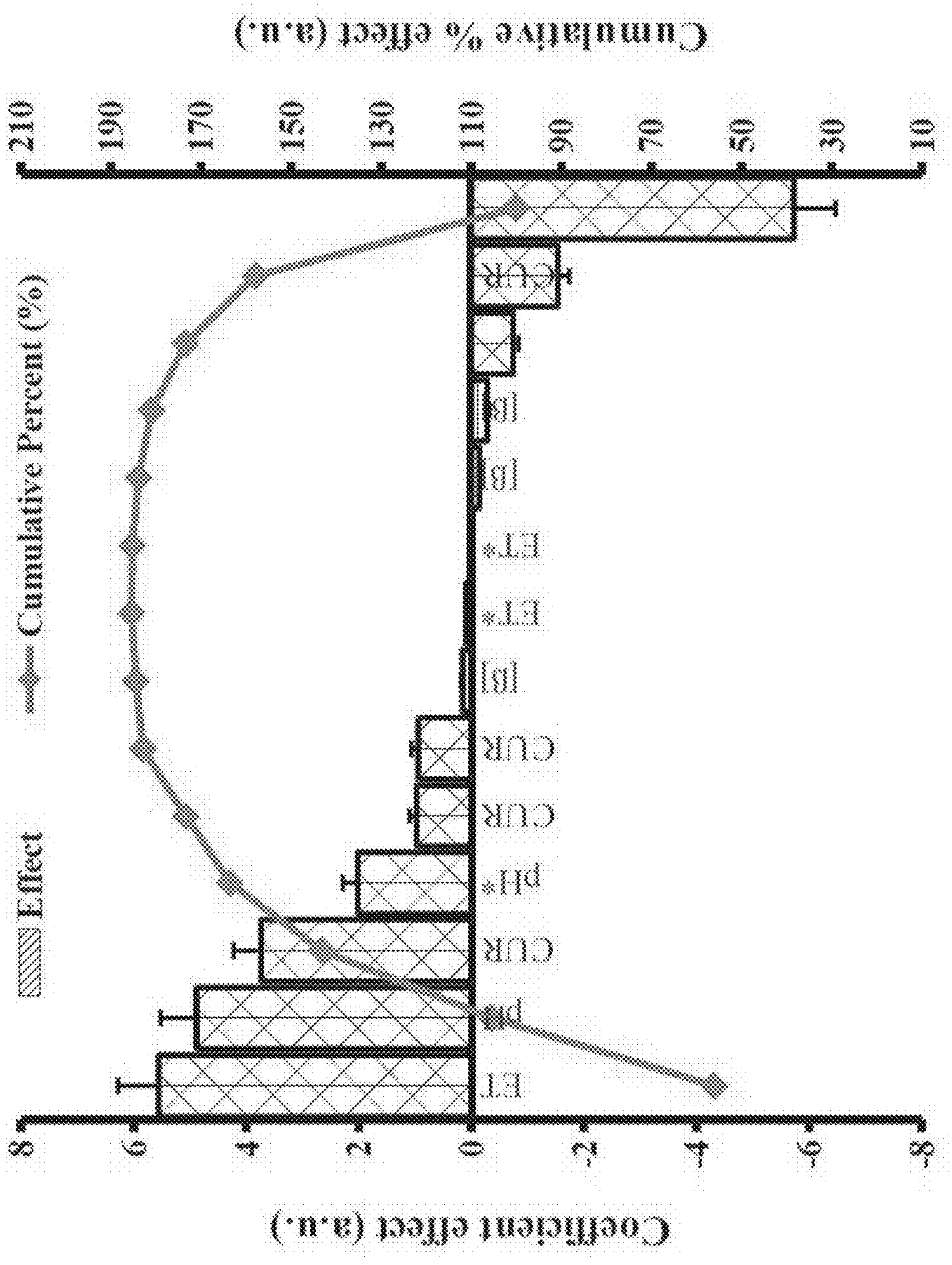
FIG. 9 shows a Pareto chart representation analysis level of significant variables and interactions affecting the β-blockers degradation efficiency.

FIG. 9 shows a Pareto chart representation analysis level of significant variables and interactions affecting the β-blocker degradation efficiency. By calculating the effect of each variable/interaction on the response, the Pareto chart analysis can provide an in-depth treatment of regression results. The Pareto analysis in FIG. 9 indicates the cumulative effect of each parameter/interaction on the response, with those on the negative axis exhibiting antagonistic effects, and those on the positive side exhibiting synergistic towards responses. The length of the Pareto curve measures the strength and significance of each variable/interaction length. The relatively significant parameters/interactions are the ones with the most extended bars.

All four selected factors are statistically significant, with an order of significance ET>pH>[β-blocker]$_o$> applied current (CUR). In particular, the initial β-blocker concentration, [β-blocker]$_o$, was antagonistic, while the rest of the factors exhibited synergistic effects towards β-blocker degradation efficiency. Also, the interaction effects of pH·pH, CUR·IET, and $CUR^2$ were synergistic while the interaction effects of CUR·pH, $[\beta\text{-blocker}]_o^2$, and [β-blocker]$_o$·ET demonstrated negative (antagonistic) influence on the degradation efficiency. Based on the above, electrolysis time, pH, and applied current were the most influential positive variables towards DFEF degradation efficiency of β-blockers.

Figure 10A:
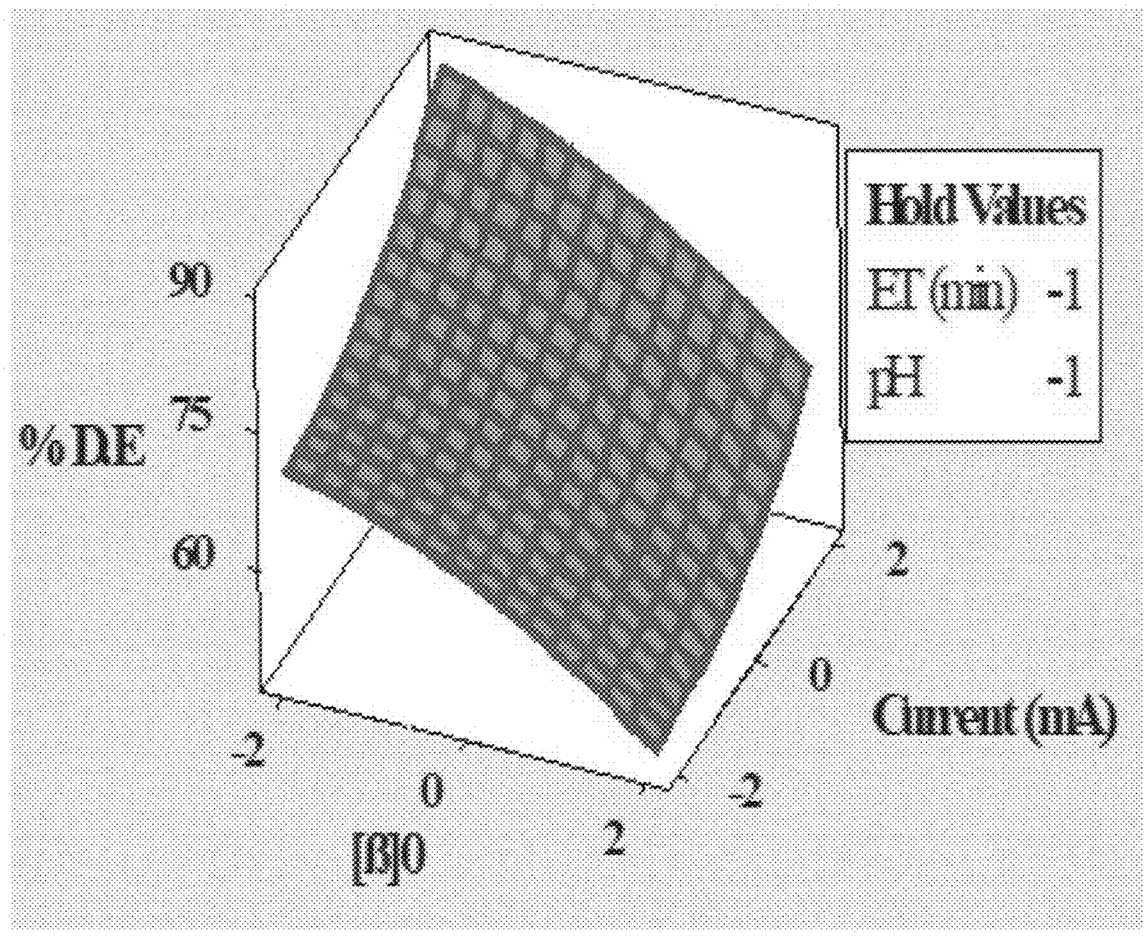
FIG. 10A shows a 3D response surface plot of the effects of the interaction of initial β-blocker concentration, $[\beta]_0$, with current in mA on β-blocker removal efficiency (% DE)
Figure 10B:
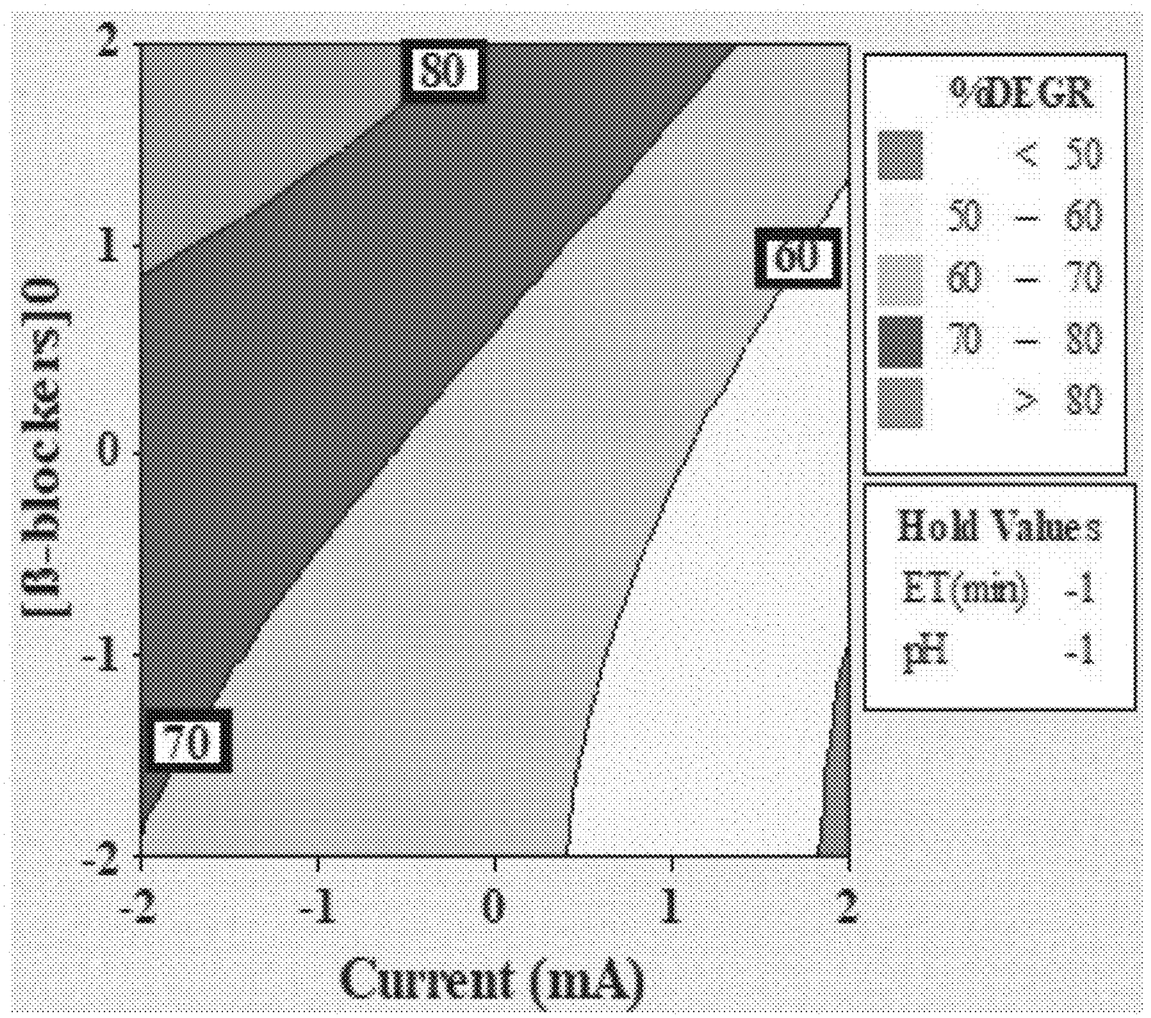
FIG. 10B shows a 2D contour plot of the effects of the interaction of initial β-blocker concentration, $[\beta]_0$, with current in mA on β-blocker removal efficiency (% DE)
Figure 10C:
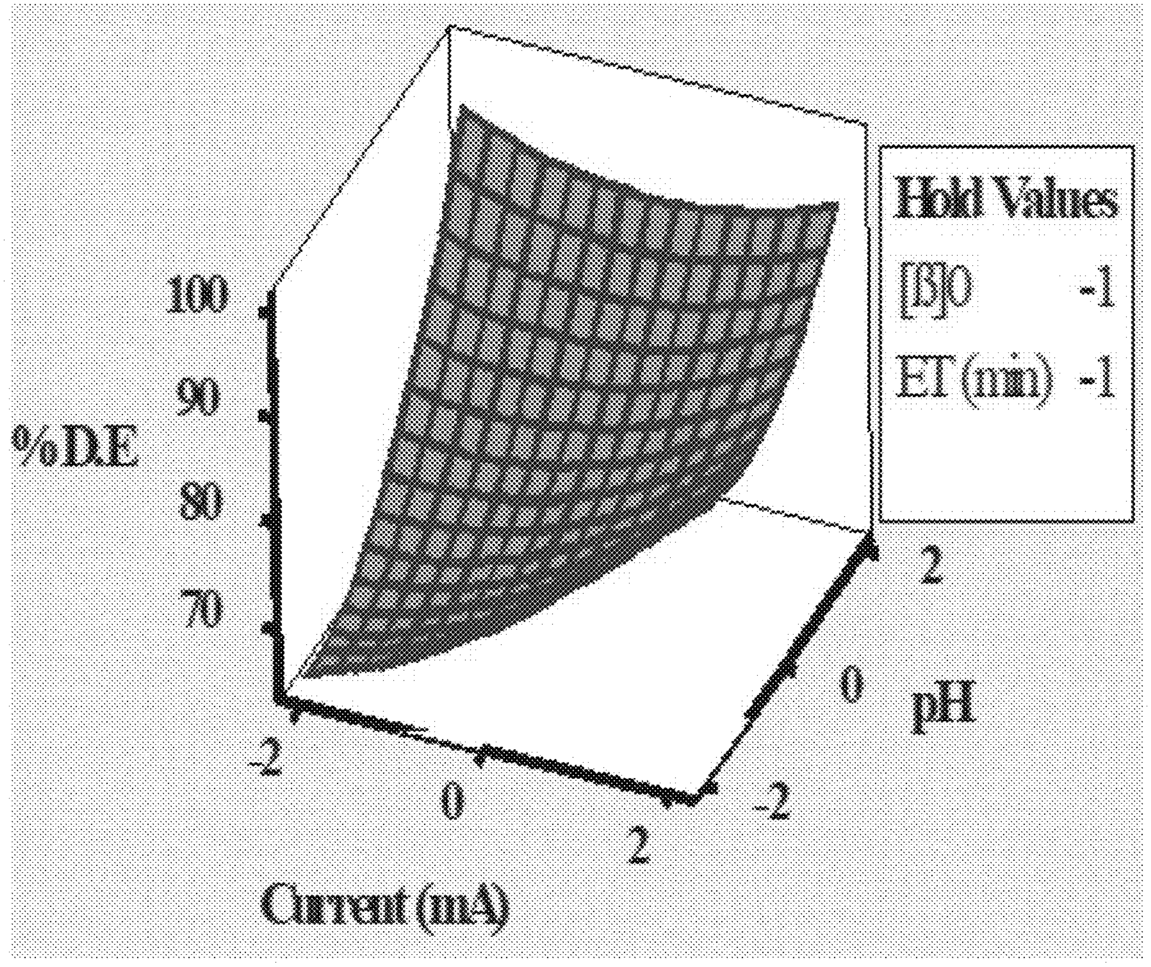
FIG. 10C shows a 3D response surface plot of the effects of the interaction of applied current (mA) with pH on β-blocker removal efficiency (% DE)
Figure 10D:
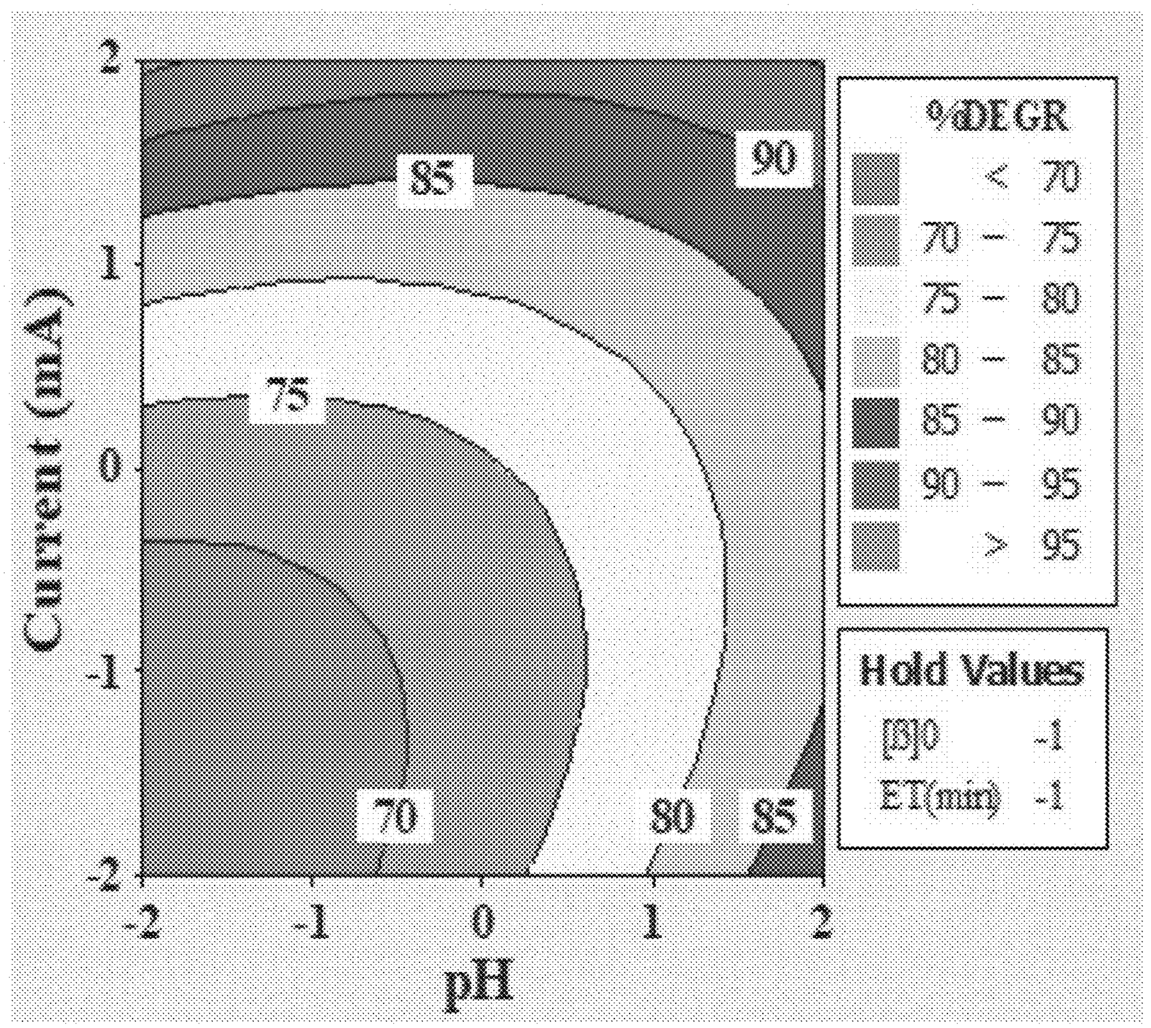
FIG. 10D shows a 2D contour plot of the effects of the interaction of applied current (mA) with pH on β-blocker removal efficiency (% DE)

FIGS. 10A to 10D show 3D response surface and 2D contour plots of the effects of the interaction of initial β-blocker concentration, $[\beta]_0$, with applied current in mA (FIGS. 10A and 10B) on β-blocker degradation efficiency (% DE) or the effects of the interaction of applied current (mA) and pH on β-blocker degradation efficiency (% DE) (FIGS. 10C and 10D).

The simultaneous effects of two of the operational variables on β-blocker degradation efficiency (% DE) are represented by 2D contour and 3D response surface plots. This was made possible by holding some variables constant (at improved levels) while varying the examined variables over the experimental range. The graphical representations in FIGS. 10A and 10B depict the significance of the mutual interaction between variables from which useful information about the operation of the system can be extracted. As illustrated in FIGS. 10A and 10B, the β-blocker degradation efficiency (% DE) in the DFEF system was current-dependent and was found to increase with an increase in applied current initially. When the applied current increased from 100 mA towards 500 mA, a noteworthy trend in β-blocker degradation efficiency may be realized, as illustrated in FIG. 10B. The results may indicate that a more rapid β-blocker degradation can attain upon increasing the applied current to a specific improved value. This trend may be mainly attributable to (i) faster $H_2O_2$ production and (ii) faster regeneration of $Cu^+/Cu^{2+}$ and $Fe^{2+}$ at relatively increased current, leading to increased ˙OH production. These rate increases can contribute to enhanced degradation efficiency.

The probable reason for this behavior is that, with the graphite electrode surface modification, more surface particle electrodes become polarized and increasing applied current leads to enhanced surface redox. However, the decrease in degradation efficiency at high applied current is likely mainly due to the onset of parasitic reactions. These results are attributable to the fast and increased ˙OH generation from Fenton's reaction, due to the cathode electrode modification, reactor design, and/or anodic oxidation at the BDD electrode. The DFEF experimental set-up described herein allows a large electrode surface area to be in contact with the sample solution.

Increased applied current, therefore, leads to an increased number of polarized particle surface electrodes, which enhances the surface redox processes leading to increased $H_2O_2$ production at the cathode. The presence of immobilized heterogeneous catalytic particles can result in electrogeneration of more ˙OH radicals. As a result, improved β-blockers degradation efficiency is promoted. Use of a BDD anode may also continuously and increasingly spawn ˙OH production as BDD $(\cdot OH)_{ads}$, which in turn generates more $H_2O_2$.

However, as the applied current increased to values around 500 mA, a marked decrease in $H_2O_2$ electro-generation occurs, due to $H_2O_2$ oxidation at the anode as shown in Equations 11 and 12. As current increases, a point is reached when a 4-electron ORR (Equation 13, below) supplants the 2-electron ORR (Equation 1, above) resulting in more significant reduction in $H_2O_2$ production. High applied current may also aggravate parasitic side reactions unfavorable to continuous $H_2O_2$ production, as in Equations 14 to 17, below.

$$H_2O_2 \rightarrow HO_2^{\cdot} + H^+ + e^- \qquad \text{Eq. 11}$$

$$HO_2^{\cdot} \rightarrow O_2 + H^+ + e^- \qquad \text{Eq. 12}$$

$$O_2 + 4H^+ + 4e^- \rightarrow 2H_2O \qquad \text{Eq. 13}$$

$$2H^+ + 2e^- \rightarrow H_2 \qquad \text{Eq.14}$$

$$Fe^{2+} + HO^{\cdot} \rightarrow Fe^{3+} + OH^- \qquad \text{Eq. 15}$$

$$2HO^{\cdot} \rightarrow H_2O_2 \qquad \text{Eq. 16}$$

$$H_2O_2 + HO^{\cdot} \rightarrow H_2O + HO_2^{\cdot} \qquad \text{Eq. 17}$$

The pH of the sample solution can influence the performance of most advanced oxidation processes (AOPs). The effective operation of heterogeneous AOPs can cover a wide pH range, while transition metal ion-activated homogeneous AOPs can operate under restrictive acidic conditions. FIGS. 10C and 10D illustrate the synergistic effect of current and pH on DE % for an initial β-blockers concentration of 400 ng/ml and an electrolysis time of 10 minutes. As shown in FIGS. 10C and 10D, DE % is greatest at pH 3 and remains almost constant, above 90%, over a pH range of 4 to 7, then decreases when the pH tends towards 8. These observations indicate that the DFEF system with a Cu—B—FE composite cathode can effectively work under wider pH ranges spanning from 3 to 7. Hydrogen peroxide catalytic decomposition for ˙OH production favored by the presence of $Fe^{3+}$ at low acidic conditions and is enhanced by $Cu^{2+}$ at increasing pH on account of the deprotonated form of $H_2O_2$, i.e., $HO^{2-}$, as the major electron donor for the reduction of $Cu^{2+}$, appearing at pKa of nearly 11.6.

The 4-parameters influencing the β-blocker degradation efficiencies (% DE) were enhanced using response analysis approach. With this approach, parameter values that result in maximum β-blockers degradation efficiency identified. 100% was set as the target value for the β-blocker % DE while the lower value was set at 55. Since the upper value has to be higher than the target value, it was set at 110 while the weight and importance were all set to 1. Table 5 shows the results of the analysis and validation.

TABLE 3

Conditions, prediction, and composite desirability of the model

| | $[\beta\text{-Blockers}]_0$ | I (mA) | ET (min) | pH | Composite Desirability | Predicted % degradation |
|---|---|---|---|---|---|---|
| 1 | 200 | 100 | 10.00 | 7.0 | 0.98995 | 99.9978 |

TABLE 3-continued

| Conditions, prediction, and composite desirability of the model | | | | | | |
|---|---|---|---|---|---|---|
| Validation of conditions | | | | | % Ave. (PROP) | % Ave. (ATE) |
| $V_1$ | 200 | 100 | 10.00 | UN | 99.987 | 99.977 |
| $V_2$ | 200 | 100 | 10.00 | UN | 99.979 | 99.959 |
| $V_3$ | 200 | 100 | 10.00 | UN | 99.956 | 99.921 |

UN: without pH adjustment (the measured pH of hospital wastewater was 6.8). Each measurement is an average of triplicate readings.

The model was able to predict 99.9978% β-blockers degradation efficiency and with the great composite desirability of 0.98995. The conditions were then validated using triplicate experiments ($V_1$-$V_3$) as shown in Table 5. Since the best pH for degradation was 7.0, and the pH of the sample solution was 6.8, the validation experiments were conducted without pH adjustment. The % DE obtained for the β-blockers, ATE and PROP, was at least 99.9%.

Figure 11:
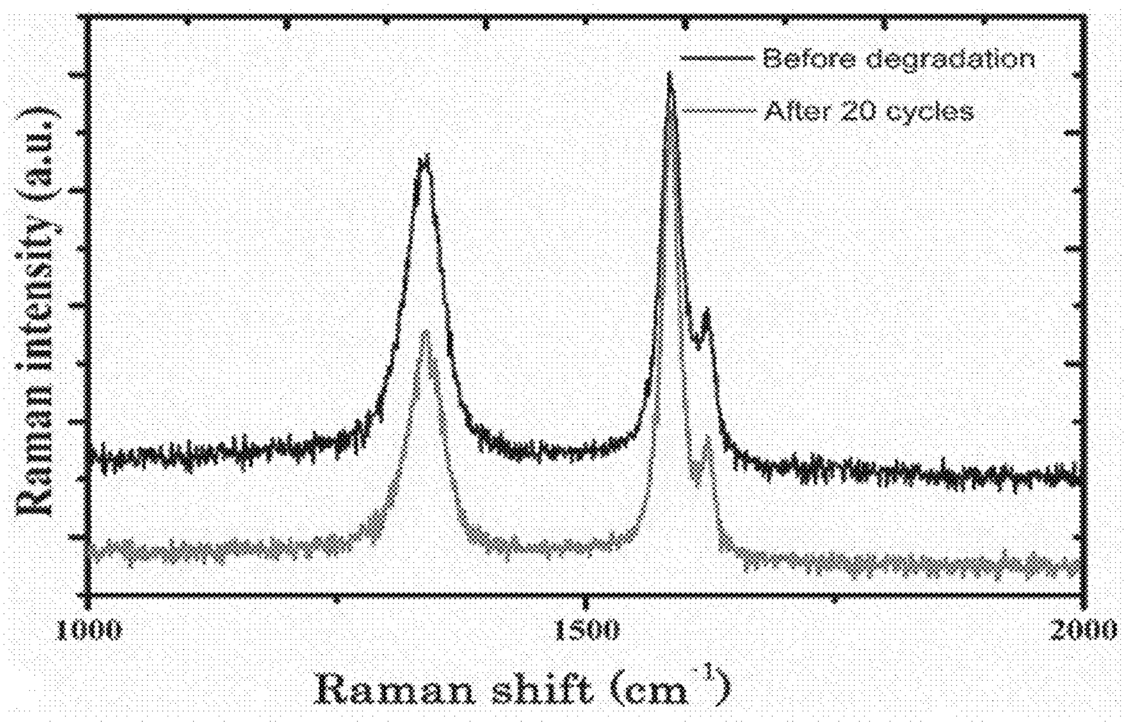
FIG. 11 shows surface enhanced Raman spectra of 20-SMGE before degradation and after 20 cycles of electrode reuse in a DFEF system.

FIG. 11 shows surface enhanced Raman spectra of 20-SMGE before degradation and after 20 cycles of electrode reuse in a DFEF system. Electrode stability often takes precedence in practical applications. Under identical conditions, the same electrode was repetitively used in DFEF degradation of PROP and ATE (not shown). No significant change in β-blockers degradation efficiencies even after the $20^{th}$ cycle was realized. Both ATE and PROP had the pseudo-first-order degradation rate constants of 0.016 and 0.014 $min^{-1}$ respectively after one cycle of treatment. However, after 20 cycles of repeated degradation experiments, the average degradation rate constants for both ATE and PROP were 0.013 and 0.012 $min^{-1}$ respectively, which fall within the same order of magnitude as the rate constants in a single cycle of treatment.

This therefore demonstrated that the inventive integrated cathode electrodes are stable and reusable for subsequent DFEF degradation experiments at nearly neutral pH. These observations are further supported by Raman spectra of the electrodes before and after 20 cycles of DFEF degradation studies, shown in FIG. 11. The characteristic D, G and $D^1$ Raman bands for the 20-SMGE electrodes before degradation were at 1352, 1584, and 1626 $cm^{-2}$ respectively, and, there was a slight peak shifting to 1354, 1590, and 1630 $cm^{-1}$ after 20 cycles of degradation. These slight differences in band positions suggest that the band positions fall within acceptable ranges and 20-SMGE is stable even after 20 treatment cycles.

Figure 12:
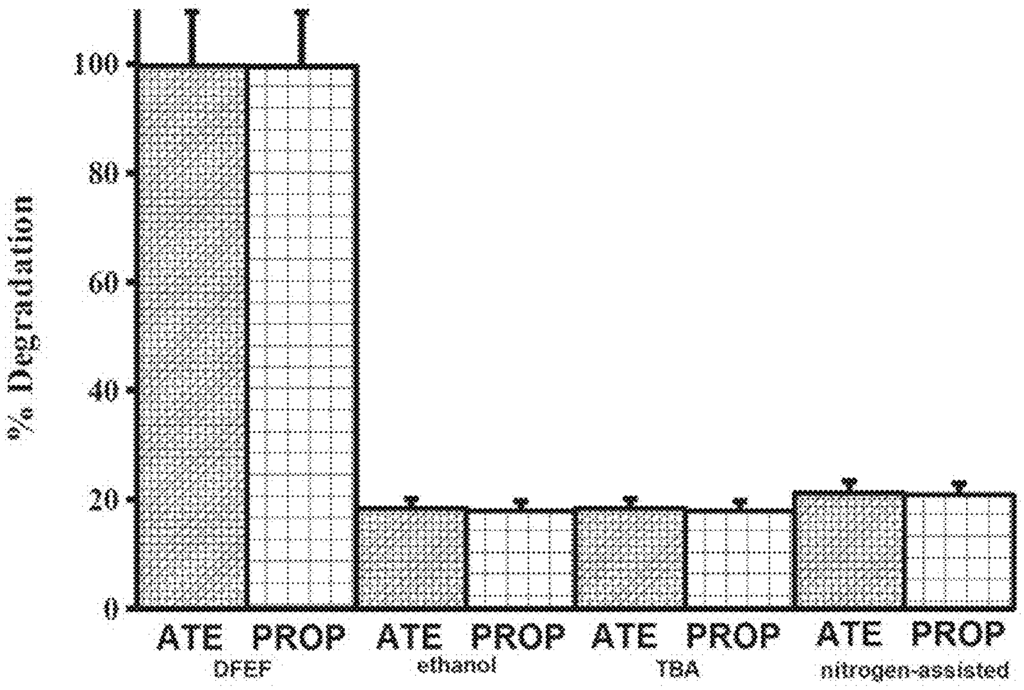
FIG. 12 shows charts of the effect of radical scavengers and nitrogen on DFEF degradation efficiency of ATE and PROP, versus an experiment in ethanol (1/10, v/v) as an ˙OH scavenger), an experiment in t-butyl alcohol (TBA, 1/10, v/v) as a ˙OH scavenger, and in $N_2$-assisted Flow-EF, each under enhanced conditions.

FIG. 12 shows charts of the effect of radical scavengers and nitrogen on DFEF degradation efficiency of ATE and PROP, versus an experiment in ethanol (1/10, v/v) as an $^{\cdot}OH$ scavenger), an experiment in t-butyl alcohol (TBA, 1/10, v/v) as a $^{\cdot}OH$ scavenger, and in $N_2$-assisted Flow-EF, each under conditions. Different types of radical scavenging mechanisms may be possible for degradation on the surface of a 20-SMGE cathode electrode under a DFEF system. As illustrated in FIG. 12 and after adding $^{\cdot}OH$ scavengers, i.e., tert-butyl alcohol (TBA) or ethanol, there was a significant decrease in the degradation efficiency for both ATE and PROP. This drop in degradation efficiency demonstrates a contribution of the generated $^{\cdot}OH$ radicals in the DFEF system towards β-blockers degradation. Also, when the DFEF experiments were performed in an inert $N_2$ atmosphere, on the right side of FIG. 12, with $N_2$ as a source of droplet spray at the cathode electrode, the % DE for both ATE and PROP significantly decreased.

Based on these results, without wishing to be bound to any theory, the probable EF oxidation mechanism at the 20-SMGE electrode surface may involve: (i) continuous adsorption and diffusion of air on the modified electrode; (ii) continuous electro-catalytic conversion of $O_2$ to $H_2O_2$ via a 2-electron oxygen reduction reactions, shown in Equation 1, above; (iii) subsequent decomposition of $H_2O_2$ to $^{\cdot}OH$ radicals by $Fe^{2+}/Cu^{+}/Cu^{2+}$ in the Cu—B—Fe immobilized graphite electrode surface using, according to Equations 2 and 4, above, and Equation 18, below, $$Fe^{3+}+Cu^{+}\rightarrow Fe^{2+}+Cu^{2+} \quad \text{Eq. 18,}$$

wherein, in Equation 18, it can be seen that copper can serve to facilitate the reduction of $Fe^{3+}$ to $Fe^{2+}$; (iv) the $^{\cdot}OH$ radicals then oxidize the (electron-rich) β-blocker; (v) in the process, $Fe^{3+}$ and $Cu^{2+}$ are continuously regenerated.

The inventive graphite electrodes can provide excellent support for the Fenton catalyst as well as favorable surface (active sites) for ORR via a 2-electron pathway. Through the graphite network enriched with boron atoms, $Fe^{2+}$ can engage the electrons and serve the Fenton role of in situ generator of $^{\cdot}OH$ radicals via reversible redox reactions. The generation of mainly $^{\cdot}OH$ radicals in the DFEF system can oxidize β-blocker pollutants. The DFEF reactor can improve systemic oxygen saturation at the cathode electrode and enhance the mass transfer kinetics of pollutant molecules during treatment.

Figure 13:
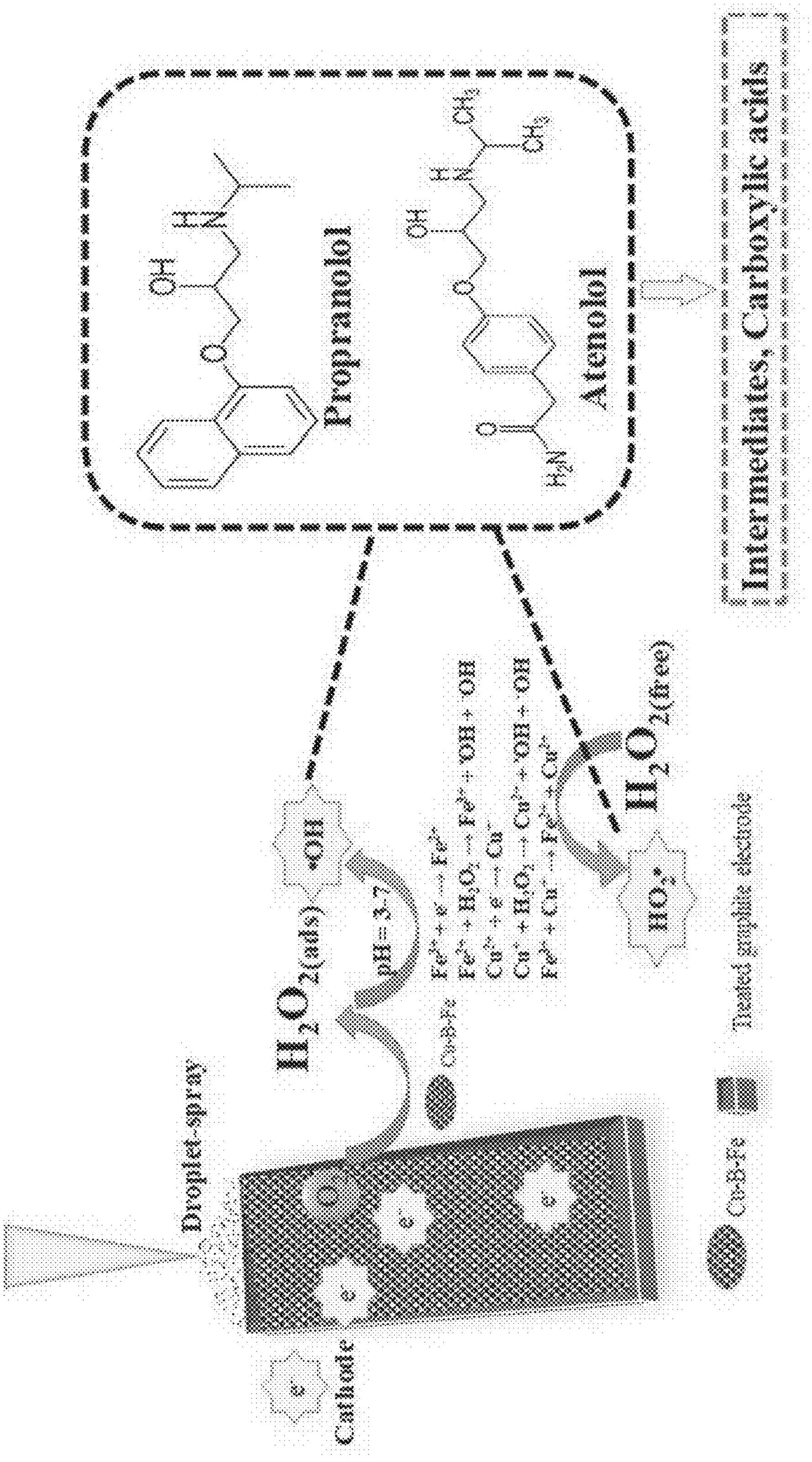
FIG. 13 shows a proposed electrode surface mechanism for β-blocker degradation in an exemplary DFEF system.

FIG. 13 shows a proposed electrode surface mechanism for β-blocker degradation in an exemplary DFEF system. The proposed overall degradation mechanism on a 20-SMGE electrode surface is depicted in FIG. 13.

Figure 14A:
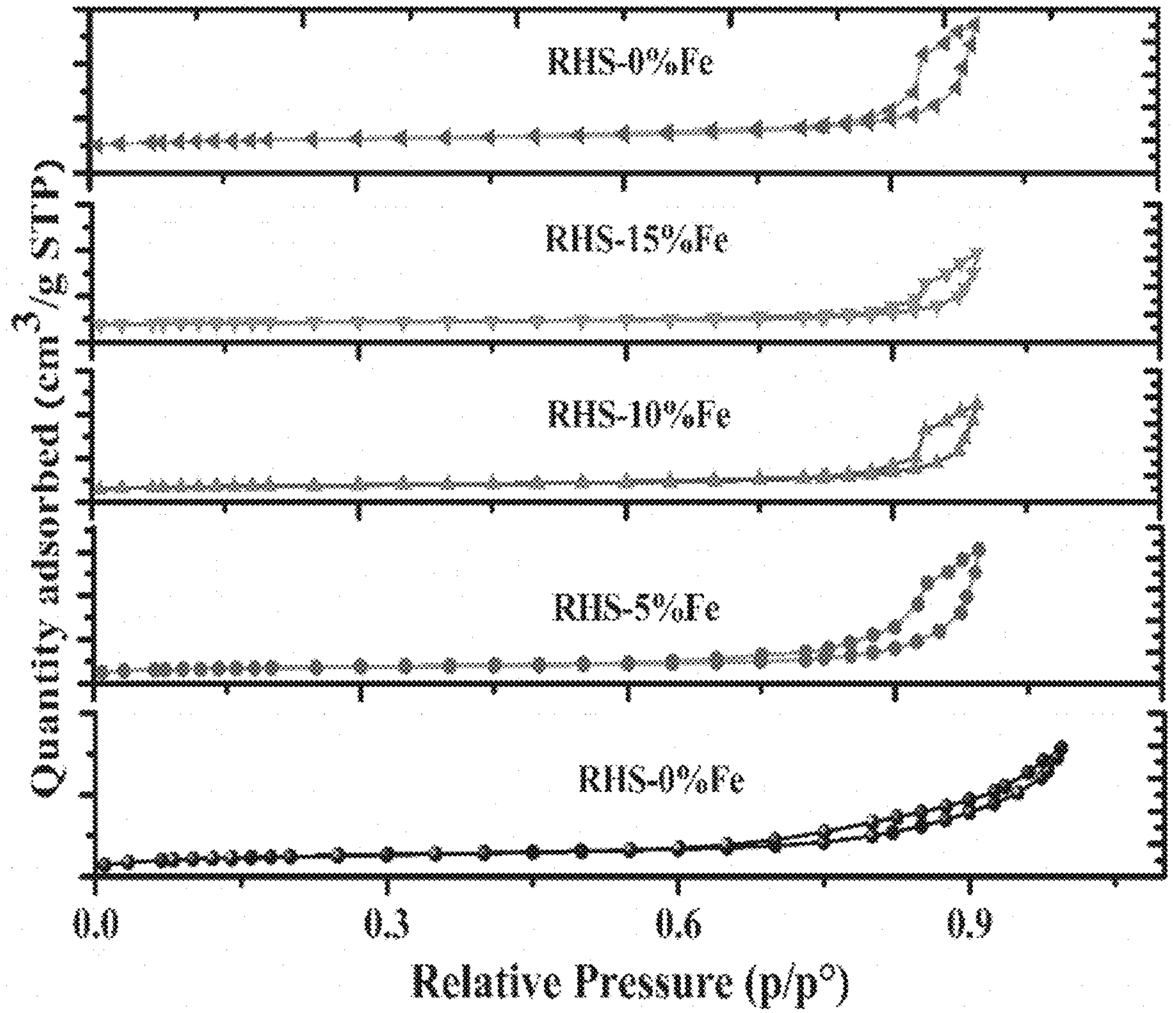
FIG. 14A shows $N_2$ sorption isotherms of rice hull silica doped by iron in wt. % (RHS-x % Fe) nanocomposites.
Figure 14B:
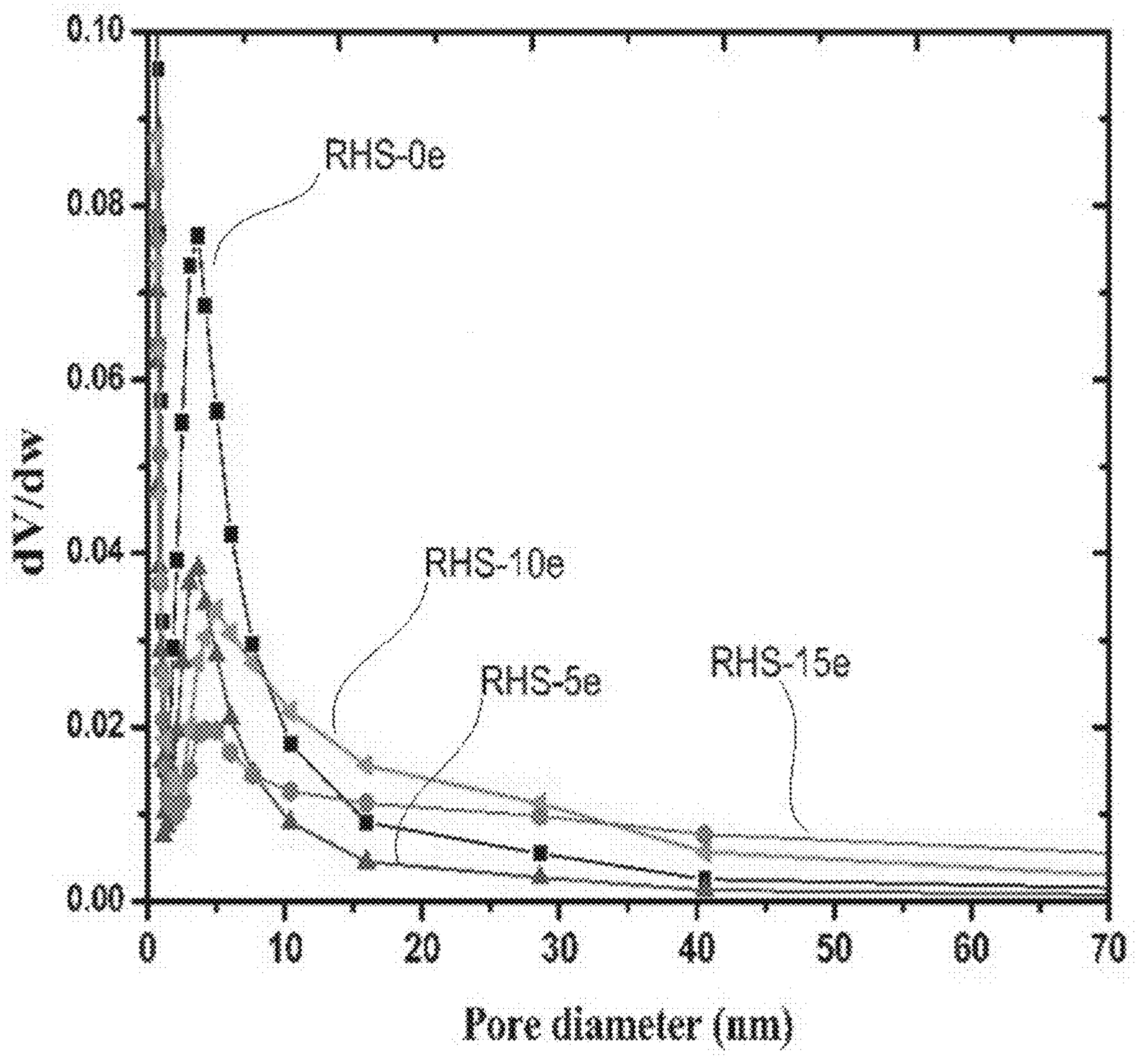
FIG. 14B shows pore size distribution obtained from Barrett, Joyner, and Halenda (BJH) adsorption analysis of RHS-x % Fe nanocomposites.

FIGS. 14A and 14B show $N_2$ sorption isotherms of rice hull silica (RHS)-x % Fe nanocomposites and pore size distribution obtained from Barrett, Joyner, and Halenda (BJH) adsorption analysis of RHS-x % Fe nanocomposites.

Figure 15A:
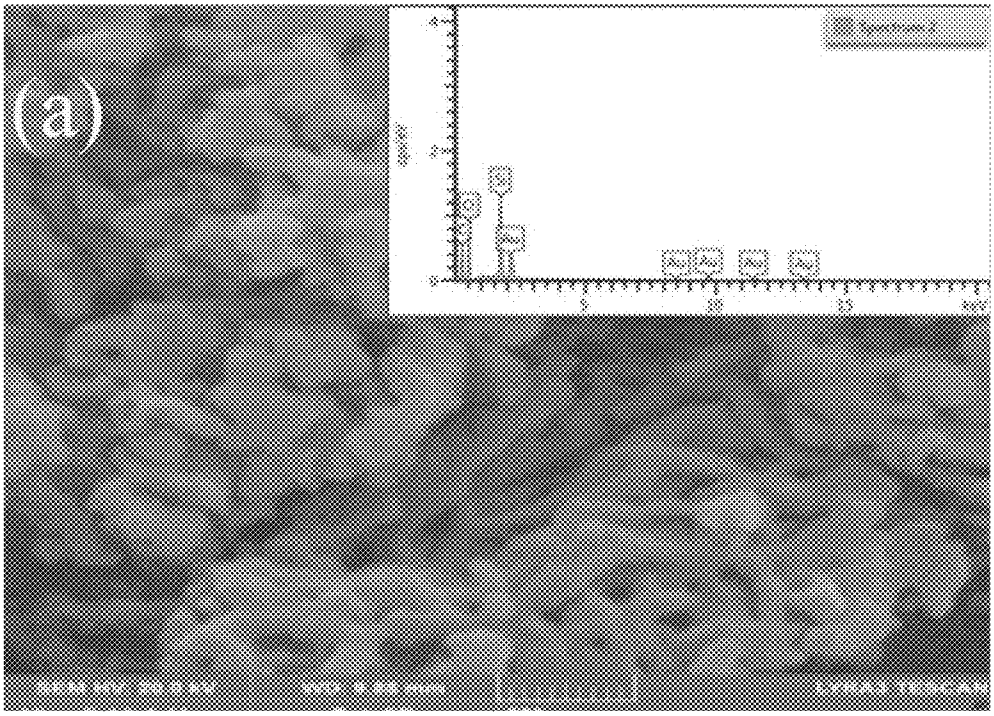
FIG. 15A shows a field emission scanning electron microscope (FE-SEM) micrograph with an inset energy-dispersive X-ray spectroscopy (EDS) spectrum of RHS-0% Fe.
Figure 15B:
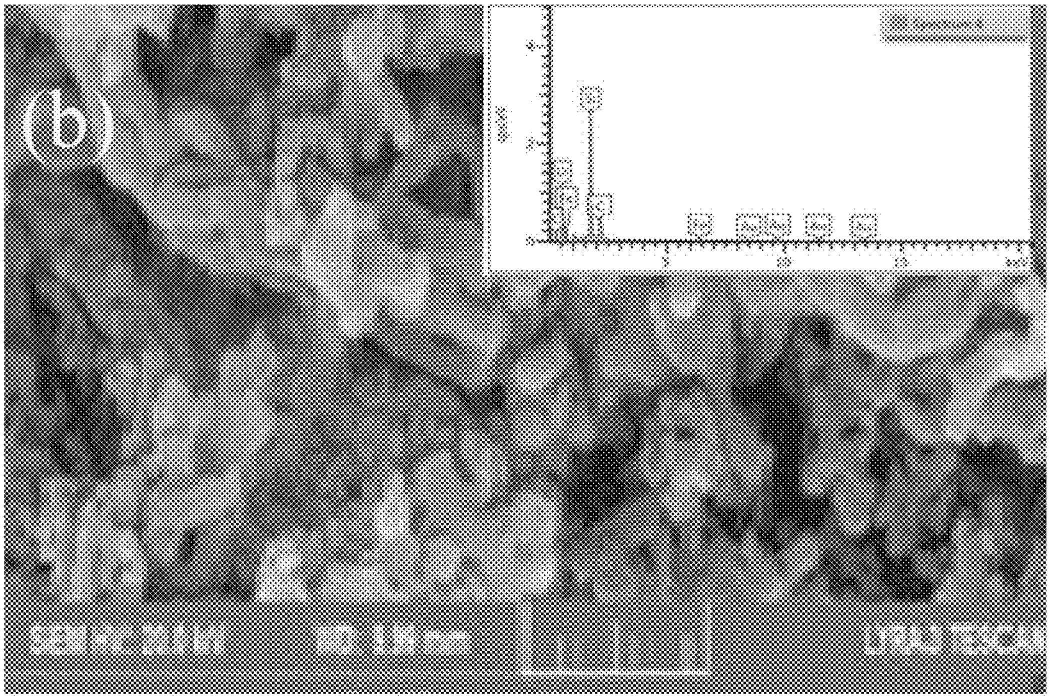
FIG. 15B shows an FE-SEM micrograph with an inset energy-dispersive X-ray spectroscopy (EDS) spectrum of RHS-10% Fe.
Figure 15C:
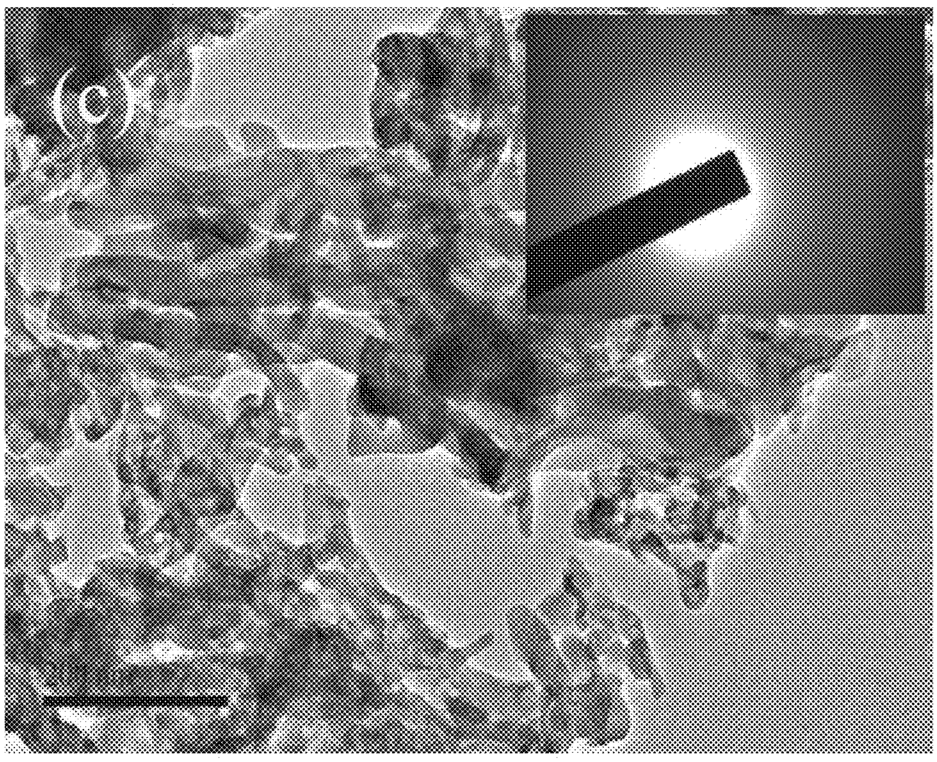
FIG. 15C shows a transmission electron microscope (TEM) micrograph with an inset selected area electron diffraction (SAED) image of RHS-0% Fe.
Figure 15D:
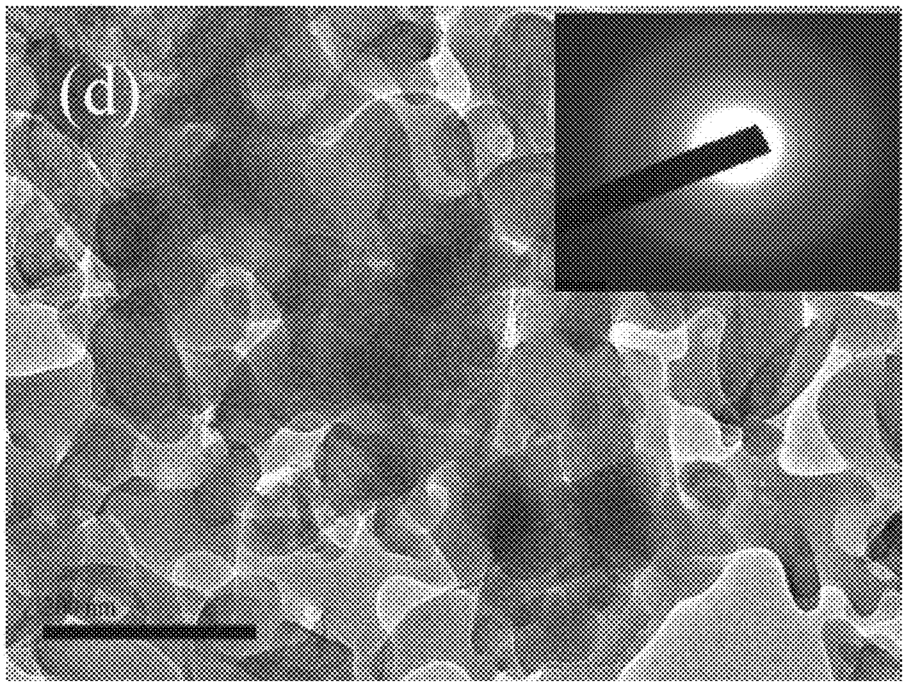
FIG. 15D shows a TEM micrograph with an inset SAED image of RHS-10% Fe.

FIG. 15A shows a field emission scanning electron microscope (FE-SEM) micrograph with an inset energy-dispersive X-ray spectroscopy (EDS) spectrum of RHS-0% Fe. FIG. 15B shows an FE-SEM micrograph with an inset EDS spectrum of RHS-10% Fe. FIG. 15C shows a transmission electron microscope (TEM) micrograph with an inset selected area electron diffraction (SAED) image of RHS-0% Fe. FIG. 15D shows a TEM micrograph with an inset SAED image of RHS-10% Fe.

Figure 16A:
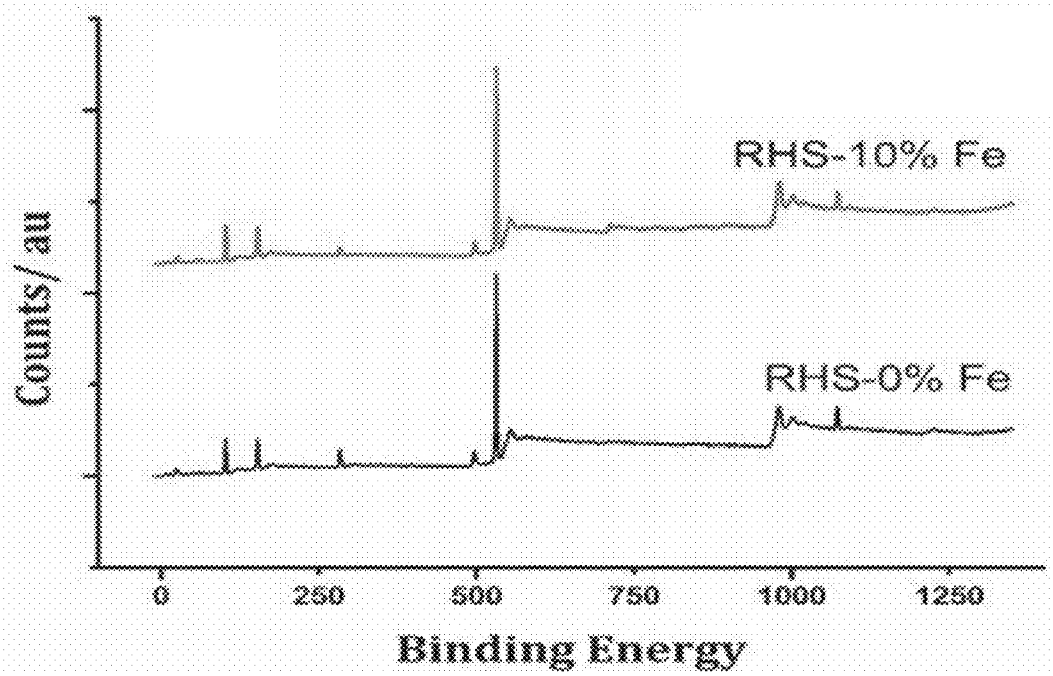
FIG. 16A shows an x-ray photoelectron spectroscopy (XPS) survey spectrum for RHS-0% Fe and RHS-10% Fe nanocomposites.
Figure 16B:
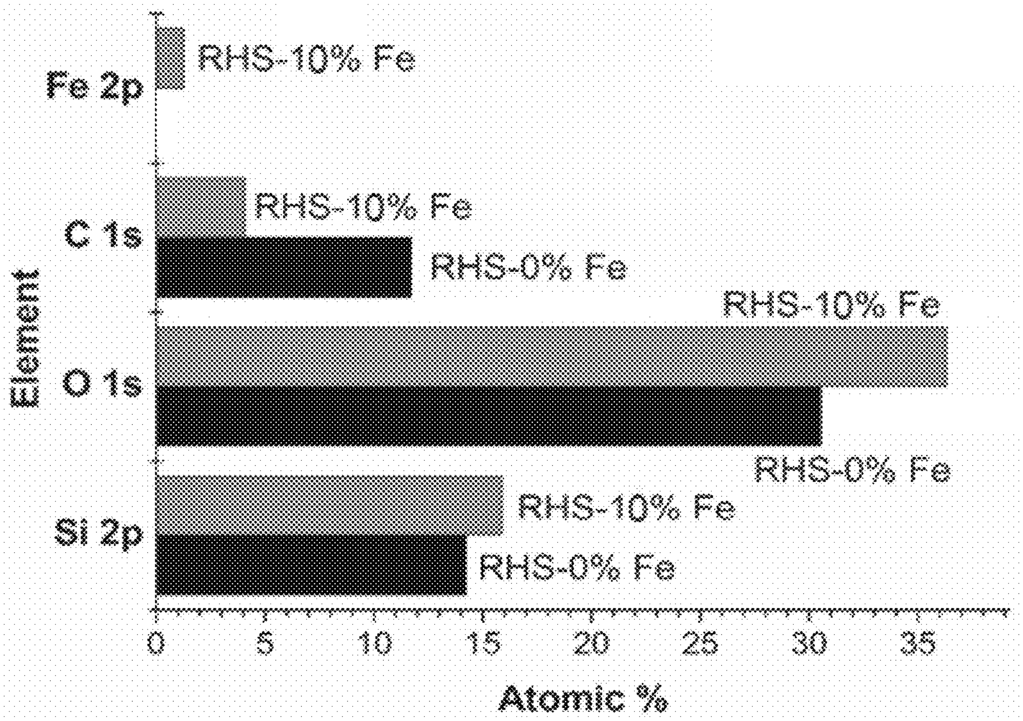
FIG. 16B shows an elemental composition analysis of RHS-0% Fe and RHS-10% Fe nanocomposites.
Figure 16C:
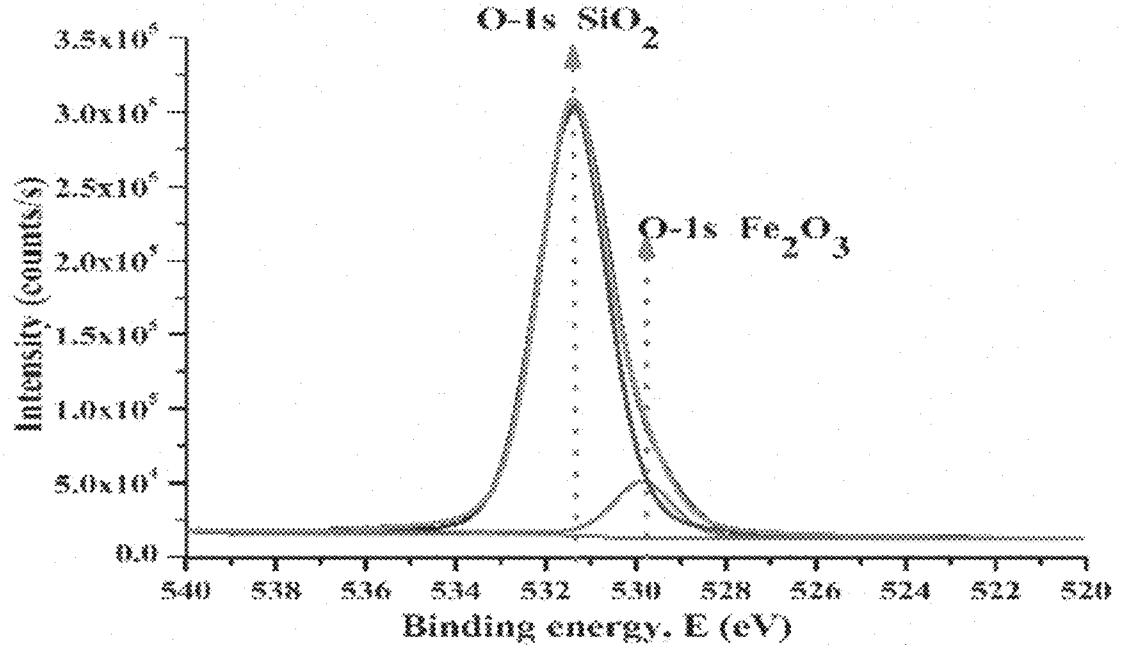
FIG. 16C shows a high resolution XPS spectrum for oxygen (O 1s)
Figure 16D:
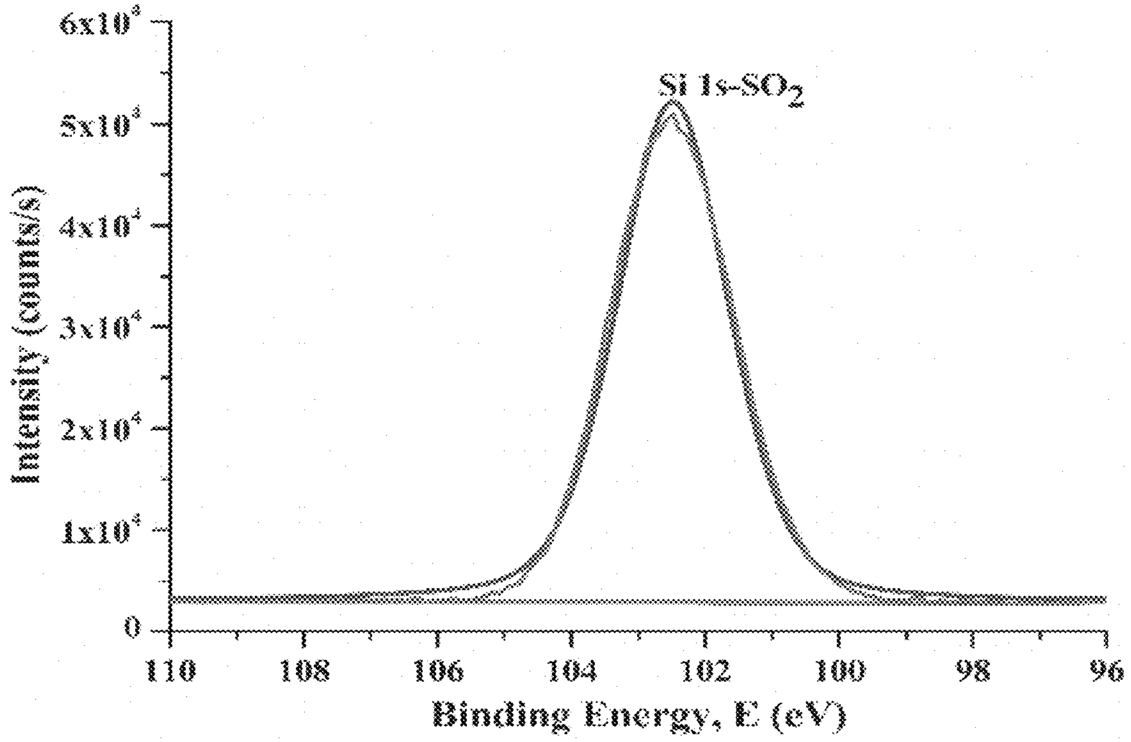
FIG. 16D shows a high resolution XPS spectrum for silicon (Si 1s)
Figure 16E:
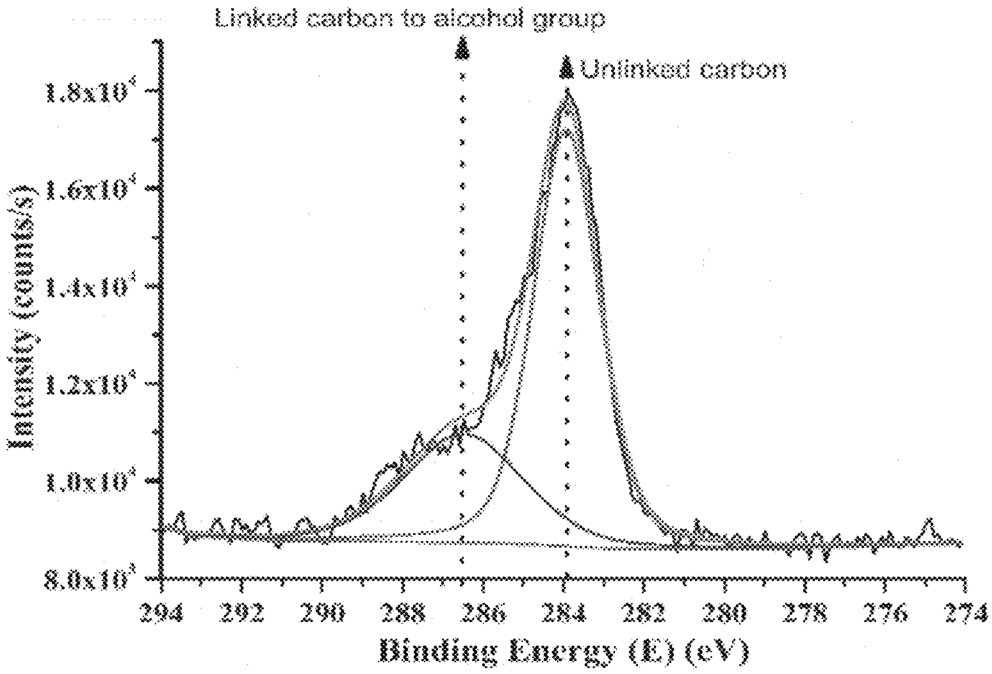
FIG. 16E shows a high resolution XPS spectrum for carbon (C Is)
Figure 16F:
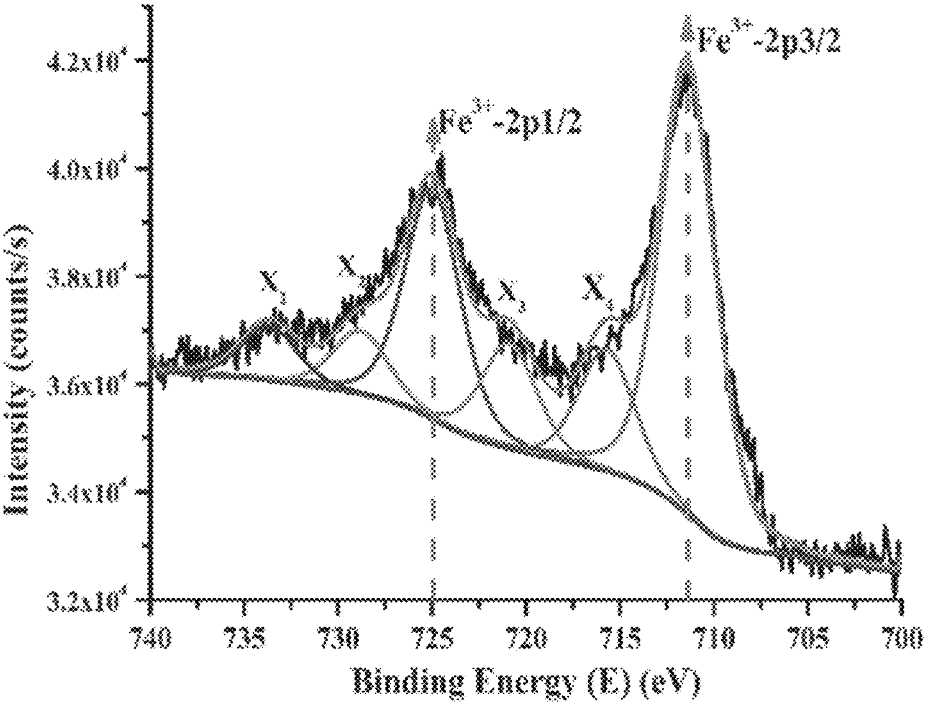
FIG. 16F shows a high resolution XPS spectrum for iron (Fe 2p)

FIG. 16A shows an x-ray photoelectron spectroscopy (XPS) survey spectrum for RHS-0% Fe and RHS-10% Fe nanocomposites. FIG. 16B shows an elemental composition analysis of RHS-0% Fe and RHS-10% Fe nanocomposites. FIGS. 16C to 16F show a high resolution XPS spectra for oxygen (O 1s), silicon (Si 1s), carbon (C Is), and iron (Fe 2p).

Figure 17:
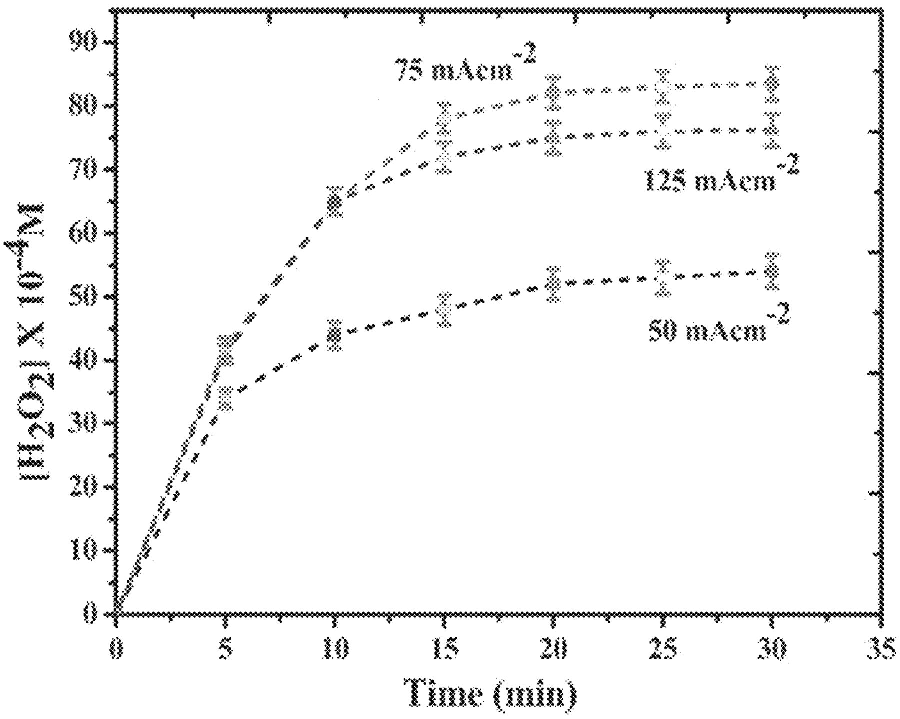
FIG. 17 shows a plot of the amount of electrogenerated $H_2O_2$ using a droplet-impingement flow-assisted electro-Fenton reactor as a function of time at room temperature, for a solution of $Na_2SO_4$ of 0.05 M, initial β-blocker concentration, $[\beta\text{-blockers}]_0$, of 200 ng/mL, RHS-10% Fe concentration of 119 mg/L, as a heterogeneous catalyst source with no pH adjustment.

FIG. 17 shows a plot of the amount of electrogenerated $H_2O_2$ using a droplet-impingement flow-assisted electro-Fenton reactor as a function of time at room temperature, for a solution of $Na_2SO_4$ of 0.05 M, initial β-blocker concentration, $[\beta\text{-blockers}]_0$, of 200 ng/mL, RHS-10% Fe concentration of 119 mg/L, as a heterogeneous catalyst source with no pH adjustment.

Figure 18:
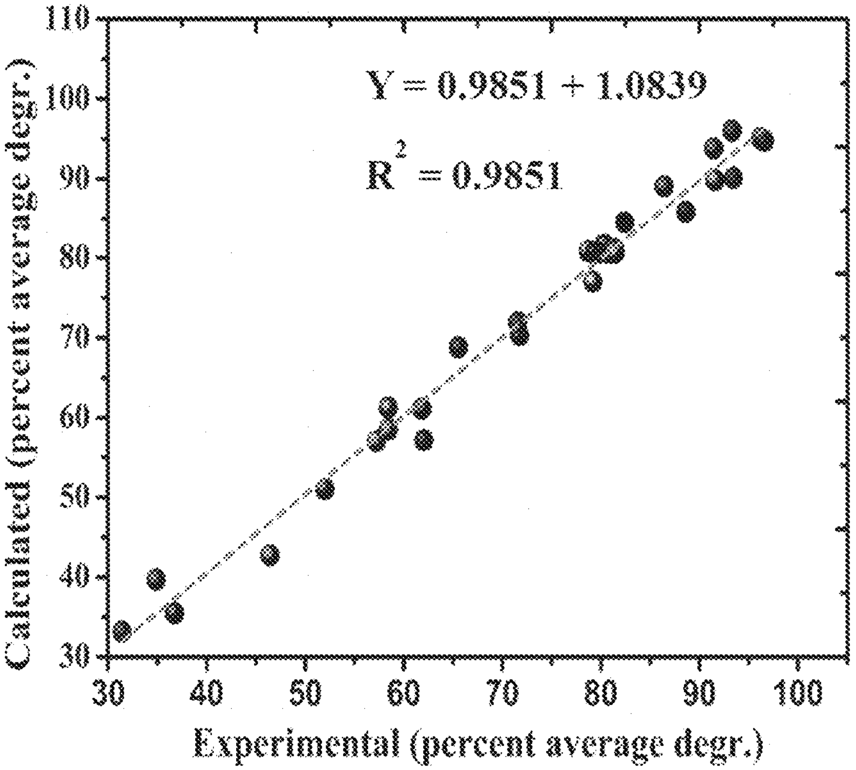
FIG. 18 shows a plot of calculated versus experimental percentage average degradation for β-blockers.
Figure 19A:
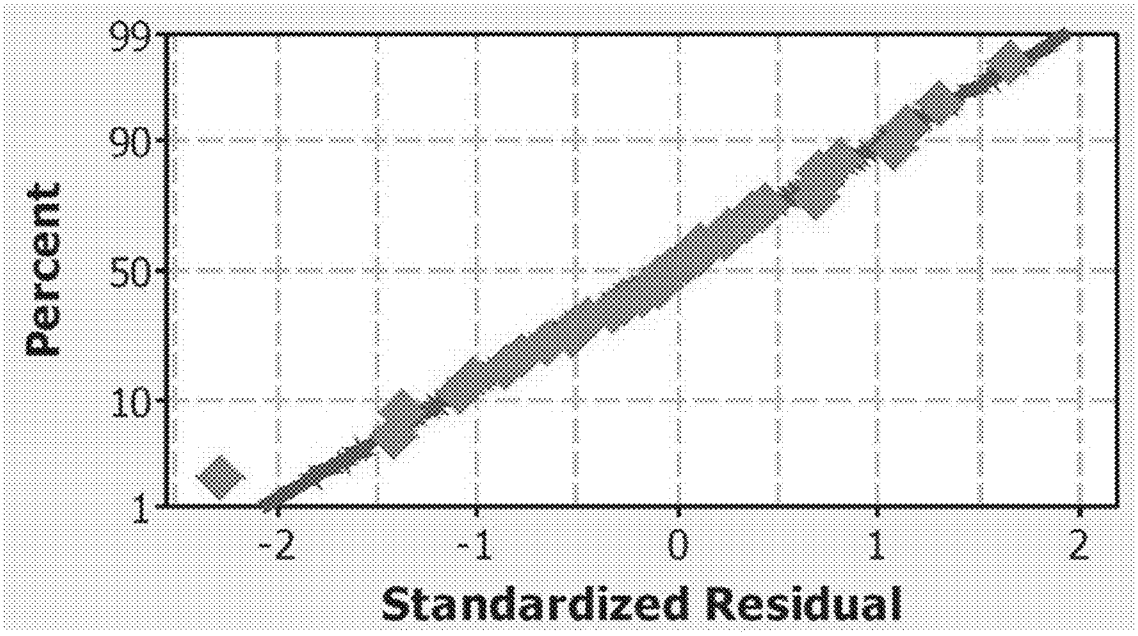
FIG. 19A shows CCD model residual normal probability plot for the percentage average degradation for β-blockers (ACE and PROP)
Figure 19B:
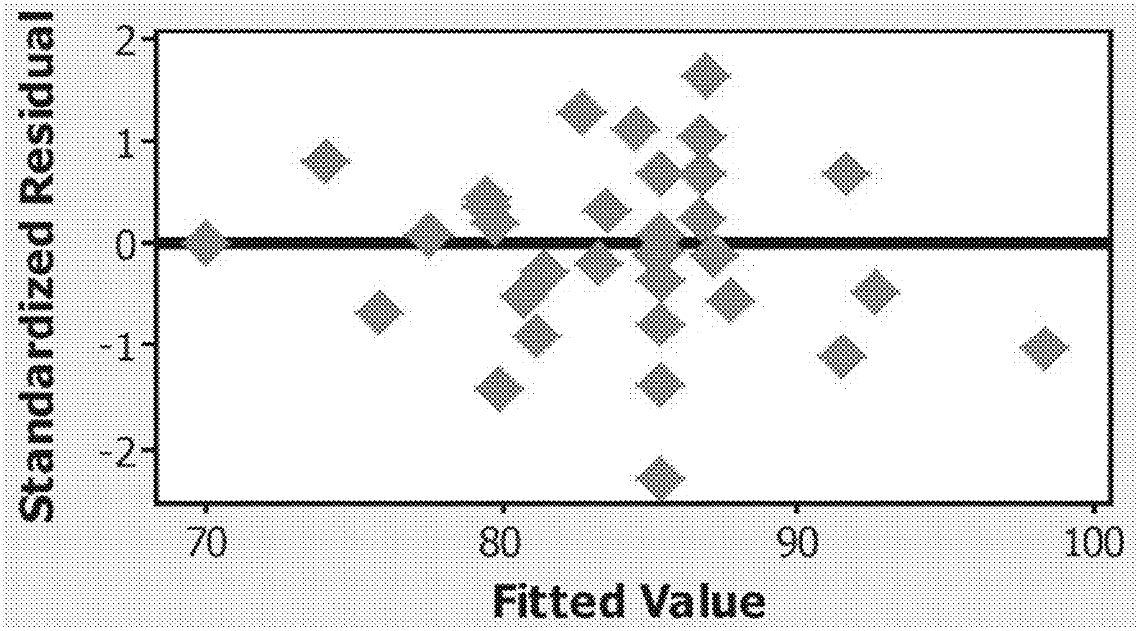
FIG. 19B shows CCD model versus fits plot for the percentage average degradation for β-blockers (ACE and PROP)
Figure 19C:
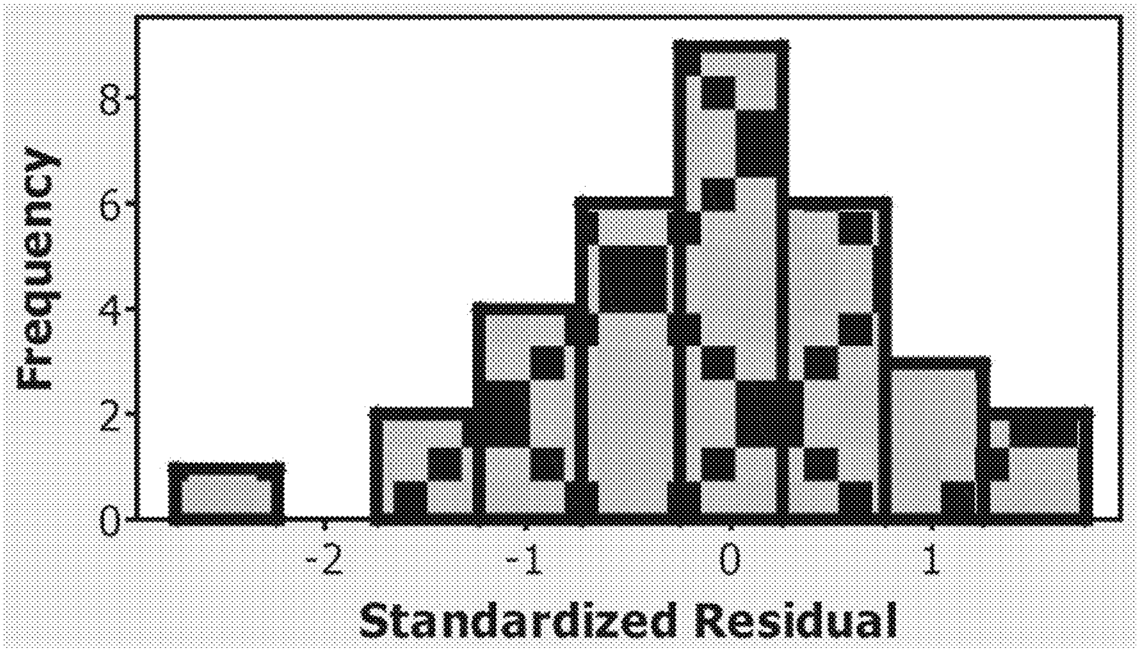
FIG. 19C shows CCD model histogram plot for the percentage average degradation for β-blockers (ACE and PROP)
Figure 19D:
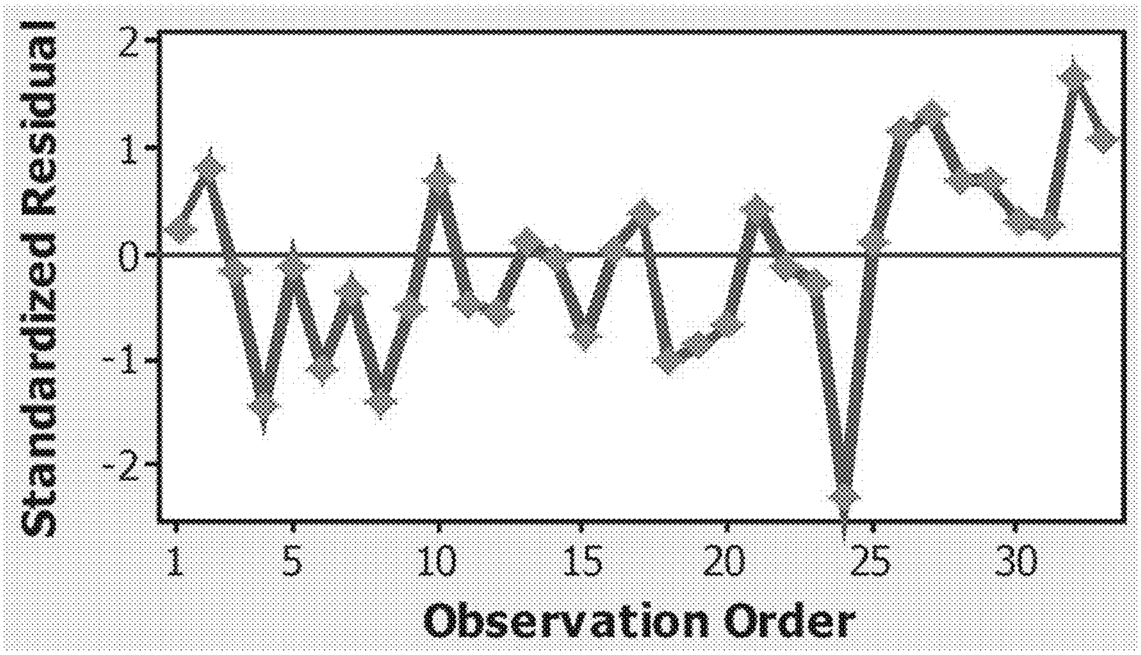
FIG. 19D shows CCD model versus order plot for the percentage average degradation for β-blockers (ACE and PROP)
Figure 20:
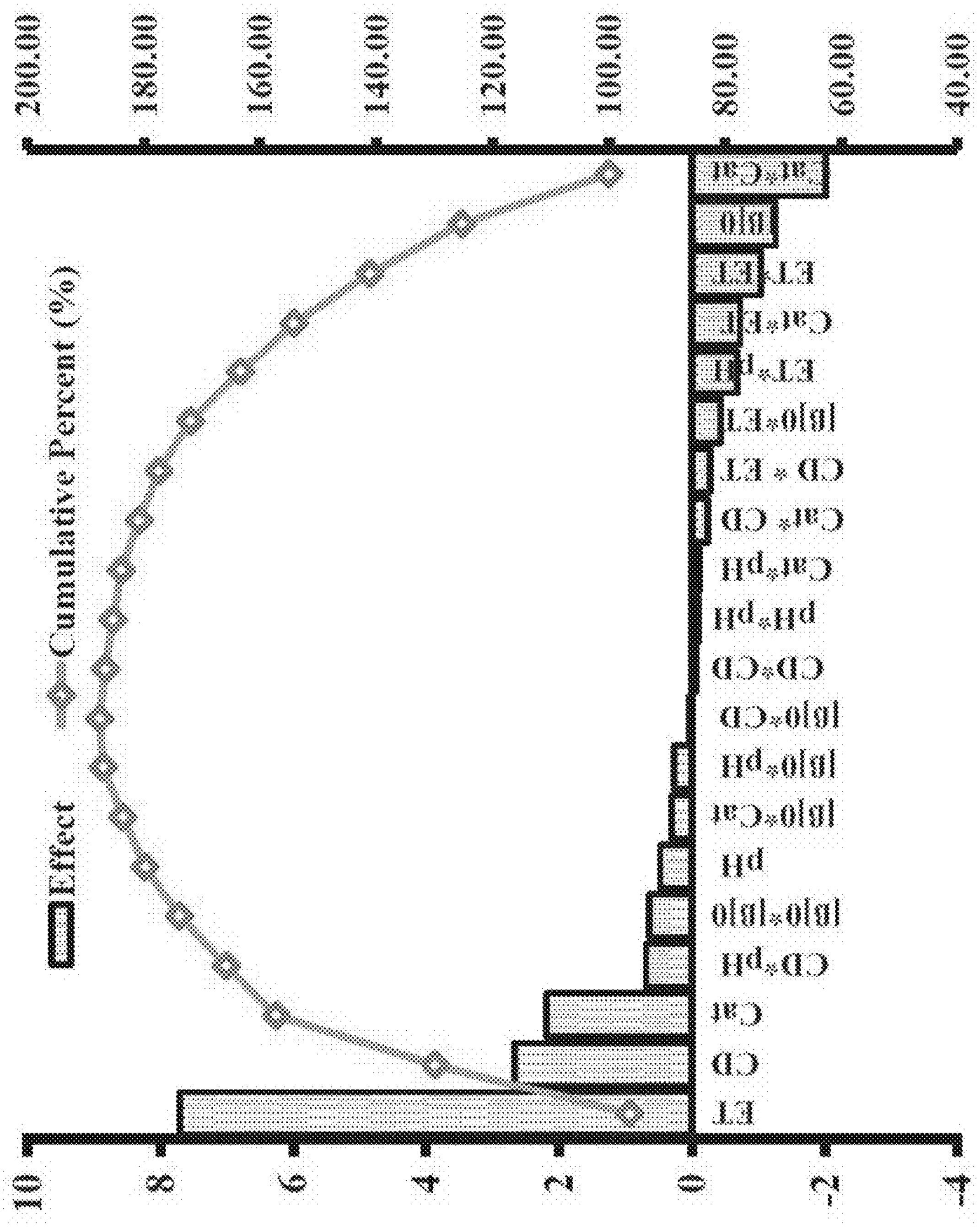
FIG. 20 shows a plot of the Pareto effects graphic analysis for the degradation (%) of β-blockers ACE and PROP.
Figure 21A:
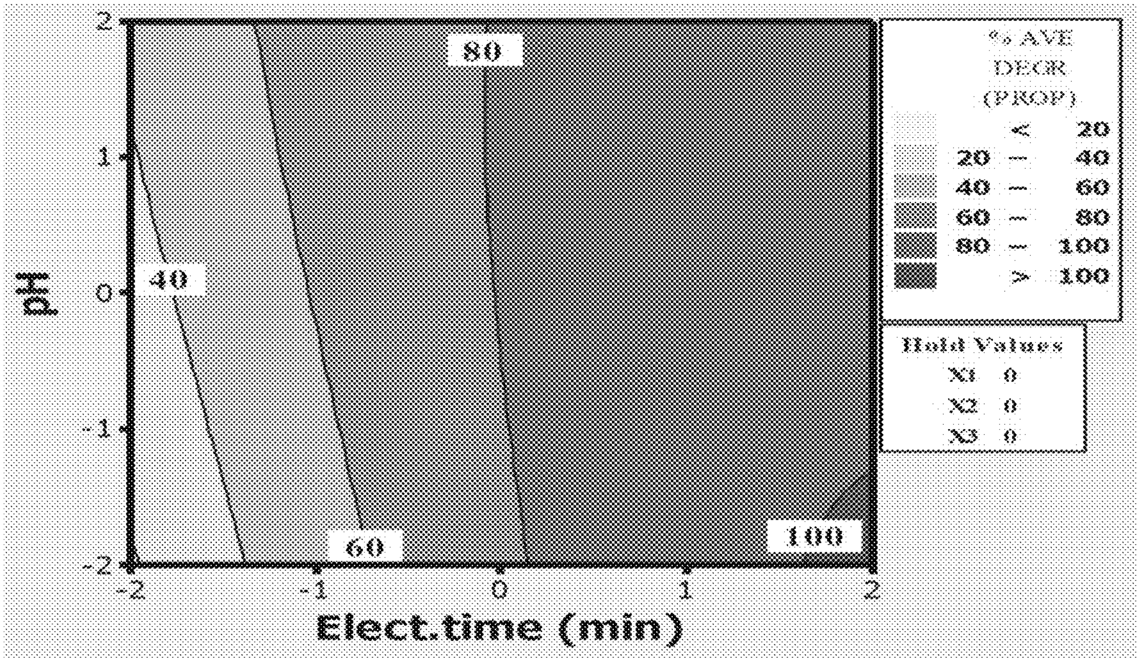
FIG. 21A shows a contour plot of the degradation efficiency (%) as the function of catalyst dosage (mg/L) and reaction time (min)
Figure 21B:
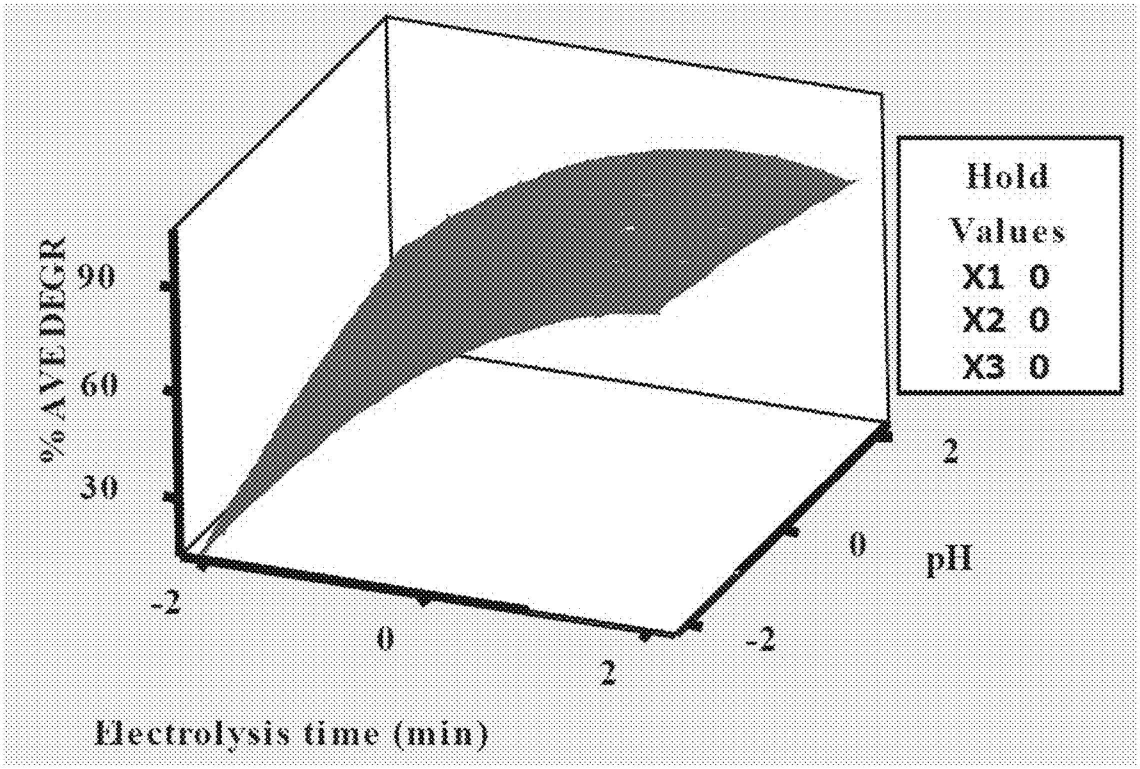
FIG. 21B shows a response surface of the degradation efficiency (%) as the function of catalyst dosage (mg/L) and reaction time (min)
Figure 21C:
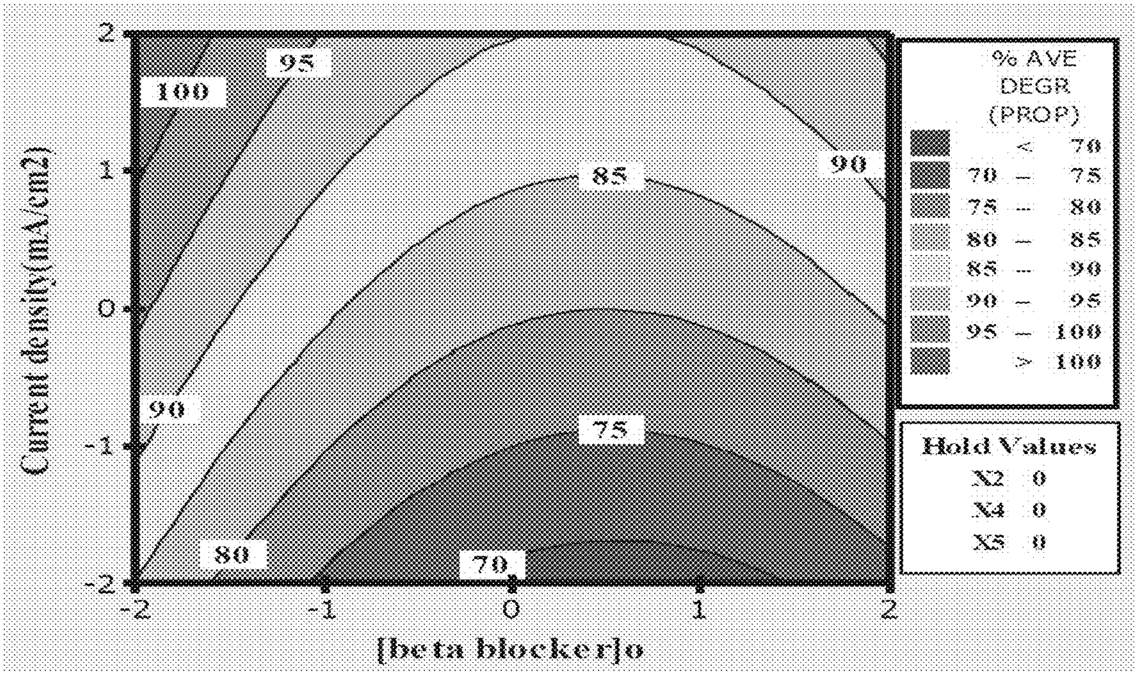
FIG. 21C shows a contour plot of the degradation efficiency (%) as the function of initial β-blocker concentration, $[\beta\text{-blocker}]_0$, and current density ($mA/cm^2$)
Figure 21D:
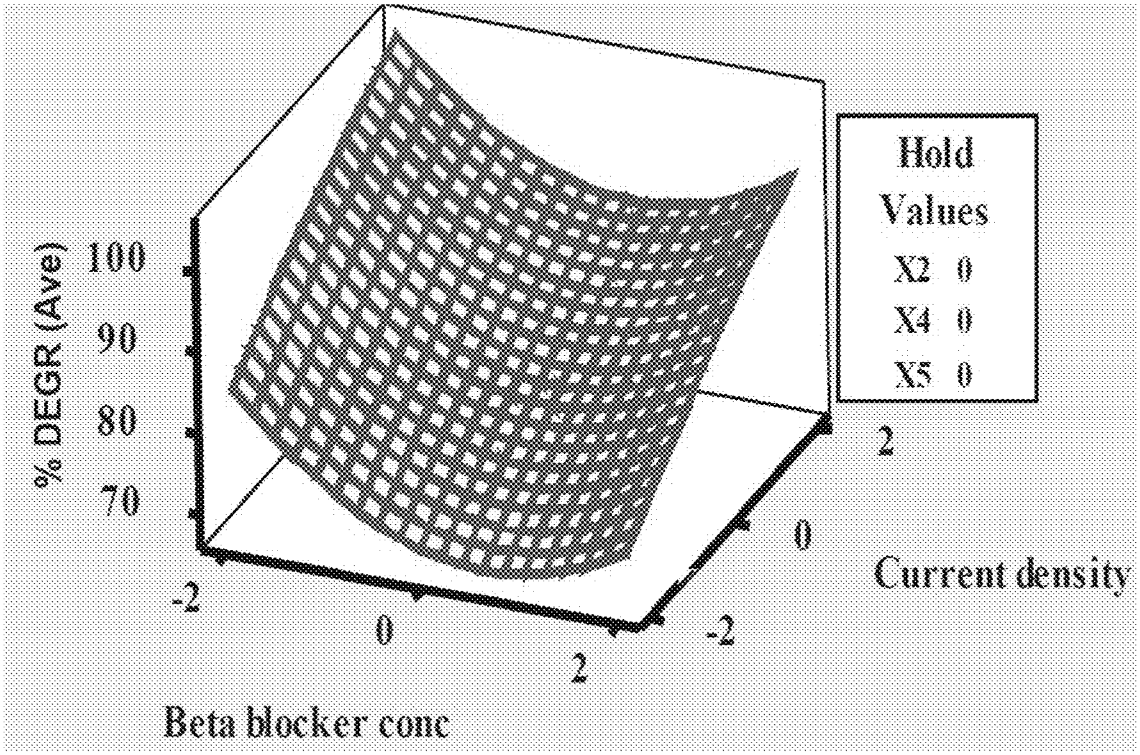
FIG. 21D shows a response surface of the degradation efficiency (%) as the function of initial β-blocker concentration, $[\beta\text{-blocker}]_0$, and current density ($mA/cm^2$)
Figure 21E:
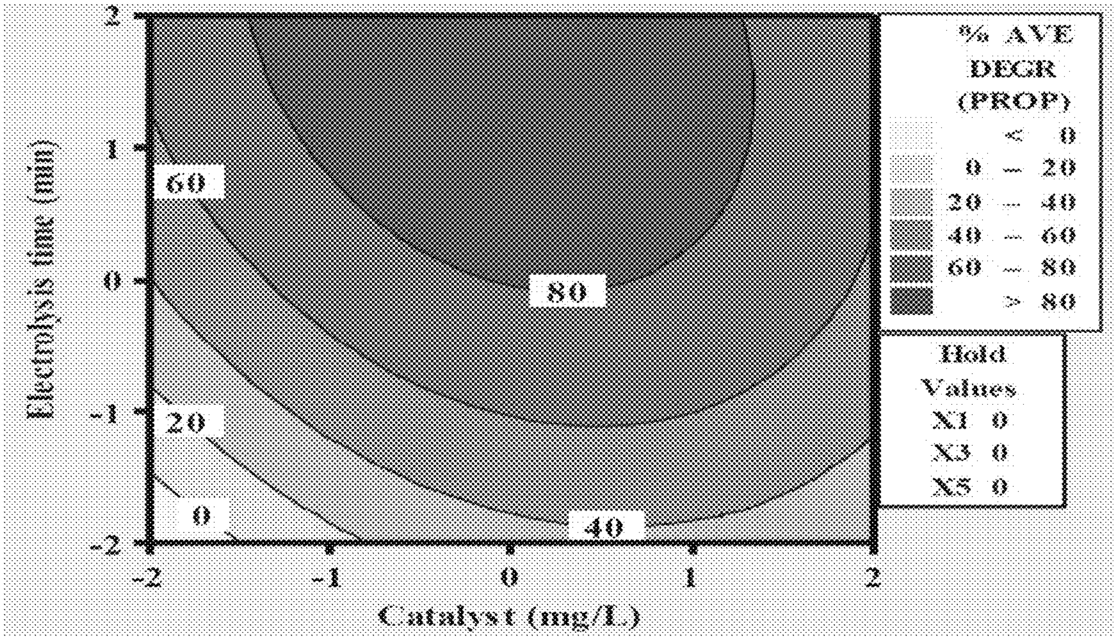
FIG. 21E shows a contour plot and response surfaces of the degradation efficiency (%) as the function of electrolysis time (min) and pH.
Figure 21F:
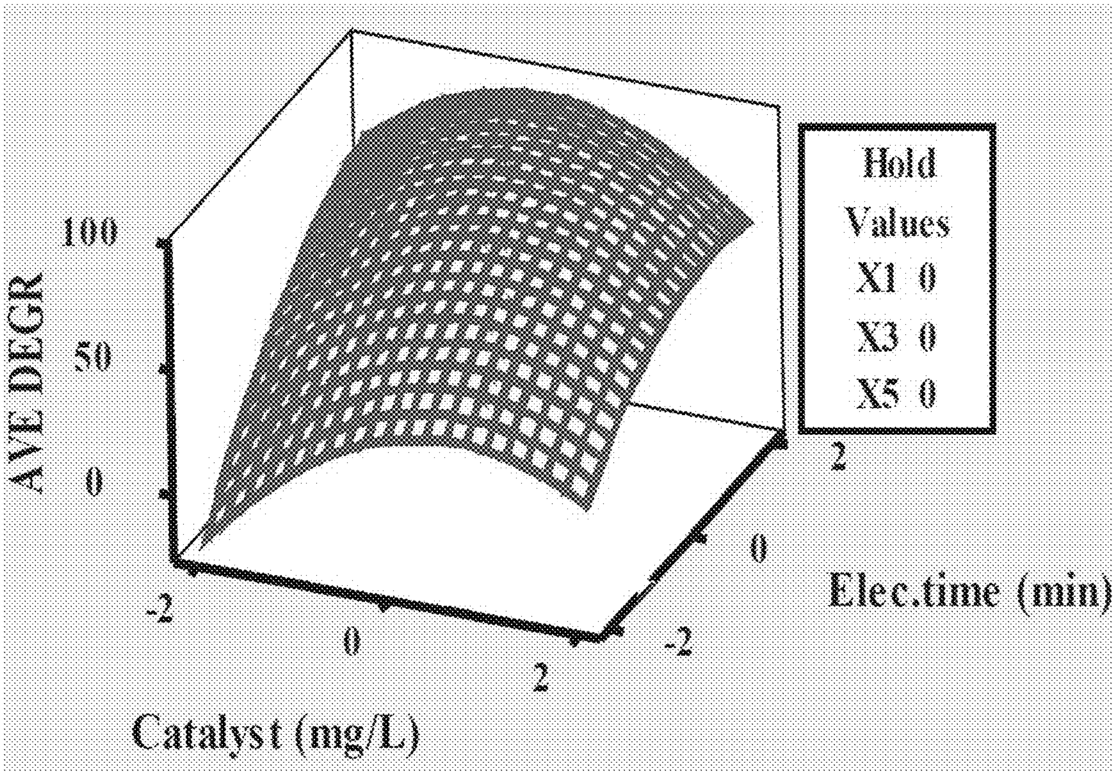
FIG. 21F shows a response surface and response surfaces of the degradation efficiency (%) as the function of electrolysis time (min) and pH.

FIG. 18 shows a plot of calculated versus experimental percentage average degradation for β-blockers. FIGS. 19A to 19D show CCD model residual normal probability, CCD model versus fits, CCD model histogram, and CCD model versus order plots for the average percentage (%) degradation for-blockers (ACE and PROP). FIG. 20 shows a plot of the Pareto effects graphic analysis for the degradation (%) of the β-blockers, ACE and PROP.

FIGS. 21A to 21F show contour and response surface plots of the degradation efficiency (%) as the function of (A and B) catalyst dosage (mg/L) and reaction time (min), (C and D) initial β-blocker concentration, [β-blocker]$_0$, and current density (mA/cm$^2$), and (E and F) electrolysis time in minutes and pH.

Figure 22:
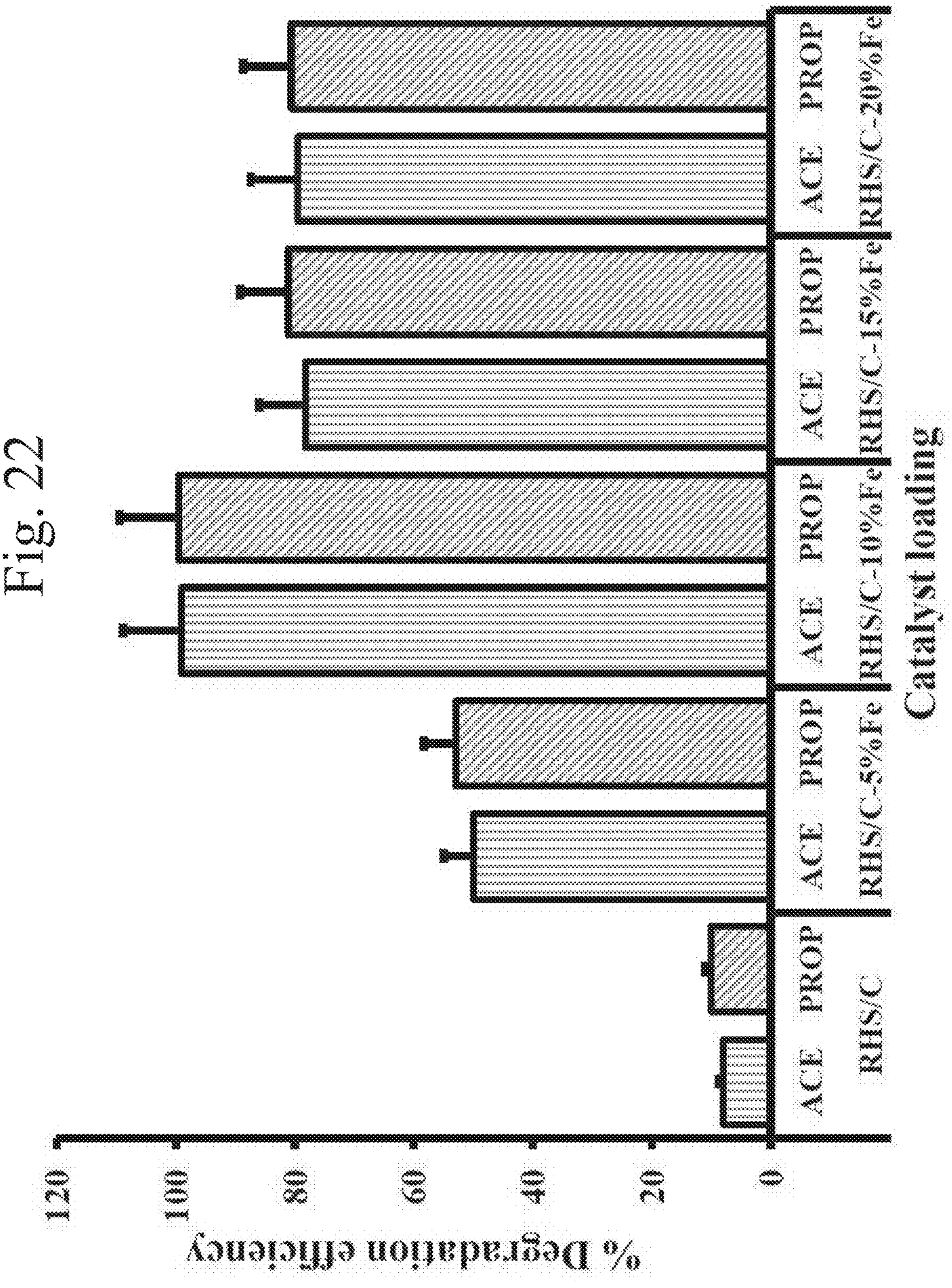
FIG. 22 shows charts of selection of a suitable heterogeneous catalyst: 200 μg/L β-blocker sample solution at room temperature, a current density of 75 $mA/cm^2$, pH of 3, initial sodium sulfate concentration, $[Na_2SO_4]_0$, of 0.05 mol/L, with 119 mg/L of RHS-x % Fe catalyst, and 15 minutes of electrolysis time.

FIG. 22 shows charts of selection of a suitable heterogeneous catalyst: 200 μg/L β-blocker sample solution at room temperature, a current density of 75 mA/cm$^2$, pH of 3, initial sodium sulfate concentration, $[Na_2SO_4]_0$, of 0.05 mol/L, with 119 mg/L of RHS-x % Fe catalyst, and 15 minutes of electrolysis time.

Figure 23:
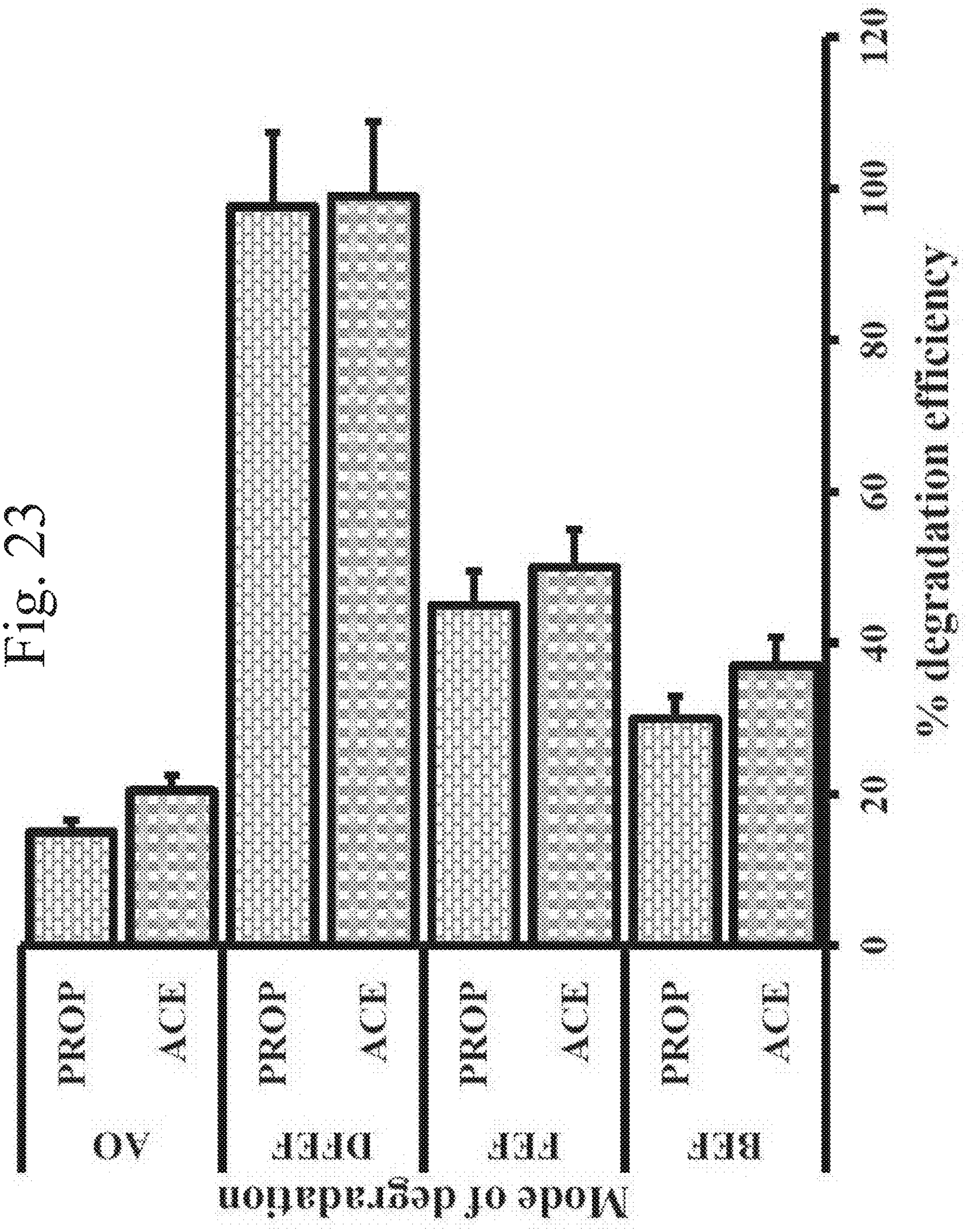
FIG. 23 shows charts of the degradation efficiency (% DE) for 200 μg/L β-blockers sample solution at room temperature, a current density of 75 $mA/cm^2$, pH of 3, initial sodium sulfate concentration, $[Na_2SO_4]_0$, of 0.05 mol/L, with 119 mg/L of RHS-15% Fe, wherein AO means anodic oxidation, BEF means batch electro-Fenton, FEF means conventional flow assisted electro-Fenton, and DFEF means droplet-flow assisted electro-Fenton processes.

FIG. 23 shows charts of the degradation efficiency (% DE) for 200 μg/L β-blocker sample solution at room temperature, a current density of 75 mA/cm$^2$, pH of 3, initial sodium sulfate concentration, $[Na_2SO_4]_0$, of 0.05 mol/L, with 119 mg/L of RHS-15% Fe, wherein AO means anodic oxidation, BEF means batch electro-Fenton, FEF means conventional flow assisted electro-Fenton, and DFEF means droplet-flow assisted electro-Fenton processes.

Figure 24:
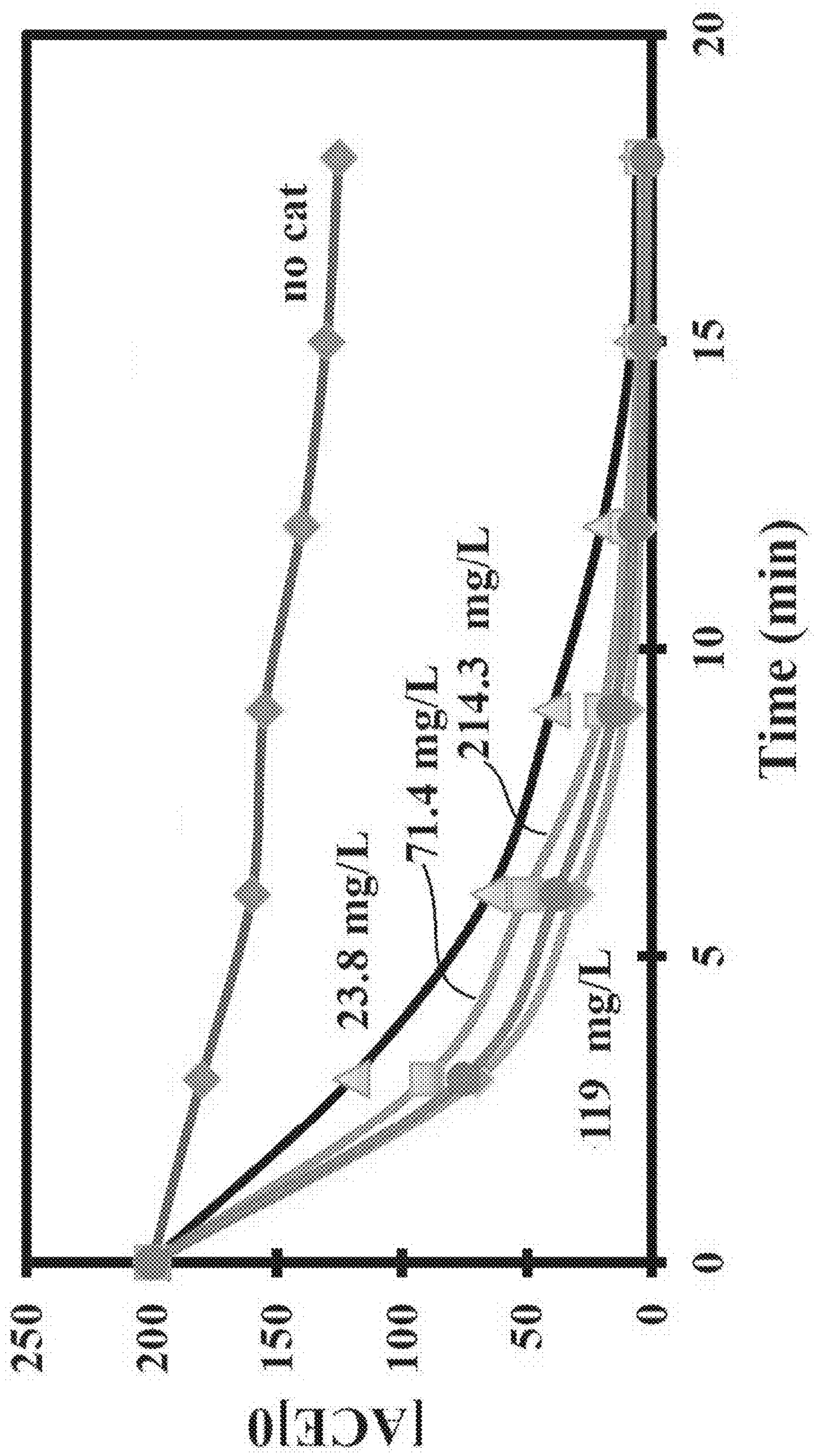
FIG. 24 shows representative decay plots of ACE under different amounts of RHS/C-10% Fe catalyst.
Figure 25:
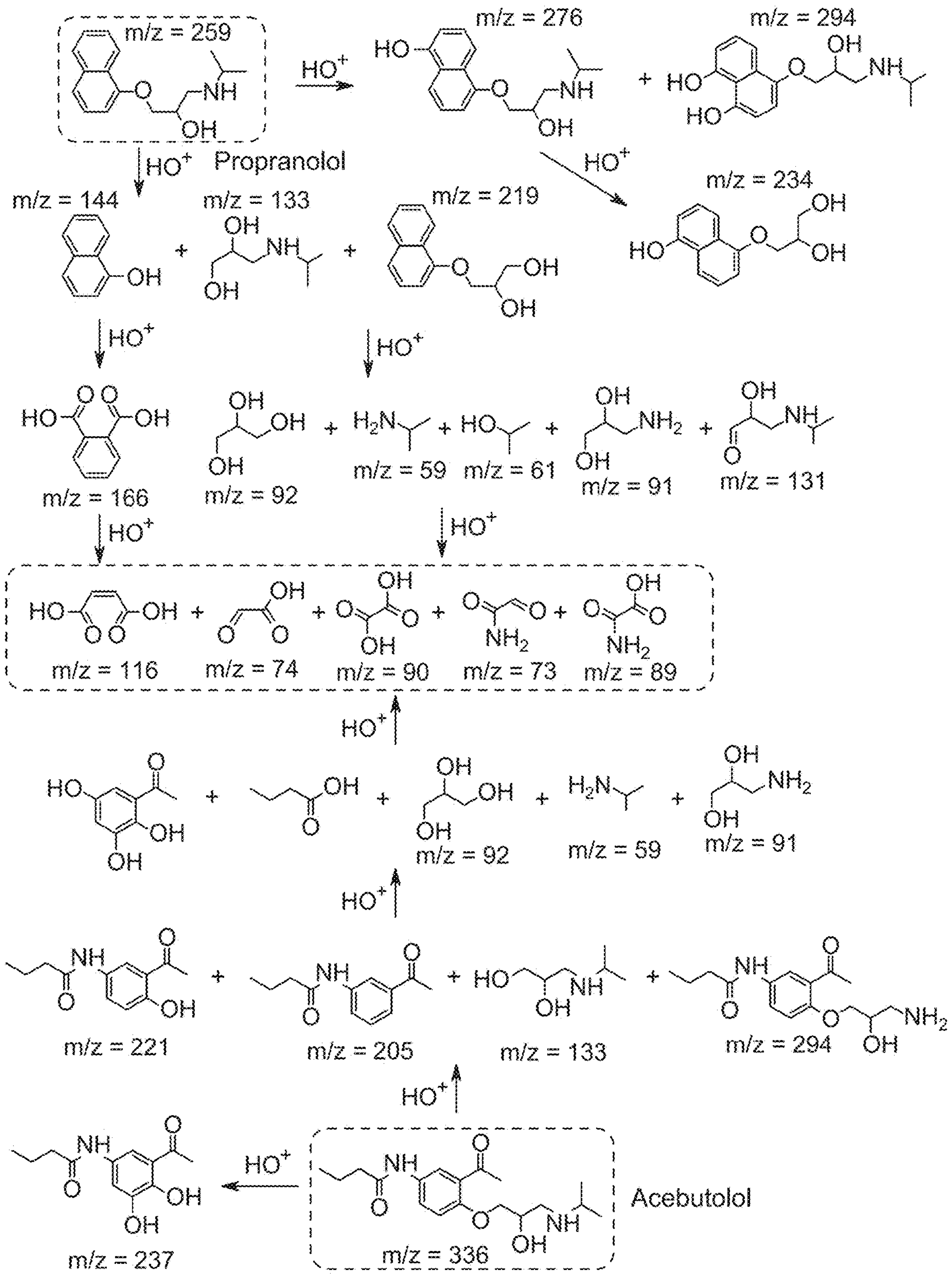
FIG. 25 shows a proposed reaction scheme for the degradation of propranolol and acebutolol upon treatment with ˙OH.

FIG. 24 shows representative decay plots of ACE under different amounts of RHS/C-10% Fe catalyst, and FIG. 25 shows a proposed reaction scheme for the degradation of propranolol and acebutolol upon treatment with ·OH.

Numerous modifications and variations of the present invention are possible in light of the above teachings. It is therefore to be understood that within the scope of the appended claims, the invention may be practiced otherwise than as specifically described herein.

REFERENCE SIGNS

1 cathode, e.g., graphite felt electrode
2 anode, e.g., boron-doped diamond (BDD) electrode or bare graphite electrode
3 (DC) power supply
4 (air) pump
5 (magnetic) stirrer
6 pump, e.g., dual-headed peristaltic pump
7 electrolytic reactor
8 direction of sample flow
9 mixing junction begin, e.g., for mixing natural air with untreated sample to form a droplet spray at cathode
10 mixing junction end, e.g., for mixing natural air with untreated sample to form a droplet spray at cathode

The invention claimed is:

1. An electrochemical reactor cell, comprising:
a reactor vessel,
a cathode,
an anode, and
a gas supply conduit;
wherein the cathode is a coated electrode, comprising:
a sulfonated graphite slab having a thickness in a range of from 1 to 10 mm;
a coating, directly contacting the slab, comprising a silica-based sol gel, 0.5 to 30 wt. % iron (III), 0.5 to 10 wt. % copper (II), and 0.5 to 5 wt. % boron,
wherein the reactor vessel is configured to contain a liquid, the cathode and anode are disposed in the liquid and the gas conduit is configured to supply an oxygen-containing gas flow to the reactor vessel.

2. The electrochemical reactor cell of claim 1, wherein the coating comprises at least 5 wt. % iron (III), at least 2.5 wt. % copper (II), and at least 1.5 wt. % boron.

3. The electrochemical reactor cell of claim 1, wherein the cathode is made by a method comprising:
applying a silica-based sol gel composite comprising copper, iron, and boron, onto a sulfonated graphite electrode; and
solidifying the sol gel, to obtain the coating, wherein the coating comprises the iron (III), the copper (II), and the boron immobilized in a silica-based sol-gel.

4. The electrochemical reactor cell of claim 1, wherein the silica-based sol gel comprises at least 55 wt. % silica.

5. The electrochemical reactor cell of claim 1, wherein the sol gel comprises boron in a range of from 0.1 to 10 wt. %, based on total sol gel weight.

6. The electrochemical reactor cell of claim 1, wherein the silica-based sol gel comprises iron in a range of from 0.1 to 30 wt. %, based on total sol gel weight.

7. The electrochemical reactor cell of claim 1, wherein the silica-based sol gel comprises copper in a range of from 0.1 to 20 wt. %, based on total sol gel weight.

8. The electrochemical reactor cell of claim 1, wherein the method of making the cathode further comprises:
preparing the silica-based sol gel by
treating an aqueous silicate solution with iron, copper, and boron; and
gelling the sol.

9. The electrochemical reactor cell of claim 8, wherein the boron is in the form of boric acid and/or $BO_3^{3-}$,
wherein the silicate comprises at least 75 wt. %, based on total silicates, of sodium silicate,
wherein the iron is in the form of an iron (III) salt comprising $NO_3^-$, $Cl^-$, $Br^-$, $I^-$, $ClO_4^-$, $ClO_3^-$, $IO_3^-$, $SiF_6^{2-}$, and/or $SO_4^{2-}$, and/or
wherein the copper is in the form of an copper (II) salt comprising $NO_3^-$, $Cl^-$, $Br^-$, $I^-$, $ClO_4^-$, $ClO_3^-$, $IO_3^-$, $SiF_6^{2-}$, and/or $SO_4^{2-}$.

10. The electrochemical reactor cell of claim 8, wherein the method of making the cathode, the aqueous silicate solution further comprises a surface directing agent comprising glycerol and cetyltrimethylammonium bromide.

11. The electrochemical reactor cell of claim 8, wherein the method of making the cathode, the silica-based sol comprises a silica derived from rice husks.

12. The electrochemical reactor cell of claim 8, wherein the method of making the coated electrode, the copper, iron, and boron are provided in a single solution, and
wherein the single solution comprises 1 to 5 M nitric acid, 5 to 30 wt. % iron, 5 to 15 wt. % copper, and 2.5 to 7.5 wt. % boron.

13. The electrochemical reactor cell of claim 8, wherein the method of making the coated electrode further comprises:
gelling by adding a mineral acid to the silicate solution during and/or after contacting the silicate solution with the iron, copper, and boron.

* * * * *